United States Patent
Kim et al.

(10) Patent No.: US 11,302,966 B2
(45) Date of Patent: Apr. 12, 2022

(54) AMINE BORATE COMPOUND CONTAINING NONAQUEOUS ELECTROLYTIC SOLUTION AND POWER STORAGE DEVICE

(71) Applicants: MITSUBISHI CHEMICAL CORPORATION, Tokyo (JP); MU Ionic Solutions Corporation, Tokyo (JP)

(72) Inventors: Jungmin Kim, Tokyo (JP); Hiroyuki Tokuda, Tokyo (JP)

(73) Assignees: MITSUBISHI CHEMICAL CORPORATION, Tokyo (JP); MU Ionic Solutions Corporation, Tokyo (JP)

( * ) Notice: Subject to any disclaimer, the term of this patent is extended or adjusted under 35 U.S.C. 154(b) by 414 days.

(21) Appl. No.: 16/541,684

(22) Filed: Aug. 15, 2019

(65) Prior Publication Data

US 2019/0372167 A1    Dec. 5, 2019

Related U.S. Application Data

(63) Continuation of application No. PCT/JP2018/005345, filed on Feb. 15, 2018.

(30) Foreign Application Priority Data

Feb. 16, 2017  (JP) .............. JP2017-027190
Mar. 28, 2017  (JP) .............. JP2017-063998

(51) Int. Cl.
| H01M 10/0567 | (2010.01) |
| H01M 10/0569 | (2010.01) |
| H01G 11/06 | (2013.01) |
| H01G 11/62 | (2013.01) |
| H01M 10/052 | (2010.01) |
| H01M 10/0568 | (2010.01) |

(52) U.S. Cl.
CPC ........ *H01M 10/0569* (2013.01); *H01G 11/06* (2013.01); *H01G 11/62* (2013.01); *H01M 10/052* (2013.01); *H01M 10/0567* (2013.01); *H01M 10/0568* (2013.01); *H01M 2300/0031* (2013.01)

(58) Field of Classification Search
None
See application file for complete search history.

(56) References Cited

U.S. PATENT DOCUMENTS

| 2013/0288139 A1 | 10/2013 | Choi et al. |
| 2015/0140446 A1 | 5/2015 | Li |
| 2018/0226678 A1 | 8/2018 | Haruna et al. |

FOREIGN PATENT DOCUMENTS

| JP | 2003-132946 A | 5/2003 |
| JP | 2009-245830 A | 10/2009 |
| JP | 2013-232417 A | 11/2013 |
| JP | 2014-216127 A | 11/2014 |
| JP | 2017-033838 A | 2/2017 |
| JP | 2017-504145 A | 2/2017 |
| JP | 2017-168375 A | 9/2017 |
| KR | 10-2016-0078071 A | 7/2016 |
| KR | 2016-0078071 A | 7/2016 |

OTHER PUBLICATIONS

Young-Kyu Han et al., "Virtual screening of borate derivatives as high-performance additives in lithium-ion batteries", Theoretical Chemistry Accounts, 2014, vol. 133, No. 10, Article: 1562 (The document was previously submitted in the IDS filed Aug. 15, 2019).
Notification of Transmittal of Translation of the International Preliminary Report on Patentability dated Aug. 29, 2019 for the corresponding PCT International Application No. PCT/JP2018/005345.
Korean Office Action dated Nov. 23, 2020 for the corresponding Korean Patent Application No. 10-2019-7024659.
Extended European Search Report dated Feb. 19, 2020 for the corresponding European Patent Application No. 18753808.7.
Young-Kyu Han et al., "Virtual screening of borate derivatives as high-performance additives in lithium-ion batteries", Theoretical Chemistry ISR Accounts, 2014, vol. 133, No. 10, Article: 1562.
Internal Search Report dated Apr. 10, 2018 for the corresponding PCT International Application No. PCT/JP2018/005345.

*Primary Examiner* — Lucas J. O'Donnell
(74) *Attorney, Agent, or Firm* — Leason Ellis LLP

(57) ABSTRACT

Provided is a nonaqueous electrolytic solution having an excellent capacity retention rate and an excellent output retention rate during cycles. The nonaqueous electrolytic solution includes a nonaqueous solvent; a hexafluorophosphate (A); a compound (B) represented by the following formula (1) in which an arbitrary hydrogen atom bonded to a carbon atom may be substituted with a fluorine atom; and at least one salt (C) selected from the group consisting of fluorophosphates other than the hexafluorophosphate (A), fluorosulfonates, imide salts represented by $MN(SO_2F)_2$, wherein M represents an alkali metal, and oxalate salts.

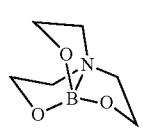

(1)

11 Claims, No Drawings

AMINE BORATE COMPOUND CONTAINING NONAQUEOUS ELECTROLYTIC SOLUTION AND POWER STORAGE DEVICE

CROSS-REFERENCE TO RELATED APPLICATION

This is a continuation of International Application PCT/JP2018/005345, filed on Feb. 15, 2018, and designated the U.S., and claims priority from Japanese Patent Application 2017-027190 which was filed on Feb. 16, 2017 and Japanese Patent Application 2017-063998 which was filed on Mar. 28, 2017, the entire contents of which are incorporated herein by reference.

TECHNICAL FIELD

The present invention relates to a nonaqueous electrolytic solution and a power storage device. More particularly, the present invention relates to a nonaqueous electrolytic solution having an excellent capacity retention rate and an excellent input/output retention rate during cycles, and a power storage device using the nonaqueous electrolytic solution. The present invention also relates to a power storage device having excellent resistance characteristics such as input/output characteristics, a low resistance increase rate after durability test, and an excellent capacity retention rate after durability test.

BACKGROUND ART

Nonaqueous electrolyte secondary batteries such as lithium secondary battery have been put to practical use in a wide range of applications such as so-called household power sources for mobile phones, notebook computers and the like, on board power sources for driving automobiles and the like, and stationary large-capacity power sources. In recent years, however, the demand for higher performance toward nonaqueous electrolyte secondary batteries is becoming higher and higher, and high levels of battery characteristics, such as input/output characteristics, cycle characteristics, storage characteristics, continuous charge characteristics, and safety, are required to be achieved.

In order to improve battery characteristics such as cycle characteristics, and high-temperature storage characteristics of nonaqueous electrolyte secondary batteries, use of borate esters as an additive for nonaqueous electrolytic solutions was previously proposed. For example, Patent Literature 1 discloses a technique that allows swelling of batteries after being left under a high temperature to be reduced by adding tripropanolamine borate ester to the nonaqueous electrolytic solution. Patent Literature 2 discloses a technique that allows increase in interface resistance of electrodes after being stored under a high temperature to be reduced by adding borate esters, sulfonates, and vinylene carbonate to the nonaqueous electrolytic solution.

PRIOR ART DOCUMENTS

Patent Literature

Patent Literature 1: JP 2009-245830 A
Patent Literature 2: JP 2003-132946 A

SUMMARY OF THE INVENTION

Technical Problem

According to the verification by the present inventors, it has been found that batteries using tripropanolamine borate or triethanolamine borate as an additive have a low capacity retention rate during cycles and an input/output retention rate during cycles that is still not sufficient. In addition, it has also been found that increasing the amount of triethanolamine borate added to increase the input/output retention rate may lead to deteriorated initial input/output characteristics and further decreased capacity retention rate.

The reason for this is presumed to be as described below. In nonaqueous electrolyte batteries using an electrolytic solution containing tripropanolamine borate or triethanolamine borate, side reactions on the surface of the electrode during charging and discharging cannot be sufficiently inhibited, so that the charge/discharge efficiency is decreased. This presumably leads to early deterioration of the batteries, such as reduction of the capacity during cycles.

In addition, according to the verification by the present inventors, it has been found that both of the above Patent Literatures 1 and 2 use $LiCoO_2$ as a positive electrode, however, a battery using such electrode and an electrolytic solution containing triethanolamine borate found to has a high resistance, a high resistance increase rate after durability test, and low capacity retention rate.

The present invention has been made in the light of the background arts described above. An object of the present invention is to provide a nonaqueous electrolytic solution capable of significantly improving the capacity retention rate and the input/output retention rate during cycles as compared with the conventional arts.

Another object of the present invention is to provide a power storage device having excellent resistance characteristics such as input/output characteristics, a low resistance increase rate after durability test, and an excellent capacity retention rate.

Solution to Problem

As a result of intensive studies for solving the above problem, the present inventor found that in a nonaqueous electrolytic solution comprising electrolytes and a nonaqueous solvent for solving the electrolytes, inclusion of hexafluorophosphate and certain salts as the electrolytes and use of a triethanolamine borate compound as an additive for the nonaqueous electrolytic solution allow improvements of the capacity retention rate and the input/output retention rate during cycle operations, thereby completing the present invention. That is, the present invention is summarized as the following <1> to <11>. The items <1> to <6> may be referred to as "a nonaqueous electrolytic solution according to the first aspect of the present invention," and the item <7> may be referred to as "a power storage device according to the first aspect of the present invention." The items <8> to <11> may be referred to as "a power storage device according to the second aspect of the present invention."

<1> The nonaqueous electrolytic solution comprising: a nonaqueous solvent; a hexafluorophosphate (A); a compound (B) represented by the following formula (1); and at least one salt (C) selected from the group consisting of fluorophosphates other than the hexafluorophosphate (A), a fluorophosphate other than the hexafluorophosphate (A), fluorosulfonates, imide salts represented by $MN(SO_2F)_2$, wherein M represents an alkali metal, and oxalate salts.

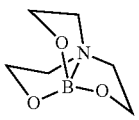

wherein an arbitrary hydrogen atom bonded to a carbon atom may be substituted with a fluorine atom.

<2> The nonaqueous electrolytic solution according to <1>, wherein the content of the hexafluorophosphate (A) in the nonaqueous electrolytic solution is 0.5 mol/L or more and 3.0 mol/L or less.

<3> The nonaqueous electrolytic solution according to <1> or <2>, wherein the content of the compound (B) is 0.01 parts by mass or more and 10 parts by mass or less with respect to 100 parts by mass in total of the nonaqueous solvent and the hexafluorophosphate (A) in the nonaqueous electrolytic solution.

<4> The nonaqueous electrolytic solution according to any one of <1> to <3>, wherein the content of the salt (C) is 0.01 parts by mass or more and 10 parts by mass or less with respect to 100 parts by mass in total of the nonaqueous solvent and the hexafluorophosphate (A).

<5> The nonaqueous electrolytic solution according to any one of <1> to <4>, wherein the salt (C) comprises at least one salt selected from the group consisting of $LiPO_2F_2$, $FSO_3Li$, $LiN(FSO_2)_2$, $LiF_2P(C_2O_4)_2$ and $LiB(C_2O_4)_2$.

<6> The nonaqueous electrolytic solution according to any one of <1> to <5>, wherein the hexafluorophosphate (A) comprises $LiPF_6$ salt.

<7> A power storage device comprising a negative electrode, a positive electrode, and the nonaqueous electrolytic solution according to any one of <1> to <6>.

<8> A power storage device comprising a nonaqueous electrolytic solution, a positive electrode and a negative electrode,
wherein the nonaqueous electrolytic solution comprises a nonaqueous solvent and a compound represented by the following formula (1):

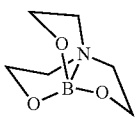

wherein an arbitrary hydrogen atom bonded to a carbon atom may be substituted with a fluorine atom; and
wherein the positive electrode comprises a composite oxide represented by the following formula (7):

$$A_aNi_xCo_yMn_zM'_bO_2 \quad (7)$$

wherein, 0<a<1.2; x+y+z+b=1; 0<x<1; 0<y<1; 0<z<1; 0>b<0.3; A is an alkali metal; and M' is at least one selected from V, Fe, Cu, Nb, Mo, Ta, W, Zn, Ti, Zr, Al, Mg, Li, Na and K.

<9> The power storage device according to <8>, wherein the content of the compound represented by the above formula (1) is 0.01 parts by mass or more and 10 parts by mass or less with respect to 100 parts by mass of the nonaqueous solvent.

<10> The power storage device according to <8> or <9>, wherein the nonaqueous electrolytic solution comprises at least one salt selected from the group consisting of fluorophosphates, fluorosulfonates, imide salts and oxalate salts.

<11> The power storage device according to <10>, wherein the content of the salt in the nonaqueous electrolytic solution is 0.001 mol/L or more and 3.0 mol/L or less.

Advantageous Effects of Invention

According to the first aspect of the present invention, a nonaqueous electrolytic solution capable of providing a power storage device having significantly improved capacity retention rate and input/output retention rate during cycles can be provided. Furthermore, according to preferred aspects of the present invention, a nonaqueous electrolytic solution capable of providing a power storage device can be provided, which is excellent not only in input/output characteristics but also in impedance characteristics and charging/discharging rate characteristics, and is also excellent in cycle characteristics, high-temperature storage characteristics, continuous charge characteristics, and safety. In addition, a power storage device using the nonaqueous electrolytic solution can be provided.

According to the second aspect of the present invention, a power storage device having excellent resistance characteristics such as input/output characteristics, and further having a low resistance increase rate after durability test and an excellent capacity retention rate can be provided.

DESCRIPTION OF EMBODIMENTS

Embodiments of the present invention will be described in detail. In the following embodiments, only certain (representative) examples will be described, but the present invention is not limited thereto. Any modifications can be made to the present invention without departing from the scope and spirit of the invention.

(First Aspect of the Present Invention)
<1. Nonaqueous Electrolytic Solution>

The nonaqueous electrolytic solution according to the first aspect of the present invention comprises a nonaqueous solvent; a hexafluorophosphate (A); a compound (B) represented by the following formula (1) (hereinafter may also be referred to as "compound (B)"); and at least one salt (C) selected from the group consisting of fluorophosphates other than the hexafluorophosphate (A), fluorosulfonates, imide salts and oxalate salts (hereinafter may also be referred to as "salt (C)"),

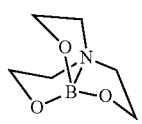

wherein an arbitrary hydrogen atom bonded to a carbon atom may be substituted with a fluorine atom.

The hexafluorophosphate (A) contained in the nonaqueous electrolytic solution serves to impart ion conductivity to the nonaqueous electrolytic solution. In particular, when the concentration of the hexafluorophosphate (A) is within the preferred range, the total ion content in the nonaqueous electrolytic solution and the viscosity of the electrolytic solution are properly balanced, by which reduction of the battery internal impedance, improvement of cycle characteristics, and improvement of input/output characteristics are easily realized.

In addition, when the nonaqueous electrolytic solution is combined with the compound (B) and the salt (C) in use, the output retention rate and capacity retention rate during cycles are further improved. The reason for this is presumed to be as described below. When the compound (B) is combined, a film derived from the compound (B) is usually formed on the negative electrode of the power storage device. Due to the electrochemical instability and the ununiformity of the passivation layer on the negative electrode, the compound (B)-derived passivation layer on the negative electrode may lead to inability to completely suppress side reactions on the surface of the negative electrode during charging and discharging, which may accelerate the deterioration of the battery, such as a decrease in charge/discharge capacity. On the other hand, since the salt (C) is an ionic compound, the anion of the salt (C) is presumably attracted to the negative electrode upon initial charge, and a film derived from the salt (C) is easily formed on the negative electrode to form a uniform and electrochemically stable film, so that side reactions on the surface of the negative electrode can be suppressed. In addition, since the salt (C)-derived film increases the ion concentration on the surface of the negative electrode, it can contribute to improvement of the ion conductivity of the negative electrode surface. Thus, when the compound (B) and the salt (C) are combined in the nonaqueous electrolytic solution, the salt (C)-derived film is preferentially formed on the negative electrode, inhibiting the formation of the compound (B)-derived passivation layer on the negative electrode, and thereby, presumably, contributing to improvement of the electrochemical stability of the passivation layer on the negative electrode of the power storage device and alleviation of the ununiformity of the passivation layer on the negative electrode.

<1-1. Hexafluorophosphate (A)>

In one embodiment of the present invention, the nonaqueous electrolytic solution comprises the hexafluorophosphate (A). The hexafluorophosphate is usually a metal hexafluorophosphate, preferably an alkali metal hexafluorophosphate, more preferably $LiPF_6$, $NaPF_6$, $KPF_6$ or the like, most preferably $LiPF_6$.

The content of the hexafluorophosphate (A) in the nonaqueous electrolytic solution is not particularly limited as long as the effects of the present invention are not significantly impaired. Specifically, the molar content of the hexafluorophosphate (A) in the nonaqueous electrolytic solution is preferably 0.5 mol/L or more, more preferably 0.6 mol/L or more, and still more preferably 0.7 mol/L or more. Also, the molar content is preferably 5.0 mol/L or less, more preferably 3.0 mol/L or less, particularly preferably 1.5 mol/L or less. Further, the concentration of $LiPF_6$ ranges preferably from 0.5 mol/L or more to 3.0 mol/L or less, more preferably from 0.5 mol/L or more to 2.0 mol/L or less, still more preferably from 0.5 mol/L or more to 1.5 mol/L or less. When the concentration of the hexafluorophosphate (A) is within the above preferred range, the total ion content in the nonaqueous electrolytic solution and the viscosity of the electrolytic solution are properly balanced, and thus the battery internal impedance is lowered without excessively decreasing the ion conductivity, so that the effects of improving the cycle characteristics and the input/output characteristics by the combination of the hexafluorophosphate (A) can be further easily obtained.

<1-2. Salt (C)>

In one embodiment of the present invention, the nonaqueous electrolytic solution comprises, in addition to the hexafluorophosphate (A), at least one salt (C) selected from the group consisting of fluorophosphates other than the hexafluorophosphate (A), fluorosulfonates, imide salts and oxalate salts. The salt (C) may be used alone by selecting only one from suitable ones, or in combination of two or more. Specifically, preferred examples of the imide salts include imide salts represented by $MN(SO_2F)_2$ (wherein M represents an alkali metal).

Preferred examples of the salt (C) include, but not limited to, fluorophosphates represented by $M^1PO_aF_{4-a}$ (wherein a represents an integer of 2 or 3, and $M^1$ represents an alkali metal); phosphorus-containing oxalate salts represented by $M^2PF_{6-2b}(C_2O_4)_b$ (wherein b represents an integer of 1 to 3, and $M^2$ represents an alkali metal); boron-containing oxalate salts represented by $M^3BF_{4-2c}(C_2O_4)_c$ (wherein c represents an integer of 1 or 2, and $M^3$ represents an alkali metal); fluorosulfonates represented by $FSO_3M^4$ (wherein $M^4$ represents an alkali metal); and imide salts represented by $M^5N(SO_2F)_2$ (wherein $M^5$ represents an alkali metal).

More specific examples of the salt (C) include fluorophosphates such as $LiPO_2F_2$, $LiPO_3F$, $NaPO_2F_2$, $NaPO_3F$, $KPO_2F_2$, and $KPO_3F$; phosphorus-containing oxalate salts such as $LiPF_4(C_2O_4)$, $LiPF_2(C_2O_4)_2$, $LiP(C_2O_4)_3$, $NaPF_4(C_2O_4)$, $NaPF_2(C_2O_4)_2$, $NaP(C_2O_4)_3$, $KPF_4(C_2O_4)$, $KPF_2(C_2O_4)_2$, and $KP(C_2O_4)_3$; boric acid-containing oxalate salts such as $LiBF_2(C_2O_4)$ $LiB(C_2O_4)_2$, $NaBF_2(C_2O_4)$, $NaB(C_2O_4)_2$, $KBF_2(C_2O_4)$, and $KB(C_2O_4)_2$; fluorosulfonates such as $FSO_3Li$, $FSO_3Na$, and $FSO_3K$; and imide salts such as $LiN(SO_2F)_2$, $NaN(SO_2F)_2$, and $KN(SO_2F)_2$.

Among them, at least one selected from $M^1PO_2F_2$, $M^2PF_4(C_2O_4)$, $M^2PF_2(C_2O_4)_2$, $M^2P(C_2O_4)_3$, $M^3BF_2(C_2O_4)$, $M^3B(C_2O_4)_2$, $FSO_3M^4$, and $M^5N(SO_2F)_2$ is particularly preferably contained, from the viewpoints that effects of improving the initial input/output characteristics, the high-rate charge/discharge characteristics, and output characteristics after high temperature storage and after cycles can be further easily obtained, and that significant effects of improving the electrochemical stability of the passivation layer on the negative electrode and alleviating the ununiformity of the passivation layer on the negative electrode in the nonaqueous electrolytic solution using the compound (B) can be obtained. Among the above, at least one selected from the group consisting of $LiPO_2F_2$, $FSO_3Li$, $LiN(FSO_2)_2$, $LiF_2P(C_2O_4)_2$ and $LiB(C_2O_4)_2$ is most preferably contained.

When the electrolytic solution comprises the salt (C), the method for preparing the electrolytic solution is not particularly limited and any known method may be used. For example, a method comprising synthesizing a salt (C) separately by a known method and adding it to an electrolytic solution comprising the hexafluorophosphate (A), and methods comprising producing a salt (C) in a battery and dissolving it in the electrolytic solution, or allowing it to co-exist with battery components such as active materials and electrode plates described later may be used. In the present invention, any of the methods may be used.

The methods for measuring the contents of the nonaqueous electrolytic solution, and the salt (C) in the nonaqueous electrolyte battery are not particularly limited, and any known methods can be used. Specific examples include ion chromatography and nuclear magnetic resonance spectroscopy.

The nonaqueous electrolytic solution preferably comprises the salt (C) as a secondary electrolyte. The content of the salt (C) is not particularly limited as long as the effects of the present invention are not significantly impaired. Specifically, the content of the salt (C) is preferably 0.01 parts by mass or more, more preferably 0.05 parts by mass or more, still more preferably 0.1 parts by mass or more, with respect to 100 parts by mass in total of the nonaqueous solvent and the hexafluorophosphate (A) described above in the nonaqueous electrolytic solution. Also, the content is preferably 10 parts by mass or less, more preferably 5 parts by mass or less, still more preferably 2.5 parts by mass or less. When the concentration of the salt (C) is within the above preferred range, the effects of improving the initial input/output characteristics, the capacities and the output characteristics after high-temperature storage and after cycles can be further easily obtained.

<1-3. Other Salt>

The nonaqueous electrolytic solution comprising hexafluorophosphate (A) and the salt (C) as electrolytes may further contain other salts.

Examples of the other salts include inorganic salts other than the hexafluorophosphate (A) and the salt (C), such as $LiBF_4$, $LiClO_4$, $LiAlF_4$, $LiSbF_6$, $LiTaF_6$, $LiWOF_5$, and $LiWF_7$;

carboxylic acid salts such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$;

sulfonic acid salts other than the salt (C), such as $CH_3SO_3Na$, $CH_3SO_3K$, $CH_3H_2SO_3Li$, and $CH_3H_2OSO_3Li$;

sulfuric acid salts such as lithium methyl sulfate, lithium ethyl sulfate, lithium 2-propynyl sulfate, lithium 1-methyl-2-propynyl sulfate, lithium 1,1-dimethyl-2-propynyl sulfate, lithium 2,2,2-trifluoroethyl sulfate, and dilithium ethylene disulfate;

imide salts other than the salt (C), such as $LiN(SO_2CF_3)_2$, and $LiN(SO_2CF_2CF_3)_2$;

methide salts such as $LiC(SO_2F)_3$, $LiC(CF_3SO_2)_3$, and $LiC(C_2F_5SO_2)_3$; and organic boric acid salts such as $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$.

The other salts are not particularly limited thereto and may be used alone or in combination of two or more.

Among them, preferred examples are $LiBF_4$, $LiSbF_6$, $LiTaF_6$, $LiWOF_5$, $LiWF_7$, lithium methyl sulfate, and lithium ethyl sulfate, from the viewpoint of the effects of improving the input/output characteristics, the high-rate charge/discharge characteristics, the high-temperature storage characteristics, the cycle characteristics and the like.

When the other salts are contained as secondary electrolytes, the content of the other salts is not particularly limited as long as the effects of the present invention are not significantly impaired. Specifically, the content of the other salts is preferably 0.01 parts by mass or more, more preferably 0.05 parts by mass or more, still more preferably 0.1 parts by mass or more, with respect to 100 parts by mass in total of the nonaqueous solvent and the hexafluorophosphate (A) described above in the nonaqueous electrolytic solution. Also, the content is preferably 3 parts by mass or less, more preferably 2.5 parts by mass or less, still more preferably 2 parts by mass or less. The total concentration of the other salts described above in the nonaqueous electrolytic solution is not particularly limited, but is preferably within the above preferred range from the viewpoint of obtaining suitable electrical conductivity for battery operation.

When the electrolytic solution comprises the other salts, the method for preparing the electrolytic solution is not particularly limited and any known method may be used. For example, a method comprising synthesizing other salts separately by a known method and adding them to an electrolytic solution comprising the hexafluorophosphate (A), and methods comprising producing other salts in a battery and dissolving them in the electrolytic solution, or allowing them to co-exist with battery components such as active materials and electrode plates described later may be used. In the present invention, any of the methods may be used.

<1-4. Compound (B)>

The nonaqueous electrolytic solution comprises a compound represented by the above formula (1). In the above formula (1), an arbitrary hydrogen atom bonded to a carbon atom may be substituted with a fluorine atom. However, those without substitution are particularly preferred, and the compound in the case is triethanolamine borate (TEAB).

The content of the compound (B) in the nonaqueous electrolytic solution is not particularly limited as long as the effects of the present invention are not significantly impaired. Specifically, the content of the compound (B) is preferably 0.01 parts by mass or more, more preferably 0.05 parts by mass or more, still more preferably 0.1 parts by mass or more, with respect to 100 parts by mass in total of the nonaqueous solvent and the hexafluorophosphate (A) described above in the nonaqueous electrolytic solution. Also, the content is preferably 10 parts by mass or less, more preferably 3 parts by mass or less, still more preferably 2 parts by mass or less. When the concentration of the compound (B) is within the above preferred range, the effects of improving the initial input/output characteristics, the input/output characteristics after high-temperature storage and after cycles can be further easily obtained.

<1-5. Nonaqueous Solvent>

The nonaqueous electrolytic solution comprises a nonaqueous solvent for dissolving the electrolyte as the main component. The nonaqueous solvent is not particularly limited, and any known organic solvents may be used. Examples of the organic solvents include, but not particularly limited to, saturated cyclic carbonates, linear carbonates, linear carboxylic acid esters, cyclic carboxylic acid esters, ether compounds and sulfone compounds. These may be used alone or in combination of two or more.

<1-5-1. Saturated Cyclic Carbonates>

Examples of the saturated cyclic carbonates include those bearing an alkylene group having 2 to 4 carbons.

Specific examples of the saturated cyclic carbonates having 2 to 4 carbons include ethylene carbonate, propylene carbonate, and butylene carbonate. Among them, ethylene carbonate and propylene carbonate are preferable from the viewpoint of improvement of the battery characteristics due to improvement of degree of dissociation into lithium ions. The saturated cyclic carbonates may be used alone or in any combination of two or more at any ratio.

The content of the saturated cyclic carbonates is not particularly limited, and may be any value as long as the effects of the present invention are not significantly impaired. When one saturated cyclic carbonate is used alone, the content is usually 3% by volume or more, preferably 5% by volume or more with respect to 100% by volume of the nonaqueous solvent. When the content satisfies this range, a decrease in the electrical conductivity due to decreased dielectric constant of the nonaqueous electrolytic solution can be avoided, and the large-current discharge characteristics, the stability to the negative electrode, and the cycle characteristics of the power storage device can be easily within good ranges. Further, the content is usually 90% by volume or less, preferably 85% by volume or less, more preferably 80% by volume or less. Preferably, the content satisfies this range, because the viscosity of the nonaqueous electrolytic solution can be within an appropriate range and a decrease in the ion conductivity can be inhibited, and therefore the input/output characteristics of the power storage device can be further improved and the durabilities such as cycle characteristics and storage characteristics can be further improved.

The saturated cyclic carbonates may also be used in any combination of two or more. One of preferred combinations is a combination of ethylene carbonate and propylene carbonate. In this case, the volume ratio of ethylene carbonate to propylene carbonate is preferably 99:1 to 40:60, more preferably 95:5 to 50:50. The content of propylene carbonate is usually 1% by volume or more, preferably 2% by volume or more, more preferably 3% by volume or more with respect to 100% by volume of the nonaqueous solvent. Further, the content is usually 30% by volume or less, preferably 25% by volume or less, more preferably 20% by volume or less. Preferably, propylene carbonate is contained in this range, because excellent low-temperature characteristics can be further obtained.

<1-5-2. Linear Carbonates>

Preferred examples of the linear carbonates include linear carbonates having 3 to 7 carbon atoms.

Specific examples of the linear carbonates having 3 to 7 carbon atoms include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butyl ethyl carbonate, isobutyl ethyl carbonate, and t-butyl ethyl carbonate.

Among them, dimethyl carbonate, diethyl carbonate, di-n-propyl carbonate, diisopropyl carbonate, n-propyl isopropyl carbonate, ethyl methyl carbonate, and methyl-n-propyl carbonate are preferable, and dimethyl carbonate, diethyl carbonate, and ethyl methyl carbonate are particularly preferable.

Chain carbonates having fluorine atoms (hereinafter may also referred to as "fluorinated linear carbonate") can also be suitably used. The number of fluorine atoms contained in the fluorinated linear carbonates, which is not particularly limited as long as it is one or more, is usually six or less, preferably four or less. When the fluorinated linear carbonates have a plurality of fluorine atoms, the fluorine atoms may be bonded to the same carbon or different carbons. Examples of the fluorinated linear carbonates include fluorinated dimethyl carbonate derivatives, fluorinated ethyl methyl carbonate derivatives, and fluorinated diethyl carbonate derivatives.

Examples of the fluorinated dimethyl carbonate derivatives include fluoromethyl methyl carbonate, difluoromethyl methyl carbonate, trifluoromethyl methyl carbonate, bis(fluoromethyl) carbonate, bis(difluoro)methyl carbonate, and bis(trifluoromethyl) carbonate.

Examples of the fluorinated ethyl methyl carbonate derivatives include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate.

Examples of the fluorinated diethyl carbonate derivatives include ethyl-(2-fluoroethyl)carbonate, ethyl-(2,2-difluoroethyl)carbonate, bis(2-fluoroethyl)carbonate, ethyl-(2,2,2-trifluoroethyl)carbonate, 2,2-difluoroethyl-2'-fluoroethyl carbonate, bis(2,2-difluoroethyl)carbonate, 2,2,2-trifluoroethyl-2'-fluoroethyl carbonate, 2,2,2-trifluoroethyl-2',2'-difluoroethyl carbonate, and bis(2,2,2-trifluoroethyl)carbonate.

The linear carbonates may be used alone or in any combination of two or more at any ratio.

The content of linear carbonates is not particularly limited, and is usually 15% by volume or more, preferably 20% by volume or more, more preferably 25% by volume or more with respect to 100% by volume of the nonaqueous solvent. Further, the content is usually 90% by volume or less, preferably 85% by volume or less, more preferably 80% by volume or less. When the content of the linear carbonates is within this range, the viscosity of the nonaqueous electrolytic solution can be within an appropriate range and a decrease in the ion conductivity can be inhibited, and therefore the input/output characteristics and the charging/discharging rate characteristics of the power storage device can be easily within good ranges. In addition, a decrease in the electrical conductivity due to decreased dielectric constant of the nonaqueous electrolytic solution can be avoided, and therefore the input/output characteristics and the charging/discharging rate characteristics of the power storage device can be easily within good ranges.

Further, when certain linear carbonates are combined with a certain content of ethylene carbonate, the battery performance can be significantly improved.

For example, when the selected certain linear carbonates are dimethyl carbonate and ethyl methyl carbonate, the content of ethylene carbonate, which is not particularly limited and may be any value as long as the effects of the present invention are not significantly impaired, is usually 15% by volume or more, preferably 20% by volume or more, and is usually 45% by volume or less, preferably 40% by volume or less, with respect to 100% by volume of the nonaqueous solvent. The content of dimethyl carbonate is usually 20% by volume or more, preferably 30% by volume or more, and is usually 50% by volume or less, preferably 45% by volume or less, with respect to 100% by volume of the nonaqueous solvent. The content of ethyl methyl carbonate is usually 20% by volume or more, preferably 30% by volume or more, and is usually 50% by volume or less, preferably 45% by volume or less, with respect to 100% by volume of the nonaqueous solvent. When the contents are within the above ranges, the low-temperature precipitation temperature of the electrolyte can be lowered, while the viscosity of the nonaqueous electrolytic solution can be decreased to improve the ion conductivity, so that high input/output characteristics can be achieved even at low temperatures.

<1-5-3. Linear Carboxylic Acid Esters>

Examples of the linear carboxylic acid esters include those having 3 to 7 carbons in total in the structural formula.

Specific examples include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate.

Among them, preferred examples include methyl acetate, ethyl acetate, n-propyl acetate, n-butyl acetate, methyl propionate, ethyl propionate, n-propyl propionate, isopropyl propionate, methyl butyrate, and ethyl butyrate, from the viewpoint of improvement of the ion conductivity due to a decrease in the viscosity, and reduction of swelling of the battery during durable use through improvements of characteristics such as cycle characteristics and storage characteristics.

The content of the linear carboxylic acid esters, which is not particularly limited and may be any value as long as the effects of the present invention are not significantly impaired, is usually 1% by volume or more, preferably 2% by volume or more, more preferably 5% by volume or more, still more preferably 8% by volume or more, and is usually 80% by volume or less, preferably 70% by volume or less, with respect to 100% by volume of the nonaqueous solvent. When the content of the linear carboxylic acid esters are within this range, the electrical conductivity of the nonaqueous electrolytic solution can be improved, and the input/output characteristics and the charging/discharging rate characteristics of the power storage device can be easily improved. In addition, an increase in the resistance of the negative electrode can be reduced, and the input/output characteristics and the charging/discharging rate characteristics of the power storage device can be easily within good ranges.

It is noted that the linear carboxylic acid esters are preferably used in combination with the cyclic carbonates, more preferably in combination with the cyclic carbonates and the linear carbonates.

For example, when the cyclic carbonates and the linear carboxylic acid esters are used in combination, the content of the cyclic carbonates, which is not particularly limited and may be any value as long as the effects of the present invention are not significantly impaired, is usually 15% by volume or more, preferably 20% by volume or more, and is usually 45% by volume or less, preferably 40% by volume or less, with respect to 100% by volume of the nonaqueous solvent. The content of the linear carboxylic acid esters are usually 1% by volume or more, preferably 2% by volume or more, and is usually 55% by volume or less, preferably 50% by volume or less.

For example, when the cyclic carbonates, the linear carbonates and the linear carboxylic acid esters are used in combination, the content of the cyclic carbonates, which is not particularly limited and may be any value as long as the effects of the present invention are not significantly impaired, is usually 15% by volume or more, preferably 20% by volume or more, and is usually 45% by volume or less, preferably 40% by volume or less, with respect to 100% by volume of the nonaqueous solvent. The content of the linear carbonates is usually 1% by volume or more, preferably 2% by volume or more, and is usually 84% by volume or less, preferably 80% by volume or less. The content of the linear carboxylic acid esters are usually 20% by volume or more, preferably 30% by volume or more, and is usually 55% by volume or less, preferably 50% by volume or less. Preferably, the contents are within the above ranges from the viewpoints that the low-temperature precipitation temperature of the electrolyte can be lowered, while the viscosity of the nonaqueous electrolytic solution can be decreased to improve the ion conductivity, high input/output characteristics can be achieved even at low temperatures, and the battery swelling can be further suppressed.

<1-5-4. Cyclic Carboxylic Acid Esters>

Examples of the cyclic carboxylic acid esters include those having 3 to 12 carbons in total in the structural formula.

Specific examples include γ-butyrolactone, γ-valerolactone, γ-caprolactone, and ε-caprolactone. Among them, γ-butyrolactone is particularly preferably from the viewpoint of improvement of the battery characteristics due to improvement of degree of dissociation into lithium ions.

The content of the cyclic carboxylic acid esters, which is not particularly limited and may be any value as long as the effects of the present invention are not significantly impaired, is usually 1% by volume or more, preferably 2% by volume or more, more preferably 3% by volume or more, still more preferably 5% by volume or more, and is usually 60% by volume or less, preferably 50% by volume or less, with respect to 100% by volume of the nonaqueous solvent. When the content of the cyclic carboxylic acid esters is within this range, the electrical conductivity of the nonaqueous electrolytic solution can be improved, and the input/output characteristics and the charging/discharging rate characteristics of the power storage device can be easily improved.

In addition, the viscosity of the nonaqueous electrolytic solution can be within an appropriate range, an increase in the negative electrode resistance can be reduced, and the input/output characteristics and the charging/discharging rate characteristics of the power storage device can be easily within good ranges.

<1-5-5. Ether Compounds>

Preferred examples of the ether compounds include linear ethers having 3 to 10 carbon atoms and cyclic ethers having 3 to 6 carbon atoms.

Examples of the linear ethers having 3 to 10 carbon atoms include diethyl ether, di(2-fluoroethyl) ether, di(2,2-difluoroethyl) ether, di(2,2,2-trifluoroethyl) ether, ethyl (2-fluoroethyl) ether, ethyl (2,2,2-trifluoroethyl) ether, ethyl (1,1,2,2-tetrafluoroethyl) ether, (2-fluoroethyl) (2,2,2-trifluoroethyl) ether, (2-fluoroethyl) (1,1,2,2-tetrafluoroethyl) ether, (2,2,2-trifluoroethyl) (1,1,2,2-tetrafluoroethyl) ether, ethyl n-propyl ether, ethyl (3-fluoro-n-propyl) ether, ethyl (3,3,3-trifluoro-n-propyl) ether, ethyl (2,2,3,3-tetrafluoro-n-propyl) ether, ethyl (2,2,3,3,3-pentafluoro-n-propyl) ether, 2-fluoroethyl n-propyl ether, (2-fluoroethyl) (3-fluoro-n-propyl) ether, (2-fluoroethyl) (3,3,3-trifluoro-n-propyl) ether, (2-fluoroethyl) (2,2,3,3-tetrafluoro-n-propyl) ether, (2-fluoroethyl) (2,2,3,3,3-pentafluoro-n-propyl) ether, 2,2,2-trifluoroethyl n-propyl ether, (2,2,2-trifluoroethyl) (3-fluoro-n-propyl) ether, (2,2,2-trifluoroethyl) (3,3,3-trifluoro-n-propyl) ether, (2,2,2-trifluoroethyl) (2,2,3,3-tetrafluoro-n-propyl) ether, (2,2,2-trifluoroethyl) (2,2,3,3,3-pentafluoro-n-propyl) ether, 1,1,2,2-tetrafluoroethyl n-propyl ether, (1,1,2,2-tetrafluoroethyl) (3-fluoro-n-propyl) ether, (1,1,2,2-tetrafluoroethyl) (3,3,3-trifluoro-n-propyl) ether, (1,1,2,2-tetrafluoroethyl) (2,2,3,3-tetrafluoro-n-propyl) ether, (1,1,2,2-tetrafluoroethyl) (2,2,3,3,3-pentafluoro-n-propyl) ether, di-n-propyl ether, (n-propyl) (3-fluoro-n-propyl) ether, (n-propyl) (3,3,3-trifluoro-n-propyl) ether, (n-propyl) (2,2,3,3-tetrafluoro-n-propyl) ether, (n-propyl) (2,2,3,3,3-pentafluoro-n-propyl) ether, di(3-fluoro-n-propyl) ether, (3-fluoro-n-propyl) (3,3,3-trifluoro-n-propyl) ether, (3-fluoro-n-propyl) (2,2,3,3-tetrafluoro-n-propyl) ether, (3-fluoro-n-propyl) (2,2,3,3,3-pentafluoro-n-propyl) ether, di(3,3,3-trifluoro-n-propyl) ether, (3,3,3-trifluoro-n-propyl) (2,2,3,3-tetrafluoro-n-propyl) ether, (3,3,3-trifluoro-n-propyl) (2,2,3,3,3-pentafluoro-n-propyl) ether, di(2,2,3,3-tetrafluoro-n-propyl) ether, (2,2,3,3-tetrafluoro-n-propyl) (2,2,3,3,3-pentafluoro-n-propyl) ether, di(2,2,3,3,3-pentafluoro-n-propyl) ether, di-n-butyl ether, dimethoxymethane, methoxyethoxymethane, methoxy(2-fluoroethoxy)methane, methoxy(2,2,2-trifluoroethoxy)methane, methoxy(1,1,2,2-tetrafluoroethoxy) methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy)(1,1,2,2-tetrafluoroethoxy)methane di(2,2,2-trifluoroethoxy)methane, (2,2,2-trifluoroethoxy)(1,1,2,2-tetrafluoroethoxy)methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy) ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, (2-fluoroethoxy)(2,2,2-trifluoroethoxy)ethane, (2-fluoroethoxy)(1,1,2,2-tetrafluoroethoxy)ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethylene glycol di-n-propyl ether, ethylene glycol di-n-butyl ether, and diethylene glycol dimethyl ether.

Examples of the cyclic ethers having 3 to 6 carbon atoms include tetrahydrofuran, 2-methyltetrahydrofuran, 3-methyltetrahydrofuran, 1,3-dioxane, 2-methyl-1,3-dioxane, 4-methyl-1,3-dioxane, and 1,4-dioxane, and fluorinated compounds thereof.

Among them, dimethoxymethane, diethoxymethane, ethoxymethoxymethane, ethylene glycol di-n-propyl ether, ethylene glycol di-n-butyl ether, and diethylene glycol dimethyl ether are preferable, form the viewpoint of high solvation properties for lithium ion, which can lead to improvement of the ionic dissociation properties. Dimethoxymethane, diethoxymethane, and ethoxymethoxymethane are particularly preferable from the viewpoint that low viscosity and high ion conductivity can be obtained.

The content of the ether compounds, which is not particularly limited and may be any value as long as the effects of the present invention are not significantly impaired, is usually 1% by volume or more, preferably 2% by volume or more, more preferably 3% by volume or more, and is usually 30% by volume or less, preferably 25% by volume or less, more preferably 20% by volume or less, with respect to 100% by volume of the nonaqueous solvent. When the content of the ether compounds is within this range, the effects of improving the degree of dissociation into lithium ions of linear ethers and of improving the ion conductivity due to decreased viscosity can be easily obtained. When the negative electrode active material is carbonaceous materials, the co-insertion event of the linear ethers with lithium ions can be inhibited, and thus the input/output characteristics and the charging/discharging rate characteristics can be within appropriate ranges.

<1-5-6. Sulfone Compounds>

Preferred examples of the sulfone compounds include linear sulfones having 3 to 6 carbons, and linear sulfones having 2 to 6 carbons. The number of the sulfonyl groups in the molecule is preferably 1 or 2.

Examples of the cyclic sulfones include monosulfone compounds such as trimethylene sulfones, tetramethylene sulfones, and hexamethylene sulfones; and disulfone compounds such as trimethylene disulfones, tetramethylene disulfones, and hexamethylene disulfones. From the viewpoint of the dielectric constant and the viscosity, tetramethylene sulfones, tetramethylene disulfones, hexamethylene sulfones, and hexamethylene disulfone are preferable, and tetramethylene sulfones (hereinafter may also be referred to as "sulfolanes") are particularly preferably.

Preferably, the sulfolanes are sulfolane and/or sulfolane derivatives (hereinafter may also be referred to as "sulfolanes," including sulfolane). In the sulfolane derivatives, one or more of the hydrogen atoms bonded to the carbon atoms constituting the sulfolane ring are preferably substituted with fluorine atoms or alkyl groups.

Preferred examples include 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane, and 5-fluoro-3-(trifluoromethyl)sulfolane, from the viewpoint of high ion conductivities and excellent input/output characteristics.

Examples of the linear sulfones include dimethyl sulfone, ethyl methyl sulfone, diethyl sulfone, n-propyl methyl sulfone, n-propyl ethyl sulfone, di-n-propyl sulfone, isopropyl methyl sulfone, isopropyl ethyl sulfone, diisopropyl sulfone, n-butyl methyl sulfone, n-butyl ethyl sulfone, t-butyl methyl sulfone, t-butyl ethyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, perfluoroethyl methyl sulfone, ethyl trifluoroethyl sulfone, ethyl pentafluoroethyl sulfone, di(trifluoroethyl) sulfone, perfluorodiethyl sulfone, fluoromethyl-n-propyl sulfone, difluoromethyl-n-propyl sulfone, trifluoromethyl-n-propyl sulfone, fluoromethyl isopropyl sulfone, difluoromethyl isopropyl sulfone, trifluoromethyl isopropyl sulfone, trifluoroethyl-n-propyl sulfone, trifluoroethyl isopropyl sulfone, pentafluoroethyl-n-propyl sulfone, pentafluoroethyl isopropyl sulfone, trifluoroethyl-n-butyl sulfone, trifluoroethyl-t-butyl sulfone, pentafluoroethyl-n-butyl sulfone, and pentafluoroethyl-t-butyl sulfone.

Particularly preferred examples are dimethyl sulfone, ethyl methyl sulfone, diethyl sulfone, n-propyl methyl sulfone, isopropyl methyl sulfone, n-butyl methyl sulfone, t-butyl methyl sulfone, monofluoromethyl methyl sulfone, difluoromethyl methyl sulfone, trifluoromethyl methyl sulfone, monofluoroethyl methyl sulfone, difluoroethyl methyl sulfone, trifluoroethyl methyl sulfone, pentafluoroethyl methyl sulfone, ethyl monofluoromethyl sulfone, ethyl difluoromethyl sulfone, ethyl trifluoromethyl sulfone, ethyl trifluoroethyl sulfone, ethyl pentafluoroethyl sulfone, trifluoromethyl-n-propyl sulfone, trifluoromethyl isopropyl sulfone, trifluoroethyl-n-butyl sulfone, trifluoroethyl-t-butyl sulfone, trifluoromethyl-n-butyl sulfone, and trifluoromethyl-t-butyl sulfone, from the viewpoint of high ion conductivities and excellent input/output characteristics.

The content of the sulfone compounds is not particularly limited and may be any value as long as the effects of the present invention are not significantly impaired, and is usually 0.3% by volume or more, preferably 0.5% by volume or more, more preferably 1% by volume or more, and is usually 40% by volume or less, preferably 35% by volume or less, more preferably 30% by volume or less with respect to 100% by volume of the nonaqueous solvent. When the content of the sulfone compounds is within this range, effects of improving durabilities such as cycle characteristics and storage characteristics can be easily obtained, the viscosity of the nonaqueous electrolytic solution can be within an appropriate range, reduction of the electrical conductivity can be avoided, and the input/output characteristics and charging/discharging rate characteristics of the power storage device can be within appropriate ranges.

<1-6. Auxiliary Agents>

The nonaqueous electrolytic solution may further contain at least one of cyclic carbonates having carbon-carbon unsaturated bonds (hereinafter may also referred to as "unsaturated cyclic carbonate"), and cyclic carbonates containing fluorine atoms. The nonaqueous electrolytic solution of the present invention may also contain, for example, fluorinated unsaturated cyclic carbonates, cyclic sulfonic acid ester compounds, compounds having cyano groups, diisocyanate compounds, carboxylic anhydrides, overcharge inhibitors, and/or auxiliary agents other than them.

<1-6-1. Carbonates Having at Least One of Carbon-Carbon Unsaturated Bonds and Fluorine Atoms>

The cyclic carbonates having carbon-carbon unsaturated bonds are not particularly limited as long as they are cyclic carbonates having carbon-carbon unsaturated bonds, and any carbonates having carbon-carbon unsaturated bonds may be used. It is noted that the cyclic carbonates having carbon-carbon unsaturated bonds also include cyclic carbonates having substituents having aromatic rings. Methods for producing the unsaturated cyclic carbonates are not particularly limited, and any known method can be selected to produce the unsaturated cyclic carbonates.

Examples of the unsaturated cyclic carbonates include vinylene carbonates, ethylene carbonates substituted with substituents having aromatic rings or carbon-carbon unsaturated bonds, phenyl carbonates, vinyl carbonates, and allyl carbonates.

Examples of the vinylene carbonates include vinylene carbonate, methyl vinylene carbonate, 4,5-dimethyl vinylene carbonate, phenyl vinylene carbonate, 4,5-diphenyl vinylene carbonate, vinyl vinylene carbonate, and allyl vinylene carbonate.

Specific example of the ethylene carbonates substituted with substituents having aromatic rings or carbon-carbon unsaturated bonds include vinyl ethylene carbonate, 4,5-divinyl ethylene carbonate, phenyl ethylene carbonate, 4,5-diphenyl ethylene carbonate, ethinyl ethylene carbonate, and 4,5-diethinyl ethylene carbonate.

Among them, vinylene carbonates, and ethylene carbonates substituted with substituents having aromatic rings or carbon-carbon unsaturated bonds are preferable. In particular, vinylene carbonate, 4,5-diphenyl vinylene carbonate, 4,5-dimethyl vinylene carbonate, vinyl ethylene carbonate, and ethinyl ethylene carbonate are more preferably used in that a stable interface protective film can be formed.

The molecular weights of the unsaturated cyclic carbonates are not particularly limited, and may be any values as long as the effects of the present invention are not significantly impaired. The molecular weights of the unsaturated cyclic carbonates are usually 50 or more, preferably 80 or more, and are usually 250 or less, preferably 150 or less. When the molecular weights are within this range, the solubility of the unsaturated cyclic carbonates in the nonaqueous electrolytic solution can be easily obtained, and the effects of the present invention can be easily and sufficiently exhibited.

The unsaturated cyclic carbonates may be used alone or in any combination of two or more at any ratio. The content of the unsaturated cyclic carbonates is not particularly limited, and may be any content as long as the effects of the present invention are not significantly impaired. The content of the unsaturated cyclic carbonates is usually 0.001% by mass or more, preferably 0.01% by mass or more, more preferably 0.1% by mass or more, still more preferably 0.2% by mass or more, and is usually 10% by mass or less, preferably 8% by mass or less, more preferably 5% by mass or less, with respect to 100% by mass of the nonaqueous electrolytic solution. When the content is within this range, the effects of improving the high-temperature storage characteristics and the cycle characteristics are sufficiently and easily exhibited in the power storage device.

The cyclic carbonates having fluorine atoms (hereinafter may also referred to as "fluorinated cyclic carbonate") are not particularly limited as long as they are cyclic carbonates having fluorine atoms.

The fluorinated cyclic carbonates include cyclic carbonate derivatives bearing an alkylene group having 2 to 6 carbons, such as ethylene carbonate derivatives. The ethylene carbonate derivatives include fluorinated products of ethylene carbonate or ethylene carbonate substituted with an alkyl group (for example, an alkyl group having 1 to 4 carbon(s)). In particular, those having 1 to 8 fluorine atom(s) are preferred.

Specific examples include monofluoroethylene carbonate, 4,4-difluoroethylene carbonate, 4,5-difluoroethylene carbonate, 4-fluoro-4-methyl ethylene carbonate, 4,5-difluoro-4-methyl ethylene carbonate, 4-fluoro-5-methyl ethylene carbonate, 4,4-difluoro-5-methyl ethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethyl ethylene carbonate, 4,5-difluoro-4,5-dimethyl ethylene carbonate, and 4,4-difluoro-5,5-dimethyl ethylene carbonate.

Among them, at least one selected from the group consisting of monofluoroethylene carbonate, 4,4-difluoroethylene carbonate, 4,5-difluoroethylene carbonate and 4,5-difluoro-4,5-dimethyl ethylene carbonate are more preferably used, because high ion conductivity can be obtained and interface protective film can be suitably formed.

The fluorinated cyclic carbonates may be used alone or in any combination of two or more at any ratio. The content of the fluorinated cyclic carbonates, which is not limited and may be any value as long as the effects of the present invention are not significantly impaired, is usually 0.001% by mass or more, preferably 0.01% by mass or more, more preferably 0.1% by mass or more, and is usually 85% by mass or less, preferably 80% by mass or less, more preferably 75% by mass or less, with respect to 100% by mass of the nonaqueous electrolytic solution.

The fluorinated cyclic carbonates may be used as a primary solvent or a secondary solvent of the nonaqueous electrolytic solution. The content of the fluorinated cyclic carbonates when used as primary solvent is usually 8% by mass or more, preferably 10% by mass or more, more preferably 12% by mass or more, and is usually 85% by mass or less, preferably 80% by mass or less, more preferably 75% by mass or less, with respect to 100% by mass of the nonaqueous electrolytic solution. When the content is within this range, the effects of improving the cycle characteristics can be sufficiently and easily exhibited in the power storage device, and reduction of the discharge capacity retention rate can be easily avoided.

The content of the fluorinated cyclic carbonates when used as secondary solvent is usually 0.001% by mass or more, preferably 0.01% by mass or more, more preferably 0.1% by mass or more, and is usually 8% by mass or less, preferably 6% by mass or less, more preferably 5% by mass or less, with respect to 100% by mass of the nonaqueous electrolytic solution. When the content is within this range, cycle characteristics and high-temperature storage characteristics can be sufficiently and easily exhibited in the power storage device.

<1-6-2. Fluorinated Unsaturated Cyclic Carbonates>

As the fluorinated cyclic carbonates, cyclic carbonates having unsaturated bonds and fluorine atoms (hereinafter may also referred to as "fluorinated unsaturated cyclic carbonate") can be used. The fluorinated unsaturated cyclic carbonates are not particularly limited. In particular, those containing one or two fluorine atom(s) are preferred. Methods for producing the fluorinated unsaturated cyclic carbonates are not particularly limited, and any known method can be selected to produce the unsaturated cyclic carbonates.

The fluorinated unsaturated cyclic carbonates include vinylene carbonate derivatives, and ethylene carbonate derivatives substituted with substituents having aromatic rings or carbon-carbon unsaturated bonds.

Examples of the vinylene carbonate derivatives include 4-fluorovinylene carbonate, 4-fluoro-5-methyl vinylene carbonate, 4-fluoro-5-phenyl vinylene carbonate, and 4,5-difluoroethylene carbonate.

Examples of the ethylene carbonate derivative substituted with substituents having aromatic rings or carbon-carbon unsaturated bonds include 4-fluoro-4-vinyl ethylene carbonate, 4-fluoro-5-vinyl ethylene carbonate, 4,4-difluoro-4-vinyl ethylene carbonate, 4,5-difluoro-4-vinyl ethylene carbonate, 4-fluoro-4,5-divinyl ethylene carbonate, 4,5-difluoro-4,5-divinyl ethylene carbonate, 4-fluoro-4-phenyl ethylene carbonate, 4-fluoro-5-phenyl ethylene carbonate, 4,4-difluoro-5-phenyl ethylene carbonate, and 4,5-difluoro-4-phenyl ethylene carbonate.

The molecular weights of the fluorinated unsaturated cyclic carbonates are not particularly limited, and may be any values as long as the effects of the present invention are not significantly impaired. The molecular weights of the fluorinated unsaturated cyclic carbonates are usually 50 or more, preferably 80 or more, and is usually 250 or less, preferably 150 or less. When the molecular weights are within this range, the solubility of the fluorinated cyclic carbonates in the nonaqueous electrolytic solution can be easily obtained, and the effects of the present invention can be easily exhibited.

The fluorinated unsaturated cyclic carbonates may be used alone or in any combination of two or more at any ratio. The content of the fluorinated unsaturated cyclic carbonates is not particularly limited, and may be any value as long as the effects of the present invention are not significantly impaired. The content of the fluorinated unsaturated cyclic carbonates is usually 0.01% by mass or more, preferably 0.1% by mass or more, more preferably 0.2% by mass or more, and is usually 5% by mass or less, preferably 4% by mass or less, more preferably 3% by mass or less, with respect to 100% by mass of the nonaqueous electrolytic solution. When the content is within this range, the effect of improving the cycle characteristics is sufficiently and easily exhibited in the power storage device.

<1-6-3. Cyclic Sulfonate Compounds>

The cyclic sulfonate compounds that can be used in the nonaqueous electrolytic solution are not particularly limited for their types, and compounds represented by the following formula (2) are preferable. Methods for producing the cyclic sulfonate compounds are not particularly limited, and any known method can be selected for the production.

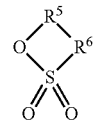

(2)

In the formula (2), $R^5$ and $R^6$ each independently represent an organic group comprising atoms selected from the group consisting of carbon atoms, hydrogen atoms, nitrogen atoms, oxygen atoms, sulfur atoms, phosphorus atoms and halogen atoms, and optionally contain —O—SO$_2$— and/or unsaturated bonds.

Preferably, $R^5$ and $R^6$ each independently represent an organic group comprising atoms selected from carbon atoms, hydrogen atoms, oxygen atoms, and sulfur atoms. Particularly preferably, at least one of $R^5$ and $R^6$, or an organic group formed from $R^5$ and $R^6$ represents an organic group having a hydrocarbon group having 1 to 3 carbon atom(s) and —O—SO$_2$—.

The molecular weights of the cyclic sulfonate compounds are not particularly limited, and may be any values as long as the effects of the present invention are not significantly impaired. The molecular weights of the cyclic sulfonate compounds are usually 100 or more, preferably 110 or more, and are usually 250 or less, preferably 220 or less. When the molecular weights are within this range, the solubility of the cyclic sulfonate compounds in the nonaqueous electrolytic solution can be easily obtained, and the effects of the present invention can be easily exhibited.

Specific examples of the compounds represented by formula (2) include:

sultone compounds such as 1,3-propanesultone, 1-fluoro-1,3-propanesultone, 2-fluoro-1,3-propanesultone, 3-fluoro-1,3-propanesultone, 1-methyl-1,3-propanesultone, 2-methyl-1,3-propanesultone, 3-methyl-1,3-propanesultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1, 3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butanesultone, 1-fluoro-1,4-butanesultone, 2-fluoro-1,4-butanesultone, 3-fluoro-1,4-butanesultone, 4-fluoro-1,4-butanesultone, 1-methyl-1,4-butanesultone, 2-methyl-1,4-butanesultone, 3-methyl-1,4-butanesultone, 4-methyl-1,4-butanesultone, 1-butene-1,4-sultone, 2-butene-1,4-sultone, 3-butene-1,4-sultone, 1-fluoro-1-butene-1,4-sultone, 2-fluoro-1-butene-1,4-sultone, 3-fluoro-1-butene-1,4-sultone, 4-fluoro-1-butene-1,4-sultone, 1-fluoro-2-butene-1,4-sultone, 2-fluoro-2-butene-1,4-sultone, 3-fluoro-2-butene-1,4-sultone, 4-fluoro-2-butene-1,4-sultone, 1-fluoro-3-butene-1,4-sultone, 2-fluoro-3-butene-1,4-sultone, 3-fluoro-3-butene-1,4-sultone, 4-fluoro-3-butene-1,4-sultone, 1-methyl-1-butene-1,4-sultone, 2-methyl-1-butene-1,4-sultone, 3-methyl-1-butene-1,4-sultone, 4-methyl-1-butene-1,4-sultone, 1-methyl-2-butene-1,4-sultone, 2-methyl-2-butene-1,4-sultone, 3-methyl-2-butene-1,4-sultone, 4-methyl-2-butene-1,4-sultone, 1-methyl-3-butene-1,4-sultone, 2-methyl-3-butene-1, 4-sultone, 3-methyl-3-butene-1,4-sultone, 4-methyl-3-butene-1,4-sultone, 1,5-pentanesultone, 1-fluoro-1,5-pentanesultone, 2-fluoro-1,5-pentanesultone, 3-fluoro-1,5-pentanesultone, 4-fluoro-1,5-pentanesultone, 5-fluoro-1,5-pentanesultone, 1-methyl-1,5-pentanesultone, 2-methyl-1,5- pentanesultone, 3-methyl-1,5-pentanesultone, 4-methyl-1,5-pentanesultone, 5-methyl-1,5-pentanesultone, 1-pentene-1,5-sultone, 2-pentene-1,5-sultone, 3-pentene-1,5-sultone, 4-pentene-1,5-sultone, 1-fluoro-1-pentene-1,5-sultone, 2-fluoro-1-pentene-1,5-sultone, 3-fluoro-1-pentene-1,5-sultone, 4-fluoro-1-pentene-1,5-sultone, 5-fluoro-1-pentene-1,5-sultone, 1-fluoro-2-pentene-1,5-sultone, 2-fluoro-2-pentene-1,5-sultone, 3-fluoro-2-pentene-1,5-sultone, 4-fluoro-2-pentene-1,5-sultone, 5-fluoro-2-pentene-1,5-sultone, 1-fluoro-3-pentene-1,5-sultone, 2-fluoro-3-pentene-1,5-sultone, 3-fluoro-3-pentene-1,5-sultone, 4-fluoro-3-pentene-1,5-sultone, 5-fluoro-3-pentene-1,5-sultone, 1-fluoro-4-pentene-1,5-sultone, 2-fluoro-4-pentene-1,5-sultone, 3-fluoro-4-pentene-1,5-sultone, 4-fluoro-4-pentene-1,5-sultone, 5-fluoro-4-pentene-1,5-sultone, 1-methyl-1-pentene-1,5-sultone, 2-methyl-1-pentene-1,5-sultone, 3-methyl-1-pentene-1,5-sultone, 4-methyl-1-pentene-1,5-sultone, 5-methyl-1-pentene-1,5-sultone, 1-methyl-2-pentene-1,5-sultone, 2-methyl-2-pentene-1,5-sultone, 3-methyl-2-pentene-1,5-sultone, 4-methyl-2-pentene-1,5-sultone, 5-methyl-2-pentene-1,5-sultone, 1-methyl-3-pentene-1,5-sultone, 2-methyl-3-pentene-1,5-sultone, 3-methyl-3-pentene-1,5-sultone, 4-methyl-3-pentene-1,5-sultone, 5-methyl-3-pentene-1,5-sultone, 1-methyl-4-pentene-1,5-sultone, 2-methyl-4-pentene-1,5-sultone, 3-methyl-4-pentene-1,5-sultone, 4-methyl-4-pentene-1,5-sultone, 5-methyl-4-pentene-1,5-sultone, 1,2-oxathiolane-2,2-dioxide-4-yl-acetate, 1,2-oxathiolane-2,2-dioxide-4-yl-propionate, 5-methyl-1,2-oxathiolane-2,2-dioxide-4-one-2,2-dioxide, and 5,5-dimethyl-1,2-oxathiolane-2,2-dioxide-4-one-2,2-dioxide;

sulfate compounds such as methylene sulfate, ethylene sulfate, and propylene sulfate;

disulfonate compounds such as methylene methane disulfonate, and ethylene methane disulfonate;

nitrogen-containing compounds such as 1,2,3-oxathiazolidine-2,2-dioxide, 3-methyl-1,2,3-oxathiazolidine-2,2-dioxide, 3H-1,2,3-oxathiazole-2,2-dioxide, 5H-1,2,3-oxathiazole-2,2-dioxide, 1,2,4-oxathiazolidine-2,2-dioxide, 4-methyl-1,2,4-oxathiazolidine-2,2-dioxide, 3H-1,2,4-oxathiazole-2,2-dioxide, 5H-1,2,4-oxathiazole-2,2-dioxide, 1,2,5-oxathiazolidine-2,2-dioxide, 5-methyl-1,2,5-oxathiazolidine-2,2-dioxide, 3H-1,2,5-oxathiazole-2,2-dioxide, 5H-1,2,5-oxathiazole-2,2-dioxide, 1,2,3-oxathiazinane-2,2-dioxide, 3-methyl-1,2,3-oxathiazinane-2,2-dioxide, 5,6-dihydro-1,2,3-oxathiazine-2,2-dioxide, 1,2,4-oxathiazinane-2,2-dioxide, 4-methyl-1,2,4-oxathiazinane-2,2-dioxide, 5,6-dihydro-1,2,4-oxathiazine-2,2-dioxide, 3,6-dihydro-1,2,4-oxathiazine-2,2-dioxide, 3,4-dihydro-1,2,4-oxathiazine-2,2-dioxide, 1,2,5-oxathiazinane-2,2-dioxide, 5-methyl-1,2,5-oxathiazinane-2,2-dioxide, 5,6-dihydro-1,2,5-oxathiazine-2,2-dioxide, 3,6-dihydro-1,2,5-oxathiazine-2,2-dioxide, 3,4-dihydro-1,2,5-oxathiazine-2,2-dioxide, 1,2,6-oxathiazinane-2,2-dioxide, 6-methyl-1,2,6-oxathiazinane-2,2-dioxide, 5,6-dihydro-1,2,6-oxathiazine-2,2-dioxide, 3,4-dihydro-1,2,6-oxathiazine-2,2-dioxide, and 5,6-dihydro-1,2,6-oxathiazine-2,2-dioxide; and phosphorus-containing compound such as 1,2,3-oxathiaphoslane-2,2-dioxide, 3-methyl-1,2,3-oxathiaphoslane-2,2-dioxide, 3-methyl-1,2,3-oxathiaphoslane-2,2,3-trioxide, 3-methoxy-1,2,3-oxathiaphoslane-2,2,3-trioxide, 1,2,4-oxathiaphoslane-2,2-dioxide, 4-methyl-1,2,4-oxathiaphoslane-2,2-dioxide, 4-methyl-1,2,4-oxathiaphoslane-2,2,4-trioxide, 4-methoxy-1,2,4-oxathiaphoslane-2,2,4-trioxide, 1,2,5-oxathiaphoslane-2,2-dioxide, 5-methyl-1,2,5-oxathiaphoslane-2,2-dioxide, 5-methyl-1,2,5-oxathiaphoslane-2,2,5-trioxide, 5-methoxy-1,2,5-oxathiaphoslane-2,2,5-trioxide, 1,2,3-oxathiaphosphinane-2,2-dioxide, 3-methyl-1,2,3-oxathiaphosphinane-2,2-dioxide, 3-methyl-1,2,3-oxathiaphosphinane-2,2,3-trioxide, 3-methoxy-1,2,3-oxathiaphosphinane-2,2,3-trioxide, 1,2,4-oxathiaphosphinane-2,2-dioxide, 4-methyl-1,2,4-oxathiaphosphinane-2,2-dioxide, 4-methyl-1,2,4-oxathiaphosphinane-2,2,3-trioxide, 4-methyl-1,5,2,4-dioxathiaphosphinane-2,4-dioxide, 4-methoxy-1,5,2,4-dioxathiaphosphinane-2,4-dioxide, 3-methoxy-1,2,4-oxathiaphosphinane-2,2,3-trioxide, 1,2,5-oxathiaphosphinane-2,2-dioxide, 5-methyl-1,2,5-oxathiaphosphinane-2,2-dioxide, 5-methyl-1,2,5-oxathiaphosphinane-2,2,3-trioxide, 5-methoxy-1,2,5-oxathiaphosphinane-2,2,3-trioxide, 1,2,6-oxathiaphosphinane-2,2-dioxide, 6-methyl-1,2,6-oxathiaphosphinane-2,2-dioxide, 6-methyl-1,2,6-oxathiaphosphinane-2,2,3-trioxide, and 6-methoxy-1,2,6-oxathiaphosphinane-2,2,3-trioxide.

Among them, the compounds represented by formula (2) are preferably 1,3-propanesultone, 1-fluoro-1,3-propanesultone, 2-fluoro-1,3-propanesultone, 3-fluoro-1,3-propanesultone, 1-propene-1,3-sultone, 1-fluoro-1-propene-1,3-sultone, 2-fluoro-1-propene-1,3-sultone, 3-fluoro-1-propene-1,3-sultone, 1,4-butanesultone, methylene methane disulfonate, and ethylene methane disulfonate from the viewpoint of improvement of storage characteristics, more preferably 1,3-propanesultone, 1-fluoro-1,3-propanesultone, 2-fluoro-1,3-propanesultone, 3-fluoro-1,3-propanesultone, and 1-propene-1,3-sultone.

The cyclic sulfonate compounds may be used alone or in any combination of two or more at any ratio. The content of the cyclic sulfonate compounds with respect to the whole nonaqueous electrolytic solution is not limited, and may be any value as long as the effects of the present invention are not significantly impaired, and is usually 0.001% by mass or more, preferably 0.01% by mass or more, more preferably 0.1% by mass or more, still more preferably 0.3% by mass or more, and is usually 10% by mass or less, preferably 5% by mass or less, more preferably 3% by mass or less, with respect to 100% by mass of the nonaqueous electrolytic solution. The content is preferably within this range from the viewpoints of improvements of the cycle characteristics, the high-temperature storage characteristics, and the like, as well as of suppression of battery swelling.

<1-6-4. Compounds Having Cyano Groups>

The compounds having cyano groups that can be used in the nonaqueous electrolytic solution are not particularly limited for their types as long as they are compounds having cyano groups in the molecules, and compounds represented by the following formula (3) are preferable. Methods for producing the compounds having cyano groups are not particularly limited, and any known method can be selected for the production.

$$(NC-T)_V-U \qquad (3)$$

In the formula (3), T represents an organic group comprising atoms selected from the group consisting of carbon atoms, nitrogen atoms, oxygen atoms, sulfur atoms, and phosphorus atoms, and U represents an optionally-substituted organic group having 1 to 10 carbon atom(s) and having a V-valence. V is an integer of 1 or more. When V is 2 or more, T may be the same or different.

The molecular weights of the compounds having cyano groups are not particularly limited, and may be any value as long as the effects of the present invention are not significantly impaired. The molecular weights of the compounds having cyano groups are usually 40 or more, preferably 45 or more, more preferably 50 or more, and are usually 200 or less, preferably 180 or less, more preferably 170 or less.

When the molecular weights are within this range, the solubility of the compounds having cyano groups in the nonaqueous electrolytic solution can be easily obtained, and the effects of the present invention can be easily exhibited.

Specific examples of the compounds represented by formula (3) include:

compounds having one cyano group such as acetonitrile, propionitrile, butyronitrile, isobutyronitrile, valeronitrile, isovaleronitrile, lauronitrile 2-methylbutyronitrile, trimethylacetonitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, 2-hexenenitrile, fluoroacetonitrile, difluoroacetonitrile, trifluoroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, 3,3'-oxydipropionitrile, 3,3'-thiodipropionitrile, 1,2,3-propanetricarbonitrile, 1,3,5-pentanetricarbonitrile, and pentafluoropropionitrile;

compounds having two cyano groups such as malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, trimethylsuccinonitrile, tetramethylsuccinonitrile, 3,3'-(ethylenedioxy)dipropionitrile, and 3,3'-(ethylenedithio)dipropionitrile;

compounds having three cyano groups such as 1,2,3-tris(2-cyanoethoxy)propane, and tris(2-cyanoethyl) amine;

cyanate compounds such as methyl cyanate, ethyl cyanate, propyl cyanate, butyl cyanate, pentyl cyanate, hexyl cyanate, heptyl cyanate;

sulfur-containing compounds such as methyl thiocyanate, ethyl thiocyanate, propyl thiocyanate, butyl thiocyanate, pentyl thiocyanate, hexyl thiocyanate, heptyl thiocyanate, methanesulfonyl cyanide, ethanesulfonyl cyanide, propanesulfonyl cyanide, butanesulfonyl cyanide, pentanesulfonyl cyanide, hexanesulfonyl cyanide, heptanesulfonyl cyanide, methyl sulfurocyanidate, ethyl sulfurocyanidate, propyl sulfurocyanidate, butyl sulfurocyanidate, pentyl sulfurocyanidate, hexyl sulfurocyanidate, and heptyl sulfurocyanidate; and phosphorus-containing compounds such as cyanodimethylphosphine, cyanodimethylphosphine oxide, cyanomethylphosphinic acid methyl ester, cyanomethylphosphinous acid methyl ester, dimethylphosphinic cyanide, dimethylphosphinous cyanide, cyanophosphonic acid dimethyl ester, cyanophosphorous acid dimethyl ester, methylphosphonic acid cyanomethyl ester, methylphosphorous acid cyanomethyl ester, phosphoric acid cyanodimethyl ester and phosphorous acid cyanodimethyl ester.

Among them, acetonitrile, propionitrile, butyronitrile, isobutyronitrile, valeronitrile, isovaleronitrile, lauronitrile, crotononitrile, 3-methylcrotononitrile, malononitrile, succinonitrile, glutaronitrile, adiponitrile, pimelonitrile, suberonitrile, azelanitrile, sebaconitrile, undecanedinitrile, and dodecanedinitrile are preferable from the viewpoint of improvement of the storage characteristics, and compounds having two cyano groups malononitrile, succinonitrile, glutaronitrile, adiponitrile, pimelonitrile, suberonitrile, azelanitrile, sebaconitrile, undecanedinitrile, and dodecanedinitrile are more preferable.

The compounds having cyano groups may be used alone or in any combination of two or more at any ratio. The content of the compounds having cyano groups with respect to the whole nonaqueous electrolytic solution, which is not limited and may be any value as long as the effects of the present invention are not significantly impaired, is usually 0.001% by mass or more, preferably 0.01% by mass or more, more preferably 0.1% by mass or more, still more preferably 0.3% by mass or more, and is usually 10% by mass or less, preferably 5% by mass or less, more preferably 3% by mass or less, with respect to 100% by mass of the nonaqueous electrolytic solution. When the content satisfies this range, effects such as input/output characteristics, charging/discharging rate characteristics, cycle characteristics, and high-temperature storage characteristics are further improved.

<1-6-5. Diisocyanate Compounds>

Preferably, the diisocyanate compounds used in the nonaqueous electrolytic solution of the present invention are compounds represented by the following formula (4) having a nitrogen atom only as a constituent atom of an isocyanate group in the molecule, and having two isocyanate groups.

$$\text{NCO—X—NCO} \tag{4}$$

In the above formula (4), X represents an organic group comprising a cyclic structure, and having 1 or more and 15 or less carbon atoms. The carbon number of X is usually 2 or more, preferably 3 or more, more preferably 4 or more, and is usually 14 or less, preferably 12 or less, more preferably 10 or less, still more preferably 8 or less.

In the formula (4), X particularly preferably represents an organic group having 4 to 15 carbon atoms and also having one or more cycloalkylene groups having 4 to 6 carbons or aromatic hydrocarbon groups. In this case, hydrogen atoms in the cycloalkylene groups may be substituted with methyl groups or ethyl groups. Since the above-described diisocyanate compounds having a cyclic structure are sterically bulky molecules, side reactions on the positive electrode are not likely to occur, so that the cycle characteristics and the high-temperature storage characteristics are improved.

The bonding site for the group to be bonded to the cycloalkylene group or the aromatic hydrocarbon group is not particularly limited, and may be any of meta position, para position, and ortho position. The meta position or the para position is preferable because it results in appropriate cross-linking distance between films, which is advantegeous for the ion conductivity, and the resistance is likely to be reduced. The cycloalkylene groups preferably are cyclopentylene groups or cyclohexylene groups from the viewpoint that the diisocyanate compounds themselves are unlikely to cause side reactions, and more preferably cyclohexylene groups from the viewpoint that the resistance is likely to be reduced due to the influence of the molecular mobility.

Preferably, an alkylene group having 1 to 3 carbon atom(s) exists between the cycloalkylene groups or the aromatic hydrocarbon groups and the isocyanate groups. The existence of the alkylene group results in a sterically bulky structure, and thus side reactions on the positive electrode are unlikely to occur. Furthermore, when the carbon number of the alkylene group is 1 to 3, the proportion of the isocyanate groups to the total molecular weight does not change significantly, and thus the effects of the present invention are markedly and easily exhibited.

The molecular weights of the diisocyanate compounds represented by the above formula (4) are not particularly limited, and may be any values as long as the effects of the present invention are not significantly impaired. The molecular weights are usually 80 or more, preferably 115 or more, more preferably 170 or more, and are usually 300 or less, preferably 230 or less. When the molecular weights are within this range, the solubility of the diisocyanate compounds in the nonaqueous electrolytic solution can be easily obtained, and the effects of the present invention can be easily exhibited.

Specific examples of the diisocyanate compounds include:

cycloalkane ring-containing diisocyanates such as 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, 1,2-bis(isocyanatomethyl)cyclohexane, 1,3-bis(isocyanatomethyl)cyclohexane, 1,4-bis(isocyanatomethyl)cyclohexane, dicyclohexylmethane-2,2'-diisocyanate, dicyclohexylmethane-2,4'-diisocyanate, dicyclohexylmethane-3,3'-diisocyanate, and dicyclohexylmethane-4,4'-diisocyanate; and aromatic ring-containing diisocyanates such as 1,2-phenylenediisocyanate, 1,3-phenylenediisocyanate, 1,4-phenylenediisocyanate, tolylene-2,3-diisocyanate, tolylene-2,4-diisocyanate, tolylene-2,5-diisocyanate, tolylene-2,6-diisocyanate, tolylene-3,4-diisocyanate, tolylene-3,5-diisocyanate, 1,2-bis(isocyanatomethyl)benzene, 1,3-bis(isocyanatomethyl)benzene, 1,4-bis(isocyanatomethyl)benzene, 2,4-diisocyanatobiphenyl, 2,6-diisocyanatobiphenyl, 2,2'-diisocyanatobiphenyl, 3,3'-diisocyanatobiphenyl, 4,4'-diisocyanato-2-methylbiphenyl, 4,4'-diisocyanato-3-methylbiphenyl, 4,4'-diisocyanato-3,3'-dimethylbiphenyl, 4,4'-diisocyanatodiphenylmethane, 4,4'-diisocyanato-2-methyldiphenylmethane, 4,4'-diisocyanato-3-methyldiphenylmethane, 4,4'-diisocyanato-3,3'-dimethyldiphenylmethane, 1,5-diisocyanatonaphthalene, 1,8-diisocyanatonaphthalene, 2,3-diisocyanatonaphthalene, 1,5-bis(isocyanatomethyl)naphthalene, 1,8-bis(isocyanatomethyl)naphthalene, and 2,3-bis(isocyanatomethyl)naphthalene.

Among them, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, 1,2-bis(isocyanatomethyl)cyclohexane, 1,3-bis(isocyanatomethyl)cyclohexane, 1,4-bis(isocyanatomethyl)cyclohexane, 1,2-phenylenediisocyanate, 1,3-phenylenediisocyanate, 1,4-phenylenediisocyanate, 1,2-bis(isocyanatomethyl)benzene, 1,3-bis(isocyanatomethyl)benzene, 1,4-bis(isocyanatomethyl)benzene, 2,4-diisocyanatobiphenyl, and 2,6-diisocyanatobiphenyl are preferable, because a dense and complex film is formed on the negative electrode, and thus the battery durability is improved.

Among them, 1,3-bis(isocyanatomethyl)cyclohexane, 1,4-bis(isocyanatomethyl)cyclohexane, 1,3-phenylenediisocyanate, 1,4-phenylenediisocyanate, 1,2-bis(isocyanatomethyl)benzene, 1,3-bis(isocyanatomethyl)benzene, 1,4-bis(isocyanatomethyl)benzene are more preferably, because a film advantageous for the ion conductivity is formed on the negative electrode due to the symmetry of the molecule and thus the battery characteristics is further improved.

The diisocyanate compounds may be used alone or in any combination of two or more at any ratio.

The content of the diisocyanate compound that can be used in the nonaqueous electrolytic solution is not particularly limited and may be any value as long as the effects of the present invention are not significantly impaired. The content is usually 0.001% by mass or more, preferably 0.01% by mass or more, more preferably 0.1% by mass or more, still more preferably 0.3% by mass or more, and is usually 5% by mass or less, preferably 4% by mass or less, more preferably 3% by mass or less, still more preferably 2% by mass or less, with respect to 100% by mass of the nonaqueous electrolytic solution. When the content is within this range, durabilities such as cycle characteristics and storage characteristics can be improved, and the effects of the present invention can be sufficiently exhibited.

Methods for producing the diisocyanate compounds are not particularly limited, and any known method can be selected for the production. Also, commercially available products may be used.

<1-6-6. Carboxylic Anhydrides>

Preferably, the carboxylic anhydrides that can be used in the nonaqueous electrolytic solution are compounds represented by the following formula (5). Methods for producing the carboxylic anhydrides are not particularly limited, and any known method can be selected for the production.

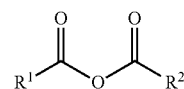

(5)

In the formula (5), $R^1$ and $R^2$ each independently represent a hydrocarbon group which may have substituents and has 1 or more and 15 or less carbon atom(s). $R^1$ and $R^2$ may be linked together to form a cyclic structure.

$R^1$ and $R^2$ are not particularly limited for their types as long as they are monovalent hydrocarbon groups. For example, $R^1$ and $R^2$ may be aliphatic hydrocarbon groups or aromatic hydrocarbon groups, or may be combinations of aliphatic hydrocarbon groups and aromatic hydrocarbon groups. The aliphatic hydrocarbon groups may be saturated hydrocarbon group, or may have unsaturated bonds (carbon-carbon double bonds or carbon-carbon triple bonds). In addition, the aliphatic hydrocarbon groups may be linear or cyclic. When being linear, the aliphatic hydrocarbon groups may be linear or branched chain. Further, the aliphatic hydrocarbon groups may be combinations of linear and cyclic aliphatic hydrocarbon groups. $R^1$ and $R^2$ may be the same or different.

When $R^1$ and $R^2$ are linked together to form a cyclic structure, the hydrocarbon groups formed by bonding between $R^1$ and $R^2$ are divalent. The divalent hydrocarbon groups are not particularly limited for their types. That is, the divalent hydrocarbon groups may be aliphatic groups or aromatic groups, or may be combinations of aliphatic groups and aromatic groups. When being aliphatic groups, the divalent hydrocarbon groups may be saturated groups or unsaturated groups. Also, the divalent hydrocarbon groups may be linear groups or cyclic groups, and when being linear groups, may be linear groups or branched chain groups. Further, the divalent hydrocarbon groups may be combinations of linear groups and cyclic groups.

When the hydrocarbon groups of $R^1$ and $R^2$ have substituents, the types of the substituents are not particularly limited as long as they are not against the spirit of the present invention. Examples include halogen atoms such as fluorine, chlorine, bromine, and iodine atoms. Preferably, the substituents are fluorine atoms. Examples of substituents other than halogen atoms include those having functional groups such as ester groups, cyano groups, carbonyl groups, and ether groups, and cyano groups and carbonyl groups are preferable. The hydrocarbon groups of $R^1$ and $R^2$ may have only one or two or more of the substituents. When $R^1$ and $R^2$ have two or more substituents, the substituents may be the same or different.

The carbon number of each of the hydrocarbon groups of $R^1$ and $R^2$ is usually one or more, and is usually 15 or less, preferably 12 or less, more preferably 10 or less, still more preferably 9 or less. When $R^1$ and $R^2$ are linked together to form a divalent hydrocarbon group, the carbon number of the divalent hydrocarbon group is usually one or more, and is usually 15 or less, preferably 13 or less, more preferably 10 or less, still more preferably 8 or less. When the hydrocarbon groups of $R^1$ and $R^2$ have substituents containing carbon atoms, the total carbon number of $R^1$ and $R^2$ including the substituents are preferably satisfies this range.

Next, acid anhydrides represented by the above formula (5) are illustrated in detail. It is noted that in illustrations shown below, the term "analogs" refers to acid anhydrides obtained by partially substituting the structure of the illustrated acid anhydrides with another structure without departing from the spirit of the present invention. For example, the analogs include dimers, trimers, tetramers, and the like composed of a plurality of acid anhydrides, or, structural isomers, such as those having substituents with the same carbon number but having branched chains, and those in which substituents are bonded to different sites of acid anhydrides.

First, specific examples of the acid anhydrides in which $R^1$ and $R^2$ are the same are listed below.

Specific examples of acid anhydrides in which $R^1$ and $R^2$ are linear alkyl groups include acetic anhydride, propionic anhydride, butanoic anhydride, 2-methylpropionic anhydride, 2,2-dimethylpropionic anhydride, 2-methylbutanoic anhydride, 3-methylbutanoic anhydride, 2,2-dimethylbutanoic anhydride, 2,3-dimethylbutanoic anhydride, 3,3-dimethylbutanoic anhydride, 2,2,3-trimethylbutanoic anhydride, 2,3,3-trimethylbutanoic anhydride, 2,2,3,3-tetramethylbutanoic anhydride, and 2-ethylbutanoic anhydride, and analogs thereof.

Specific examples of acid anhydrides in which $R^1$ and $R^2$ are cyclic alkyl groups include cyclopropanecarboxylic anhydride, cyclopentanecarboxylic anhydride, and cyclohexane carboxylic anhydride, and analogs thereof.

Specific examples of acid anhydrides in which $R^1$ and $R^2$ are alkenyl groups include acrylic anhydride, 2-methylacrylic anhydride, 3-methylacrylic anhydride, 2,3-dimethylacrylic anhydride, 3,3-dimethylacrylic anhydride, 2,3,3-trimethylacrylic anhydride, 2-phenylacrylic anhydride, 3-phenylacrylic anhydride, 2,3-diphenylacrylic anhydride, 3,3-diphenylacrylic anhydride, 3-butenoic anhydride, 2-methyl-3-butenoic anhydride, 2,2-dimethyl-3-butenoic anhydride, 3-methyl-3-butenoic anhydride, 2-methyl-3-methyl-3-butenoic anhydride, 2,2-dimethyl-3-methyl-3-butenoic anhydride, 3-pentenoic anhydride, 4-pentenoic anhydride, 2-cyclopentenecarboxylic anhydride, 3-cyclopentenecarboxylic anhydride, and 4-cyclopentenecarboxylic anhydride, and analogs thereof.

Specific examples of acid anhydrides in which $R^1$ and $R^2$ are alkynyl groups include propynoic anhydride, 3-phenylpropynoic anhydride, 2-butynoic anhydride, 2-pentynoic anhydride, 3-butynoic anhydride, 3-pentynoic anhydride, and 4-pentynoic anhydride, and analogs thereof.

Specific examples of acid anhydrides in which $R^1$ and $R^2$ are aryl groups include benzoic anhydride, 4-methylbenzoic anhydride, 4-ethylbenzoic anhydride, 4-tert-butylbenzoic anhydride, 2-methylbenzoic anhydride, 2,4,6-trimethylbenzoic anhydride, 1-naphthalenecarboxylic anhydride, and 2-naphthalenecarboxylic anhydride, and analogs thereof.

As main examples of acid anhydrides in which $R^1$ and $R^2$ are substituted with halogen atoms, examples of acid anhydrides substituted with fluorine atoms are listed below. Acid anhydrides obtained by substituting a part or all of the fluorine atoms with chlorine atoms, bromine atoms, and iodine atoms are also included in the exemplary compounds.

Examples of acid anhydrides in which $R^1$ and $R^2$ are linear alkyl groups substituted with halogen atoms include fluoroacetic anhydride, difluoroacetic anhydride, trifluoroacetic anhydride, 2-fluoropropionic anhydride, 2,2-difluoropropionic anhydride, 2,3-difluoropropionic anhydride, 2,2,3-trifluoropropionic anhydride, 2,3,3-trifluoropropionic anhydride, 2,2,3,3-tetrapropionic anhydride, 2,3,3,3-tetrapropionic anhydride, 3-fluoropropionic anhydride, 3,3-difluoropropionic anhydride, 3,3,3-trifluoropropionic anhydride, and perfluoropropionic anhydride, and analogs thereof.

Examples of acid anhydrides in which $R^1$ and $R^2$ are cyclic alkyl groups substituted with halogen atoms include 2-fluorocyclopentanecarboxylic anhydride, 3-fluorocyclopentanecarboxylic anhydride, and 4-fluorocyclopentanecarboxylic anhydride, and analogs thereof.

Examples of acid anhydrides in which $R^1$ and $R^2$ are alkenyl groups substituted with halogen atoms include 2-fluoroacrylic anhydride, 3-fluoroacrylic anhydride, 2,3-difluoroacrylic anhydride, 3,3-difluoroacrylic anhydride, 2,3,3-trifluoroacrylic anhydride, 2-(trifluoromethyl)acrylic anhydride, 3-(trifluoromethyl)acrylic anhydride, 2,3-bis(trifluoromethyl)acrylic anhydride, 2,3,3-tris(trifluoromethyl)acrylic anhydride, 2-(4-fluorophenyl)acrylic anhydride, 3-(4-fluorophenyl)acrylic anhydride, 2,3-bis(4-fluorophenyl)acrylic anhydride, 3,3-bis(4-fluorophenyl)acrylic anhydride, 2-fluoro-3-butenoic anhydride, 2,2-difluoro-3-butenoic anhydride, 3-fluoro-2-butenoic anhydride, 4-fluoro-3-butenoic anhydride, 3,4-difluoro-3-butenoic anhydride, and 3,3,4-trifluoro-3-butenoic anhydride, and analogs thereof.

Examples of acid anhydrides in which $R^1$ and $R^2$ are alkynyl groups substituted with halogen atoms include 3-fluoro-2-propynoic anhydride, 3-(4-fluorophenyl)-2-propynoic anhydride, 3-(2,3,4,5,6-pentafluorophenyl)-2-propynoic anhydride, 4-fluoro-2-butynoic anhydride, 4,4-difluoro-2-butynoic anhydride, and 4,4,4-trifluoro-2-butynoic anhydride, and analogs thereof.

Examples of acid anhydrides in which $R^1$ and $R^2$ are aryl groups substituted with halogen atoms include 4-fluorobenzoic anhydride, 2,3,4,5,6-pentafluorobenzoic anhydride, and 4-trifluoromethylbenzoic anhydride, and analogs thereof.

Examples of acid anhydrides in which $R^1$ and $R^2$ have substituents having functional groups such as ester, nitrile, ketone, and ether include methoxyformic anhydride, ethoxyformic anhydride, methyloxalic anhydride, ethyloxalic anhydride, 2-cyanoacetic anhydride, 2-oxopropionic anhydride, 3-oxobutanoic anhydride, 4-acetylbenzoic anhydride, methoxyacetic anhydride, and 4-methoxybenzoic anhydride, and analogs thereof.

Next, specific examples of acid anhydride in which $R^1$ and $R^2$ are different each other are listed below.

As combinations of $R^1$ and $R^2$, all combinations of the examples listed above and analogs thereof are conceivable. Representative examples are listed below.

Examples of combinations of linear alkyl groups include acetic propionic anhydride, acetic butanoic anhydride, butanoic propionic anhydride, and acetic 2-methylpropionic anhydride.

Examples of combinations of a linear alkyl group and a cyclic alkyl group include acetic cyclopentanoic anhydride, acetic cyclohexanoic anhydride, and cyclopentanoic propionic anhydride.

Examples of combinations of a linear alkyl group and an alkenyl group include acetic acrylic anhydride, acetic 3-methylacrylic anhydride, acetic 3-butenoic anhydride, and acrylic propionic anhydride.

Examples of combinations of a linear alkyl group and an alkynyl group include acetic propynoic anhydride, acetic 2-butynoic anhydride, acetic 3-butynoic anhydride, acetic 3-phenylpropynoic anhydride, and propionic propynoic anhydride.

Examples of combinations of a linear alkyl group and an aryl group include acetic benzoic anhydride, acetic 4-methylbenzoic anhydride, acetic 1-naphthalenecarboxylic anhydride, and benzoic propionic anhydride.

Examples of combinations of a linear alkyl group and a hydrocarbon group having functional groups include acetic fluoroacetic anhydride, acetic trifluoroacetic anhydride, acetic 4-fluorobenzoic anhydride, fluoroacetic propionic anhydride, acetic alkyloxalic anhydride, acetic 2-cyanoacetic anhydride, acetic 2-oxopropionic anhydride, acetic methoxyacetic anhydride, and methoxyacetic propionic anhydride.

Examples of combinations of cyclic alkyl groups include cyclopentanoic cyclohexanoic anhydride.

Examples of combinations of a cyclic alkyl group and an alkenyl group include acrylic cyclopentanoic anhydride, 3-methylacrylic cyclopentanoic anhydride, 3-butenoic cyclopentanoic anhydride, and acrylic cyclohexanoic anhydride.

Examples of combinations of a cyclic alkyl group and an alkynyl group include propynoic cyclopentanoic anhydride, 2-butynoic cyclopentanoic anhydride, and propynoic cyclohexanoic anhydride.

Examples of combinations of a cyclic alkyl group and an aryl group include benzoic cyclopentanoic anhydride, 4-methylbenzoic cyclopentanoic anhydride, and benzoic cyclohexanoic anhydride.

Examples of combinations of a cyclic alkyl group and a hydrocarbon group having functional groups include fluoroacetic cyclopentanoic anhydride, cyclopentanoic trifluoroacetic anhydride, cyclopentanoic 2-cyanoacetic anhydride, cyclopentanoic methoxyacetic anhydride, and cyclohexanoic fluoroacetic anhydride.

Examples of combinations of alkenyl groups include acrylic 2-methylacrylic anhydride, acrylic 3-methylacrylic anhydride, acrylic 3-butenoic anhydride, and 2-methylacrylic 3-methylacrylic anhydride.

Examples of combinations of an alkenyl group and an alkynyl group include acrylic propynoic anhydride, acrylic 2-butynoic anhydride, and 2-methylacrylic propynoic anhydride.

Examples of combinations of an alkenyl group and an aryl group include acrylic benzoic anhydride, acrylic 4-methylbenzoic anhydride, and 2-methylacrylic benzoic anhydride.

Examples of combinations of an alkenyl group and a hydrocarbon group having functional groups include acrylic fluoroacetic anhydride, acrylic trifluoroacetic anhydride, acrylic 2-cyanoacetic anhydride, acrylic methoxyacetic anhydride, and 2-methylacrylic fluoroacetic anhydride.

Examples of combinations of alkynyl groups include propynoic 2-butynoic anhydride, propynoic 3-butynoic anhydride, and 2-butynoic 3-butynoic anhydride.

Examples of combinations of an alkynyl group and an aryl group include benzoic propynoic anhydride, 4-methylbenzoic propynoic anhydride, and benzoic 2-butynoic anhydride.

Examples of combinations of an alkynyl group and a hydrocarbon group having functional groups include propynoic fluoroacetic anhydride, propynoic trifluoroacetic anhydride, propynoic 2-cyanoacetic anhydride, propynoic methoxyacetic anhydride, and 2-butynoic fluoroacetic anhydride.

Examples of combinations of aryl groups include benzoic 4-methylbenzoic anhydride, benzoic 1-naphthalenecarboxylic anhydride, and 4-methylbenzoic 1-naphthalenecarboxylic anhydride.

Examples of combinations of an aryl group and a hydrocarbon group having functional groups include benzoic fluoroacetic anhydride, benzoic trifluoroacetic anhydride, benzoic 2-cyanoacetic anhydride, benzoic methoxyacetic anhydride, and 4-methylbenzoic fluoroacetic anhydride.

Examples of combinations of hydrocarbon groups having functional groups include fluoroacetic trifluoroacetic anhydride, fluoroacetic 2-cyanoacetic anhydride, fluoroacetic methoxyacetic anhydride, and trifluoroacetic 2-cyanoacetic anhydride.

Among the above-described acid anhydrides forming a linear structure, preferred acid anhydrides are acetic anhydride, propionic anhydride, 2-methylpropionic anhydride, cyclopentanecarboxylic anhydride, cyclohexanecarboxylic anhydride, acrylic anhydride, 2-methylacrylic anhydride, 3-methylacrylic anhydride, 2,3-dimethylacrylic anhydride, 3,3-dimethylacrylic anhydride, 3-butenoic anhydride, 2-methyl-3-butenoic anhydride, propynoic anhydride, 2-butynoic anhydride, benzoic anhydride, 2-methylbenzoic anhydride, 4-methylbenzoic anhydride, 4-tert-butylbenzoic anhydride, trifluoroacetic anhydride, 3,3,3-trifluoropropionic anhydride, 2-(trifluoromethyl)acrylic anhydride, 2-(4-fluorophenyl)acrylic anhydride, 4-fluorobenzoic anhydride, 2,3,4,5,6-pentafluorobenzoic anhydride, methoxyformic anhydride, and ethoxyformic anhydride.

More preferred acid anhydrides are acrylic anhydride, 2-methylacrylic anhydride, 3-methylacrylic anhydride, benzoic anhydride, 2-methylbenzoic anhydride, 4-methylbenzoic anhydride, 4-tert-butylbenzoic anhydride, 4-fluorobenzoic anhydride, 2,3,4,5,6-pentafluorobenzoic anhydride, methoxyformic anhydride, and ethoxyformic anhydride.

These compounds are preferable from the viewpoint that they can particularly improve the charging/discharging rate characteristics, the input/output characteristics, and the impedance characteristics after durability test, by appropriately forming bonds with lithium oxalate to form a film having excellent durability.

Next, specific examples of acid anhydrides in which $R^1$ and $R^2$ are linked together to form a cyclic structure are listed below.

First, specific examples of acid anhydrides in which $R^1$ and $R^2$ are linked together to form a 5-membered ring structure include succinic anhydride, 4-methylsuccinic anhydride, 4,4-dimethylsuccinic anhydride, 4,5-dimethylsuccinic anhydride, 4,4,5-trimethylsuccinic anhydride, 4,4,5,5-tetramethylsuccinic anhydride, 4-vinylsuccinic anhydride, 4,5-divinylsuccinic anhydride, 4-phenylsuccinic anhydride, 4,5-diphenylsuccinic anhydride, 4,4-diphenylsuccinic anhydride, citraconic anhydride, maleic anhydride, 4-methylmaleic anhydride, 4,5-dimethylmaleic anhydride, 4-phenylmaleic anhydride, 4,5-diphenylmaleic anhydride, itaconic anhydride, 5-methylitaconic anhydride, 5,5-dimethylitaconic anhydride, phthalic anhydride, and 3,4,5,6-tetrahydrophthalic anhydride, and analogs thereof.

Specific examples of acid anhydrides in which $R^1$ and $R^2$ are linked together to form a 6-membered ring structure include cyclohexane-1,2-dicarboxylic anhydride, 4-cyclohexene-1,2-dicarboxylic anhydride, and glutaric anhydride, and analogs thereof.

Specific examples of acid anhydrides in which $R^1$ and $R^2$ are linked together to form a cyclic structure other than those described above include 5-norbornene-2,3-dicarboxylic anhydride, cyclopentanetetracarboxylic dianhydride, pyromellitic dianhydride, and diglycolic anhydride, and analogs thereof.

Specific examples of acid anhydrides in which $R^1$ and $R^2$ are linked together to form a cyclic structure and are substituted with halogen atoms include 4-fluorosuccinic anhydride, 4,4-difluorosuccinic anhydride, 4,5-difluorosuccinic anhydride, 4,4,5-trifluorosuccinic anhydride, 4,4,5,5-tetrafluorosuccinic anhydride, 4-fluoromaleic anhydride, 4,5-difluoromaleic anhydride, 5-fluoroitaconic anhydride, and 5,5-difluoroitaconic anhydride, and analogs thereof.

Among the above-described acid anhydrides in which $R^1$ and $R^2$ are bonded, preferred acid anhydrides are succinic anhydride, 4-methylsuccinic anhydride, 4-vinylsuccinic anhydride, 4-phenylsuccinic anhydride, citraconic anhydride, maleic anhydride, 4-methylmaleic anhydride, 4-phenylmaleic anhydride, itaconic anhydride, 5-methylitaconic anhydride, glutaric anhydride, phthalic anhydride, cyclohexane-1,2-dicarboxylic anhydride, 5-norbornene-2,3-dicarboxylic anhydride, cyclopentanetetracarboxylic dianhydride, pyromellitic dianhydride, 4-fluorosuccinic anhydride, 4-fluoromaleic anhydride, and 5-fluoroitaconic anhydride.

More preferred acid anhydrides are succinic anhydride, 4-methylsuccinic anhydride, 4-vinylsuccinic anhydride, citraconic anhydride, cyclohexane-1,2-dicarboxylic anhydride, 5-norbornene-2,3-dicarboxylic anhydride, cyclopentanetetracarboxylic dianhydride, pyromellitic dianhydride, and 4-fluorosuccinic anhydride. These compounds are preferable from the viewpoint that these compounds can particularly improve the capacity retention rate after durability test, by appropriately forming bonds with lithium oxalate to form a film having excellent durability.

The molecular weights of the carboxylic anhydrides, which are not particularly limited and may be any values as long as the effects of the present invention are not significantly impaired, are usually 90 or more, preferably 95 or more, and are usually 300 or less, preferably 200 or less. When the molecular weights of the carboxylic anhydrides are within this range, an increase in the viscosity of the electrolytic solution can be inhibited, and the film density can be optimized, so that the durability can be appropriately improved.

Methods for producing the carboxylic anhydrides are not particularly limited, and any known method can be selected for the production. The carboxylic anhydrides described above may be used alone or in any combination of two or more at any ratio in the nonaqueous electrolytic solution of the present invention.

The content of the carboxylic anhydrides with respect to the nonaqueous electrolytic solution is not particularly limited and may be any value as long as the effects of the present invention are not significantly impaired. The concentration of the carboxylic anhydrides contained is usually 0.01% by mass or more, preferably 0.1% by mass or more, and is usually 5% by mass or less, preferably 3% by mass or less, with respect to 100% by mass of the nonaqueous electrolytic solution. When the content of the carboxylic anhydrides is within this range, the effects of improving the cycle characteristics can be easily exhibited, and the suitable responsiveness can be obtained, so that the battery characteristics can be easily improved.

<1-6-7. Overcharge Inhibitors>

Overcharge inhibitors can be used in the nonaqueous electrolytic solution to effectively prevent the battery from explosion and fire when the power storage device is in a state such as overcharged.

Examples of the overcharge inhibitors include aromatic compounds such as biphenyl, alkylbiphenyl, terphenyl, partially hydrogenated products of terphenyl, cyclohexylbenzene, t-butylbenzene, t-amylbenzene, diphenyl ether, dibenzofuran, diphenyl cyclohexane, and 1,1,3-trimethyl-3-phenylindan; partially fluorinated products of the above-described aromatic compounds, such as 2-fluorobiphenyl, o-cyclohexyl fluorobenzene, and p-cyclohexyl fluorobenzene; fluorine-containing anisole compounds such as 2,4-difluoroanisole, 2,5-difluoroanisole, 2,6-difluoroanisole, and 3,5-difluoroanisole; aromatic acetates such as 3-propylphenyl acetate, 2-ethylphenyl acetate, benzyl phenylacetate, methyl phenylacetate, benzyl acetate, and phenethyl phenylacetate; and aromatic carbonates such as diphenyl carbonate, and methyl phenyl carbonate. Among them, biphenyl, alkylbiphenyl, terphenyl, partially hydrogenated products of terphenyl, cyclohexylbenzene, t-butylbenzene, t-amylbenzene, diphenyl ether, dibenzofuran, diphenyl cyclohexane, 1,1,3-trimethyl-3-phenylindan, 3-propylphenyl acetate, 2-ethylphenyl acetate, benzyl phenylacetate, methyl phenylacetate, benzyl acetate, phenethyl phenylacetate, diphenyl carbonate, and methyl phenyl carbonate are preferable.

These may be used alone or in combination of two or more. When two or more overcharge inhibitors are used in combination, a combination of cyclohexylbenzene and t-butylbenzene or t-amylbenzene, a combination of at least one selected from aromatic compounds containing no oxygen such as biphenyl, alkylbiphenyl, terphenyl, partially hydrogenated products of terphenyl, cyclohexylbenzene, t-butylbenzene, and t-amylbenzene, and at least one selected from oxygen-containing aromatic compounds such as diphenyl ether and dibenzofuran are particularly preferable from the point of balance between overcharge prevention characteristics and high-temperature storage characteristics.

The content of the overcharge inhibitors is not particularly limited, and may be any value as long as the effects of the present invention are not significantly impaired. The content of the overcharge inhibitors is usually 0.1% by mass or more, preferably 0.2% by mass or more, more preferably 0.3% by mass or more, still more preferably 0.5% by mass or more, and is usually 5% by mass or less, preferably 4.8% by mass or less, more preferably 4.5% by mass or less, with respect to 100% by mass of the nonaqueous electrolytic solution. When the content is within this range, the effects of the overcharge inhibitors can be easily and sufficiently exhibited, and battery characteristics such as high-temperature storage characteristics can be improved.

<1-6-8. Other Auxiliary Agents>

The nonaqueous electrolytic solution can contain known auxiliary agents other than those describe above (hereinafter may be also referred to as "other auxiliary agents"). Examples of the other auxiliary agents include:

carbonate compounds such as erythritan carbonate, spiro-bis-dimethylene carbonate, and methoxyethyl methyl carbonate;

triple bond-containing compounds such as methyl-2-propynyl oxalate, ethyl-2-propynyl oxalate, bis(2-propynyl) oxalate, 2-propynyl acetate, 2-propynyl formate, 2-propynyl methacrylate, di(2-propynyl) glutarate, methyl-2-propynyl carbonate, ethyl-2-propynyl carbonate, bis(2-propynyl) carbonate, 2-butyne-1,4-diyl dimethanesulfonate, 2-butyne-1,4-diyl diethanesulfonate, 2-butyne-1,4-diyl diformate, 2-butyne-1,4-diyl diacetate, 2-butyne-1,4-diyl dipropionate, 4-hexadiyne-1,6-diyl dimethanesulfonate, 2-propynyl methanesulfonate, 1-methyl-2-propynyl methanesulfonate, 1,1-dimethyl-2-propynyl methanesulfonate, 2-propynyl ethanesulfonate, 2-propynyl vinylsulfonate, 2-propynyl 2-(diethoxyphosphoryl) acetate, 1-methyl-2-propynyl 2-(diethoxyphosphoryl)acetate, and 1,1-dimethyl-2-propynyl 2-(diethoxyphosphoryl)acetate;

spiro compounds such as 2,4,8,10-tetraoxaspiro[5.5]undecane, and 3,9-divinyl-2,4,8,10-tetraoxaspiro[5.5]undecane;

sulfur-containing compounds such as ethylene sulfite, methyl fluorosulfonate, ethyl fluorosulfonate, methyl methanesulfonate, ethyl methanesulfonate, busulfan, sulfolene, ethylene sulfate, vinylene sulfate, diphenyl sulfone, N,N-dimethylmethanesulfonamide, N,N-diethylmethanesulfonamide, trimethylsilyl methyl sulfate, trimethylsilyl ethyl sulfate, and 2-propynyl trimethylsilyl sulfate;

isocyanate compounds such as 2-isocyanatoethyl acrylate, 2-isocyanatoethyl methacrylate, 2-isocyanatoethyl crotonate, 2-(2-isocyanatoethoxy)ethyl acrylate, 2-(2-isocyanatoethoxy)ethyl methacrylate, and 2-(2-isocyanatoethoxy)ethyl crotonate;

nitrogen-containing compounds such as 1-methyl-2-pyrrolidinone, 1-methyl-2-piperidone, 3-methyl-2-oxazolidinone, 1,3-dimethyl-2-imidazolidinone and N-methylsuccinimide;

hydrocarbon compounds such as heptane, octane, nonane, decane, and cycloheptane;

fluorine-containing aromatic compounds such as fluorobenzene, difluorobenzene, hexafluorobenzene, benzotrifluoride, pentafluorophenyl methanesulfonate, pentafluorophenyl trifluoromethanesulfonate, pentafluorophenyl acetate, pentafluorophenyl trifluoroacetate, and methyl pentafluorophenyl carbonate;

silane compounds such as tris(trimethylsilyl) borate, tris(trimethoxysilyl) borate, tris(trimethylsilyl) phosphate, tris(trimethoxysilyl) phosphate, dimethoxyaluminoxytrimethoxysilane, diethoxyaluminoxytriethoxysilane, dipropoxyaluminoxytriethoxysilane, dibutoxyaluminoxytrimethoxysilane, dibutoxyaluminoxytriethoxysilane, tetrakis(trimethylsiloxydo)titanium, and tetrakis(triethylsiloxydo)titanium;

ester compounds such as 2-propynyl 2-(methanesulfonyloxy)propionate, 2-methyl 2-(methanesulfonyloxy)propionate, 2-ethyl 2-(methanesulfonyloxy)propionate, 2-propynyl methanesulfonyloxyacetate, 2-methyl methanesulfonyloxyacetate, and 2-ethyl methanesulfonyloxyacetate; and lithium salts such as lithium ethylmethyloxycarbonylphosphonate, lithium ethylethyloxycarbonylphosphonate, lithium ethyl-2-propynyloxycarbonylphosphonate, lithium ethyl-1-methyl-2-propynyloxycarbonylphosphonate, and lithium ethyl-1,1-dimethyl-2-propynyloxycarbonylphosphonate.

These may be used alone or in combination of two or more. When the other auxiliary agents are added, the capacity retention characteristics after high-temperature storage and cycle characteristics can be improved.

The content of the other auxiliary agents is not particularly limited, and may be any value as long as the effects of the present invention are not significantly impaired. The content of the other auxiliary agents is usually 0.01% by mass or more, preferably 0.1% by mass or more, more preferably 0.2% by mass or more, and is usually 5% by mass or less, preferably 3% by mass or less, more preferably 1% by mass or less, with respect to 100% by mass of the nonaqueous electrolytic solution. When the content is within this range, the effects of the other auxiliary agents can be easily and sufficiently exhibited, and battery characteristics such as high-load discharge characteristics can be improved.

The nonaqueous electrolytic solution described above encompasses those existing inside the nonaqueous electrolyte battery according to one embodiment of the present invention. Specifically, the case of a nonaqueous electrolytic solution in a nonaqueous electrolyte battery obtained by separately synthesizing the components of the nonaqueous electrolytic solution, such as lithium salts, solvents, and auxiliary agents, preparing the nonaqueous electrolytic solution from the components which are substantially isolated, and injecting it into a battery separately built by a method described below; the case where the same composition as a nonaqueous electrolytic solution is obtained by separately placing the components of the nonaqueous electrolytic solution in a battery and mixing them in the battery; and the case where the same composition as a nonaqueous electrolytic solution is obtained by generating compounds constituting the nonaqueous electrolytic solution in a nonaqueous electrolyte battery are encompassed.

<2. Power Storage Device>

In another embodiment of the first aspect of the present invention, any power storage device comprising a positive electrode, a negative electrode, and the above-described nonaqueous electrolytic solution according to one embodiment of the present invention can be used. More specifically, the power storage device typically comprises a positive electrode having a current collector and a positive electrode active material layer formed on the current collector, a negative electrode having a current collector and a negative electrode active material layer formed on the current collector and capable of occluding and discharging ions, and the above-described nonaqueous electrolytic solution according to one embodiment of the present invention.

Examples of the power storage device include lithium batteries (as used herein, the term "lithium battery" is a generic term for lithium primary batteries and lithium secondary batteries), multivalent cation batteries, metal-air secondary batteries, secondary batteries using s-block metals other than the above, lithium-ion capacitors, and electric double-layer capacitors. In particular, the power storage device is preferably a nonaqueous electrolyte secondary battery, more preferably a lithium secondary battery or a lithium-ion capacitor, still more preferably a lithium secondary battery.

<2-1. Battery Configuration>

The configuration of the power storage device is the same as that of conventionally known power storage devices except for the nonaqueous electrolytic solution described above. The power storage device typically has a structure in which a positive electrode and a negative electrode are stacked via a porous film (separator) impregnated with the nonaqueous electrolytic solution and are stored in an exterior case (exterior package).

Thus, the nonaqueous electrolyte secondary battery may have any shape, including cylindrical, rectangular, laminated, coin-shaped, and large-capacity batteries.

<2-2. Nonaqueous Electrolytic Solution>

As a nonaqueous electrolytic solution, the nonaqueous electrolytic solution described above is used. It is noted that the nonaqueous electrolytic solution described above can be combined with other nonaqueous electrolytic solutions without departing from the scope and spirit of the invention.

<2-3. Negative Electrode>

The negative electrode has a negative electrode active material layer on a current collector, which negative electrode active material layer contains a negative electrode active material. Hereinafter, the negative electrode active material will be described.

Any negative electrode active materials capable of electrochemically occluding and discharging s-block metal ions such as lithium ion, sodium ion, potassium ion, and magnesium ion can be used. Specific examples include carbonaceous materials, metal alloy materials, and s-block metal-containing metal composite oxide materials. These may be used alone or in any combination of two or more.

<2-3-1. Carbonaceous Material>

Preferred examples of the carbonaceous materials used as the negative electrode active material include those selected from:
(1) natural graphite;
(2) non-graphitizable carbon;
(3) carbonaceous materials obtained by heat treating synthetic carbonaceous materials and synthetic graphite materials at a temperature of 400 to 3200° C. once or more.
(4) carbonaceous materials which allow the negative electrode active material layer to comprise at least two or more carbonaceous matters with different crystallinities and/or to have an interface between the carbonaceous matters with different crystallinities;
(5) carbonaceous materials which allow the negative electrode active material layer to comprise at least two or more carbonaceous matters with different orientations and/or to have an interface between the carbonaceous matters with different orientations, from the viewpoint of good balance between the initial irreversible capacity and the high-current-density charge/discharge characteristics. The carbonaceous materials (1) to (5) may be used alone or in any combination of two or more at any ratio.

Specific examples of the synthetic carbonaceous materials and the synthetic graphite materials described in (3) above include natural graphite, coal coke, petroleum coke, coal pitch, petroleum pitch, and those prepared by oxidizing these pitches; needle coke, pitch coke, and carbon materials prepared by partially graphitizing these cokes; pyrolysates of organic matters such as furnace black, acetylene black, and pitch carbon fiber; carbonizable organic matters and carbides thereof; and solutions prepared by dissolving carbonizable organic matters in low molecular weight organic solvents such as benzene, toluene, xylene, quinoline, and n-hexane, and carbides thereof.

<2-3-2. Structure, Physical Properties, and Preparation Method of Carbonaceous Material>

With regard to the nature of the carbonaceous material, the negative electrode containing the carbonaceous material, the electrode formation method, the current collector, and the power storage device, it is desirable to simultaneously satisfy any one or more of the following items (1) to (13).

(1) X-ray Parameters

The d value (interlayer distance) between the lattice planes (002 planes) of carbonaceous material, as determined by X-ray diffraction according to the Gakushin method, is usually 0.335 to 0.340 nm, particularly preferably 0.335 to 0.338 nm, more particularly preferably 0.335 to 0.337 nm. The crystallite size (Lc) as determined by X-ray diffraction according to the Gakushin method is usually 1.0 nm or more, preferably 1.5 nm or more, particularly preferably 2 nm or more.

(2) Volume-based Average Particle Diameter

The volume-based average particle diameter (median diameter) of the carbonaceous material, as determined by laser diffraction/scattering method, is usually 1 μm or more, preferably 3 μm or more, still more preferably 5 μm or more, particularly preferably 7 μm or more, and usually 100 μm or less, preferably 50 μm or less, more preferably 40 μm or less, still more preferably 30 μm or less, particularly preferably 25 μm or less.

The volume-based average particle diameter is determined by dispersing a carbon powder in a 0.2% by mass of aqueous solution (about 10 mL) of polyoxyethylene (20) sorbitan monolaurate as a surfactant, using a laser diffraction/scattering particle diameter distribution analyzer (e.g., Horiba LA-700). The median diameter determined by the measurement is defined as the volume-based average particle diameter of the carbonaceous material used in the present invention.

(3) Raman R Value and Raman Half Width

The Raman R value of the carbonaceous material as determined by argon ion laser Raman spectrum analysis is usually 0.01 or more, preferably 0.03 or more, more preferably 0.1 or more, and is usually 1.5 or less, preferably 1.2 or less, more preferably 1 or less, particularly preferably 0.5 or more.

When the Raman R value is below the above range, the crystallinity of the particle surface may be too high, so that interlayer sites for the intercalation of Li during charging and discharging may be decreased. In other words, the charge acceptance may be decreased. It is noted that when the carbonaceous material applied to a current collector is pressed to increase the density of the negative electrode, the crystals tend to be oriented in a direction parallel to the electrode plate, which may lead to reduced load characteristics. On the other hand, when the Raman R value is above this range, the crystallinity of the particle surface may be reduced, and thus the reactivity with the nonaqueous electrolytic solution may be increased, so that the efficiency may be decreased or gas generation may be increased.

The Raman half width at near 1580 $cm^{-1}$ of the carbonaceous material is, although not particularly limited to, usually 10 $cm^{-1}$ or more, preferably 15 $cm^{-1}$ or more, and usually 100 $cm^{-1}$ or less, preferably 80 $cm^{-1}$ or less, more preferably 60 $cm^{-1}$ or less, particularly preferably 40 $cm^{-1}$ or less.

When the Raman half width is below the above range, the crystallinity of the particle surface may be too high, so that interlayer sites for the intercalation of Li during charging and discharging may be decreased. In other words, the charge acceptance may be decreased. It is noted that when the carbonaceous material applied to a current collector is pressed to increase the density of the negative electrode, the crystals tend to be oriented in a direction parallel to the electrode plate, which may lead to reduced load characteristics. On the other hand, when the Raman half width is above this range, the crystallinity of the particle surface may be reduced, and thus the reactivity with the nonaqueous electrolytic solution may be increased, so that the efficiency may be decreased or gas generation may be increased.

A Raman spectrum is obtained using a Raman spectrometer (for example, JASCO Corporation Raman Spectrometer) by allowing the sample to free-fall into the measurement cell to fill the cell and analyzing the sample while applying an argon ion laser beam to the surface of the sample in the cell and while rotating the cell in a plane perpendicular to the laser beam. With respect to the obtained Raman spectrum, the intensity IA of a peak PA around 1580 $cm^{-1}$ and the intensity IB of a peak PB around 1360 $cm^{-1}$ are measured and the ratio R of the intensities (R=IB/IA) is calculated. The Raman R value calculated in the measurement is defined as the Raman R value of the carbonaceous material in the present invention. The half width of the peak PA around 1580 cm$^{-1}$ in the obtained Raman spectrum is measured, and this is defined as the Raman half width of the carbonaceous material in the present invention.

The conditions of the Raman measurement described above are as follows:
argon ion laser wavelength: 514.5 nm
laser power on the sample: 15 to 25 mW
resolution: 10 to 20 cm$^{-1}$
measurement range: 1100 cm$^{-1}$ to 1730 cm$^{-1}$
analyses of Raman R value and Raman half width: background processing
smoothing: simple average, 5-point convolution.

(4) BET Specific Surface Area

The BET specific surface area value of the carbonaceous material as measured by BET method is usually 0.1 m$^2$/g or more, preferably 0.7 m$^2$/g or more, more preferably 1.0 m$^2$/g or more, particularly preferably 1.5 m$^2$/g or more, and is usually 100 m$^2$/g or less, preferably 25 m$^2$/g or less, more preferably 15 m$^2$/g or less, particularly preferably 10 m$^2$/g or less.

When a carbonaceous material with a BET specific surface area value below the range is used as the negative electrode material, the lithium acceptability during charging tends to be poor, and lithium is likely to be deposited on the electrode surface, and thus the stability can be reduced. On the other hand, when the BET specific surface area value of the carbonaceous material used as the negative electrode material is above this range, the reactivity with the non-aqueous electrolytic solution may be increased, and thus the gas generation tends to be increased, which leads to difficulty in obtaining preferred battery.

The specific surface area is measured by BET method using a surface area meter (for example, an automatic surface area measuring apparatus manufactured by Okura Riken) by preliminarily drying the sample at 350° C. under a stream of nitrogen for 15 minutes and then analyzing it by flowing nitrogen gas adsorption (BET single point method) using a nitrogen-helium mixed gas prepared so that the pressure of nitrogen relative to the atmospheric pressure is exactly 0.3. The specific surface area determined in the measurement is defined as the BET specific surface area of the carbonaceous material in the present invention.

(5) Circularity

The circularity, as measured as the degree of spherical shape of the carbonaceous material, is preferably in the range described below. The circularity is defined as "Circularity=(Circumferential length of equivalent circle having equal area to projection of particle)/(Actual circumferential length of projection of particle)". When the circularity is 1, the particle is theoretically spherical.

The circularity of particles of the carbonaceous material having particle diameters in the range of 3 to 40 μm is desirably as close to 1 as possible, and is preferably 0.1 or more, more preferably 0.5 or more, still more preferably 0.8 or more, particularly preferably 0.85 or more, most preferably 0.9 or more.

The high-current-density charge/discharge characteristics improve as the circularity increases. Thus, when the circularity is below this range, the filling property of the negative electrode active material may be reduced, the resistance between particles may be increased, and thus the short-time high-current-density charge/discharge characteristics may be decreased.

The circularity is measured using a flow-type particle image analyzer (for example, Sysmex FPIA). About 0.2 g of the sample is dispersed in a 0.2% by mass of aqueous solution (about 50 mL) of polyoxyethylene (20) sorbitan monolaurate as a surfactant, then the dispersion is irradiated with 28 kHz ultrasonic waves at an output of 60 W for 1 minute, and then particles having particle diameters in the range of 3 to 40 μm are analyzed while setting the detection range to 0.6 to 400 μm. The circularity determined in the measurement is defined as the circularity of the carbonaceous material in the present invention.

The circularity may be increased by any method without limitation. A spheronization treatment is preferable because the obtained spheronized particles can form an electrode having a uniform shape of the voids between the particles. Examples of the spheronization treatment include mechanical spheronization methods by application of shear force or compressive force, and mechanical/physical treatment methods in which a plurality of fine particles are unified with a binder or by the adhesion of the particles themselves.

(6) Tapped Density

The tapped density of the carbonaceous material is usually 0.1 g/cm$^3$ or more, preferably 0.5 g/cm$^3$ or more, more preferably 0.7 g/cm$^3$ or more, particularly preferably 1 g/cm$^3$ or more, and is preferably 2 g/cm$^3$ or less, more preferably 1.8 g/cm$^3$ or less, particularly preferably 1.6 g/cm$^3$ or less.

When a carbonaceous material with a tapped density below this range is used as the negative electrode, the packing density may hardly be increased and a high-capacity battery may not be obtained. On the other hand, when the tapped density is above this range, there may be too few voids between particles in the electrode, making it difficult to ensure conductivity between the particles and leading to difficulty in obtaining preferred battery characteristics.

The tapped density is measured by allowing the particles to fall into a 20 cm$^3$ tapping cell through a sieve having a mesh opening of 300 μm until the sample reaches the upper end of the cell, and tapping the cell 1000 times with a slide stroke of 10 mm with use of a powder density meter (for example, Seishin Enterprise Tap Denser). The tapped density is calculated based on the volume and the mass of the sample. The tapped density calculated in the measurement is defined as the tapped density of the carbonaceous material in the present invention.

(7) Orientation Ratio

The orientation ratio of the carbonaceous material is usually 0.005 or more, preferably 0.01 or more, more preferably 0.015 or more, and is usually 0.67 or less. When the orientation ratio is below this range, the high-density charge/discharge characteristics can be deteriorated. The upper limit of the above range is the theoretical upper limit of the orientation ratio of the carbonaceous materials.

The orientation ratio is measured by X-ray diffractometry on a press-molded sample. The sample weighing 0.47 g is charged into a molding machine with a diameter of 17 mm and is compressed at 58.8 MN/m$^2$. The obtained molded product is set with clay so that the plane of the sample is on the same level as the plane of the measurement sample holder, and then an X-ray diffraction measurement is carried out. Based on the obtained peak intensities of (110) diffraction and (004) diffraction of carbon, the ratio represented by (110) diffraction peak intensity/(004) diffraction peak intensity is calculated. The orientation ratio calculated in the measurement is defined as the orientation ratio of the carbonaceous material in the present invention.

The conditions of the X-ray diffractometry are as follows ("2θ" indicates the diffraction angle):

Target: Cu (Kα ray) graphite monochromator
Slits:
Divergence slit=0.5 degrees
Receiving slit=0.15 mm
Scattering slit=0.5 degrees measurement range and step angle/measurement time:
(110) plane: 75 degrees≤2θ≤80 degrees, 1 degree/60 seconds
(004) plane: 52 degrees≤2θ≤57 degrees, 1 degree/60 seconds (8) Aspect Ratio (Powder)

The aspect ratio of the carbonaceous material is usually 1 or more, and is usually 10 or less, preferably 8 or less, more preferably 5 or less. When the aspect ratio is above this range, no streaking or uniform coated surface can be obtained during plate formation, so that the high-current-density charge/discharge characteristics can be deteriorated. The lower limit of the above range is the theoretical lower limit of the aspect ratio of the carbonaceous materials.

The aspect ratio is measured with respect to particles of the carbonaceous material, which are enlarged with scanning electron microscopy. Fifty graphite particles are selected randomly from the particles fixed to an end of a metal having a thickness of 50 μm or less. The stage on which the sample is fixed is rotated and tilted to observe each of the particles three-dimensionally. The largest diameter P of the particle of the carbonaceous material and the smallest diameter Q that is perpendicular to the largest diameter P are measured. The average of the P/Q ratios is determined. The aspect ratio (P/Q) determined in the measurement is defined as the aspect ratio of the carbonaceous material in the present invention.

(9) Production of Electrode

The negative electrode may be produced by any known methods as long as the effects of the present invention are not significantly impaired. For example, the negative electrode may be formed by combining the negative electrode active material with a binder and a solvent, and with as needed a thickener, a conductive material, a filler, and the like to give a slurry, and applying the slurry to a current collector, followed by drying and pressing.

The thickness of the negative electrode active material layer per side immediately before the step of injecting the nonaqueous electrolytic solution in the battery is usually 15 μm or more, preferably 20 μm or more, more preferably 30 μm or more, and is usually 150 μm or less, preferably 120 μm or less, more preferably 100 μm or less. When the thickness of the negative electrode active material is above this range, the nonaqueous electrolytic solution may hardly permeate to the vicinity of the current collector interface, so that the high-current-density charge/discharge characteristics may be deteriorated. On the other hand, when the thickness is below this range, the volume ratio of the current collector to the negative electrode active material may be increased, so that the battery capacity may be decreased. The negative electrode active material may be rolled to form a sheet electrode or may be compressed to form a pellet electrode.

(10) Current Collector

The current collector on which the negative electrode active material is held may be any known collector. Examples of the current collector for the negative electrode include metal materials such as copper, nickel, stainless steel and nickel-plated steel. From the viewpoint of easy processing and cost, copper is particularly preferable.

Examples of the shape of the current collector when the current collector is metallic include metal foils, metal cylinders, metal coils, metal plates, metal thin films, expanded metals, perforated metals and foamed metals. In particular, metal foils are preferably used, and copper foils are more preferably used. Still more preferably, rolled copper foils obtained by a rolling method, and electrolytic copper foils obtained by an electrolytic method both can be used as the current collector.

When the thickness of the copper foil is thinner than 25 μm, copper alloys having higher strength than pure copper (such as phosphor bronze, titanium copper alloy, Corson alloy, and Cu—Cr—Zr alloy) can be used.

The current collector may be used in any thickness, usually 1 μm or more, preferably 3 μm or more, more preferably 5 μm or more, and usually 1 mm or less, preferably 100 μm or less, more preferably 50 μm or less. When the thickness of the metal film is thinner than 1 μm, the strength is decreased, so that application may be difficult. On the other hand, when the thickness is thicker than 1 mm, the shape of the electrode, such as wound electrode, may be deformed. The current collector may be mesh-shaped.

(11) Thickness Ratio of Negative Electrode Active Material Layer to Current Collector The thickness ratio of the negative electrode active material layer to the current collector is not particularly limited. The value of "(thickness of negative electrode active material layer per side immediately before injection of nonaqueous electrolytic solution)/(thickness of current collector)" is usually 150 or less, preferably 20 or less, more preferably 10 or less, and is usually 0.1 or more, preferably 0.4 or more, more preferably 1 or more.

When the thickness ratio of the negative electrode active material layer to the current collector is above this range, the current collector may generate heat due to Joule heat during charging and discharging at high current density. On the other hand, when the thickness ratio is below this range, the volume ratio of the current collector to the negative electrode active material may be increased, so that the battery capacity may be decreased.

(12) Electrode Density

The electrode structure of the electrodes formed of the negative electrode active material is not particularly limited. The density of the negative electrode active material present on the current collector is preferably 0.5 g/cm$^3$ or more, more preferably 1.0 g/cm$^3$ or more, still more preferably 1.3 g/cm$^3$ or more, and is preferably 2.2 g/cm$^3$ or less, more preferably 2.1 g/cm$^3$ or less, still more preferably 2.0 g/cm$^3$ or less, particularly preferably 1.9 g/cm$^3$ or less. When the density of the negative electrode active material present on the current collector is above this range, the negative electrode active material particles may be disrupted, which may cause an increase in initial irreversible capacity or deterioration of high-current-density charge/discharge characteristics due to a decrease in the permeability of the nonaqueous electrolytic solution to the vicinity of the current collector/negative electrode active material interface. On the other hand, when the density is below this range, the conductivity between the negative electrode active materials may be reduced, and the battery resistance may be increased, and thus the capacity per unit volume may be reduced.

(13) Binder

The binder for binding the negative electrode active materials is not particularly limited as long as it is a material that is stable to the nonaqueous electrolytic solution and the solvent used in production of the electrode.

Specific examples include resin polymers such as polyethylene, polypropylene, polyethylene terephthalate, polymethyl methacrylate, aromatic polyamide, cellulose, and nitrocellulose; rubbery polymers such as SBR (styrene-butadiene rubber), isoprene rubber, butadiene rubber, fluororubber, NBR (acrylonitrile-butadiene rubber), and ethylene-propylene rubber; styrene-butadiene-styrene block copolymer and a hydrogenated product thereof; thermoplastic elastomeric polymers such as EPDM (ethylene-propylene-diene terpolymer), styrene-ethylene-butadiene-styrene copolymer, styrene-isoprene-styrene-block copolymer and hydrogenated products thereof; flexible resin polymers such as syndiotactic 1,2-polybutadiene, polyvinyl acetate, ethylene-vinyl acetate copolymer, and propylene-α-olefin copolymer; fluorine-containing polymers such as polyvinylidene difluoride, polytetrafluoroethylene, fluorinated polyvinylidene fluoride, and polytetrafluoroethylene-ethylene copolymer; and polymer compositions having an ion conductivity for alkali metal ion (in particular, lithium ion). These may be used alone or in any combination of two or more at any ratio.

The solvent for forming the slurry may be any types of solvents without limitation as long as the negative electrode active material, and the binder, as well as a thickener and a conductive material optionally used, can be dissolved or dispersed in the solvent. The solvent may be aqueous or organic solvent.

Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, diethyl ether, dimethylacetamide, hexamethylphosphoramide, dimethyl sulfoxide, benzene, xylene, quinoline, pyridine, methylnaphthalene, and hexane.

In particular, when an aqueous solvent is used, it is preferable that the slurry be prepared while adding a dispersant and the like in combination with a thickener and while using a latex such as SBR. These solvents may be used alone or in any combination of two or more at any ratio.

The percentage of the binder with respect to the negative electrode active material is, but not particularly limited to, preferably 0.1% by mass or more, more preferably 0.5% by mass or more, still more preferably 0.6% by mass or more, and preferably 20% by mass or less, more preferably 15% by mass or less, still more preferably 10% by mass or less, particularly preferably 8% by mass or less. When the percentage of the binder with respect to the negative electrode active material is above this range, binders not contributing to the battery capacity may be increased in content and ratio, which may lead to reduced battery capacity. On the other hand, when the percentage is below this range, the strength of the negative electrode may be decreased.

In particular, when a rubbery polymer represented by SBR is mainly contained, the percentage of the binder with respect to the negative electrode active material is usually 0.1% by mass or more, preferably 0.5% by mass or more, more preferably 0.6% by mass or more, and is usually 5% by mass or less, preferably 3% by mass or less, more preferably 2% by mass or less.

When a fluorine-containing polymer represented by polyvinylidene difluoride is mainly contained, the percentage of the binder with respect to the negative electrode active material is usually 1% by mass or more, preferably 2% by mass or more, more preferably 3% by mass or more, and is usually 15% by mass or less, preferably 10% by mass or less, more preferably 8% by mass or less.

The thickener is usually used to adjust the viscosity of the slurry. Specific examples of the thickener include, but not particularly limited to, carboxymethylcellulose, methylcellulose, hydroxy methylcellulose, ethylcellulose, polyvinyl alcohol, oxidized starch, phosphorylated starch, casein, and salts thereof. These may be used alone or in any combination of two or more at any ratio.

When the thickener is used, the percentage of the thickener with respect to the negative electrode active material is, but not particularly limited to, usually 0.1% by mass or more, preferably 0.5% by mass or more, more preferably 0.6% by mass or more, and usually 5% by mass or less, preferably 3% by mass or less, more preferably 2% by mass or less, in the negative electrode materials. When the percentage of the thickener with respect to the negative electrode active material is below this range, the application properties may be significantly degraded. On the other hand, when the percentage is above this range, the ratio of the negative electrode active material in the negative electrode active material layer may be decreased, which may cause a problem of decrease in battery capacity or an increase in resistance between negative electrode active materials.

<2-3-3. Metal Compound Material, and Structure, Physical Properties, and Preparation Method of Negative Electrode Using Metal Compound Material>

The metal compound material used as a negative electrode active material is not particularly limited as long as it can occlude and discharge an s-block metal ion, and may be any of simple metals and alloys capable of forming alloys with s-block metals, and compounds such as oxides, carbides, nitrides, silicides, sulfides, and phosphides thereof. Examples of such metal compound include compounds comprising metals such as Ag, Al, Bi, Cu, Ga, Ge, In, Ni, Pb, Sb, Si, Sn, Sr, and Zn. In particular, the metal compound is preferably simple metals or alloys which form alloys with s-block metals; more preferably materials comprising Group 13 or Group 14 metal or semimetal elements (thus including carbon); still more preferably silicon (Si), tin (Sn) or lead (Pb) (hereinafter, these 3 elements may be referred as "specific metal elements"), simple metals or alloys comprising these atoms, or compounds comprising these metals (specific metal elements); particularly preferably a simple metal, alloys and compounds comprising silicon, and a simple metal, alloys and compounds comprising tin. These may be used alone or in any combination of two or more at any ratio.

Examples of the negative electrode active material comprising at least one element selected from the specific metal elements include simple metals of any one of the specific metal elements; alloys comprising two or more of the specific metal elements; alloys comprising one, or two or more of the specific metal elements and one, or two or more other metal elements; compounds comprising one, or two or more of the specific metal elements; and composite compounds such as oxides, carbides, nitrides, silicides, sulfides, and phosphides of the compounds. When the simple metals, alloys and metal compounds are used as the negative electrode active material, the capacity of the battery can be increased.

Examples further include compounds in which these composite compounds are complexly bonded to simple metals, alloys, or several elements such as nonmetal elements. Specific examples include alloys of silicon and/or tin, with a metal having no negative electrode action. Further, when tin is used, for example, complex compounds which contain 5 to 6 kinds of elements comprising tin, a metal(s) other than tin and silicon that serves as a negative electrode, a metal(s) having no negative electrode action, and a nonmetal element(s) in combination can be used.

Of these negative electrode active materials, simple metals comprising any one of the specific metal elements, and alloys comprising two or more of the specific metal elements, as well as oxides, carbides, nitrides, and the like of the specific metal elements are preferable because the resultant batteries exhibit a high capacity per unit mass. In particular, simple metals and alloys, as well as oxides, carbides, nitrides and the like of silicon and/or tin are preferable from the view point of the capacity per unit mass and the environmental burden.

In addition, although the capacity per unit mass is inferior to using a single metal or an alloy, the following compounds containing silicon and/or tin are also preferable because of their excellent cycle characteristics:

"Oxides of silicon and/or tin" having an elemental ratio of oxygen to silicon and/or tin of usually 0.5 or more, preferably 0.7 or more, more preferably 0.9 or more, and usually 1.5 or less, preferably 1.3 or less, more preferably 1.1 or less;

"Nitrides of silicon and/or tin" having an elemental ratio of nitrogen to silicon and/or tin of usually 0.5 or more, preferably 0.7 or more, more preferably 0.9 or more, and usually 1.5 or less, preferably 1.3 or less, more preferably 1.1 or less;

"Carbides of silicon and/or tin" having an elemental ratio of carbon to silicon and/or tin of usually 0.5 or more, preferably 0.7 or more, more preferably 0.9 or more, and usually 1.5 or less, preferably 1.3 or less, more preferably 1.1 or less.

The negative electrode active materials described above may be used alone or in any combination of two or more at any ratio.

The negative electrode in the power storage device can be produced by any known method. Specific examples of methods for producing the negative electrode include a method comprising adding binders, conductive materials and the like to the negative electrode active material described above and directly rolling the mixture to form a sheet electrode; and a method comprising compressing the mixture to form a pellet electrode. Typically used are methods of forming a thin film layer containing the negative electrode active material described above (negative electrode active material layer) on the current collector for use in the negative electrode (hereinafter may also be referred to as "negative electrode current collector") by, for example, application, evaporation, sputtering, and plating techniques. In this case, the negative electrode active material layer is formed on the negative electrode current collector by adding binders, thickeners, conductive materials, solvents and the like to the negative electrode active material described above to obtain a slurry, applying the slurry to the negative electrode current collector, then drying and pressing it to increase the density.

Examples of materials of the negative electrode current collector include steels, copper alloys, nickel, nickel alloys, and stainless materials. Among them, copper foil is preferable from the viewpoint of being easy to process into thin films and of cost.

The thickness of the negative electrode current collector is usually 1 μm or more, preferably 5 μm or more, and is usually 100 μm or less, preferably 50 μm or less. When the thickness of the negative electrode current collector is too thick, the entire battery capacity may be excessively decreased. On the other hand, when the thickness is too thin, the handling may be difficult.

The surface of the negative electrode current collector is preferably pre-roughened in order to improve the binding effect with the negative electrode active material layer formed on the surface. Examples of the surface roughening method include mechanical polishing techniques comprising polishing the current collector surface by, for example, blasting, rolling with a rough-surfaced roller, or using coated abrasives with adhered abrasive particles, whetstones, emery wheels, wire brushes with wires such as steel, and electropolishing and chemical polishing techniques.

The slurry for forming the negative electrode active material layer is usually prepared by adding binders, thickeners and the like to the negative electrode material. As used herein, the term "negative electrode material" refers to a material obtained by combining the negative electrode active material and conductive materials.

The content of the negative electrode active material in the negative electrode material is usually 70% by mass or more, particularly preferably 75% by mass or more, and is usually 97% by mass or less, particularly preferably 95% by mass or less. When the content of the negative electrode active material is too small, the capacity of secondary batteries using the resultant negative electrode tends to be insufficient. On the other hand, when the content is too large, the contents of the binder and the like are relatively insufficient, so that the strength of the resultant negative electrode tends to be insufficient. When two or more of the negative electrode active materials are used, the total amount of the negative electrode active materials is required to satisfy the above range.

Examples of the conductive material used in the negative electrode include metal materials such as copper and nickel; carbon materials such as graphite and carbon black. These may be used alone or in any combination of two or more at any ratio. In particular, carbon materials are preferably used as the conductive material because they also act as active materials. The content of the conductive material in the negative electrode material is usually 3% by mass or more, particularly preferably 5% by mass or more, and is usually 30% by mass or less, particularly preferably 25% by mass or less. When the content of the conductive material is too small, the conductivity tends to be insufficient. On the other hand, when the content is too large, the contents of the negative electrode active material and the like are relatively insufficient, so that the capacity and the strength of the battery tends to be decreased. When two or more of the conductive materials are used, the total amount of the conductive materials is required to satisfy the above range.

As the binder used in the negative electrode, any material that is stable to the solvent used in production of the electrode and to the electrolytic solution can be used. Examples include polyvinylidene difluoride, polytetrafluoroethylene, polyethylene, polypropylene, styrene-butadiene rubber, isoprene rubber, butadiene rubber, ethylene-acrylic acid copolymer, and ethylene-methacrylic acid copolymer. These may be used alone or in any combination of two or more at any ratio. The content of the binder is usually 0.5 parts by mass or more, particularly preferably 1 part by mass or more, and usually 10 parts by mass or less, particularly preferably 8 parts by mass or less, with respect to 100 parts by mass of the negative electrode material. When the content of the binder is too small, the strength of the resultant negative electrode tends to be insufficient. On the other hand, when the content is too large, the contents of the negative electrode active material and the like are relatively insufficient, so that the capacity and the conductivity of the battery tends to be decreased. When two or more of the binders are used, the total amount of the binders is required to satisfy the above range.

Examples of the thickener used in the negative electrode include carboxymethylcellulose, methylcellulose, hydroxy methylcellulose, ethylcellulose, polyvinyl alcohol, oxidized starch, phosphorylated starch, and casein. These may be used alone or in any combination of two or more at any ratio. The thickener may be used as needed, and when used, the content of the thickener preferably used in the negative electrode active material layer is usually in the range of 0.5% by mass or more and 5% by mass or less.

The slurry for forming the negative electrode active material layer is prepared by combining the negative electrode active material described above with the conductive materials, the binders, and the thickeners, as needed, with use of an aqueous solvent or an organic solvent as a dispersion medium. As the aqueous solvent, water is usually used, but solvents other than water, including alcohols such as ethanol and cyclic amides such as N-methylpyrrolidone also can be used in combination at the rate of about 30% by mass or less relative to water. Preferred examples of the organic solvent that is usually used include cyclic amides such as N-methylpyrrolidone; linear amides such as N,N-dimethylformamide, and N,N-dimethylacetamide; aromatic hydrocarbons such as anisole, toluene, and xylene; and alcohols such as butanol, and cyclohexanol. Among them, cyclic amides such as N-methylpyrrolidone; and linear amides such as N,N-dimethylformamide, and N-dimethylacetamide are particularly preferred. These may be used alone or in any combination of two or more at any ratio.

The viscosity of the slurry is not particularly limited as long as the slurry can be applied to the current collector. In order to achieve the viscosity that allows application, the slurry may be prepared with the amount of the solvent to be used changed as appropriate.

The obtained slurry is applied to the negative electrode current collector described above, then dried and pressed to form the negative electrode active material layer. The application technique is not particularly limited, and any per se known technique can be used. The drying technique is also particularly limited, and any known technique can be used, including air drying, heat drying, and vacuum drying.

The structure of the electrode formed of the negative electrode active material by the above technique is not particularly limited. The density of the active material present on the current collector is preferably 1 g/cm$^3$ or more, more preferably 1.2 g/cm$^3$ or more, still more preferably 1.3 g/cm$^3$ or more, and is preferably 2.2 g/cm$^3$ or less, more preferably 2.1 g/cm$^3$ or less, still more preferably 2.0 g/cm$^3$ or less, particularly preferably 1.9 g/cm$^3$ or less.

When the density of the active material present on the current collector is above this range, the active material particles may be disrupted, which may cause an increase in initial irreversible capacity or deterioration of high-current-density charge/discharge characteristics due to a decrease in the permeability of the nonaqueous electrolytic solution to the vicinity of the current collector/active material interface. On the other hand, when the density is below this range, the conductivity between the active materials may be reduced, and the battery resistance may be increased, and thus the capacity per unit volume may be reduced.

<2-3-4. Structure, Physical Properties, and Preparation Method of Negative Electrode Using Carbonaceous Material and Metal Compound Material>

The negative electrode active material may contain a metal compound material and the carbonaceous material described above. The negative electrode active material containing a metal compound material and the carbonaceous material may be a mixture of any of simple metals and alloys capable of forming lithium alloys, and compound such as oxides, carbides, nitrides, silicides, and sulfides thereof, with the carbonaceous material, which are mixed in the form of mutually independent particles, or may be composites in which simple metals or alloys capable of forming lithium alloys, or compounds such as oxides, carbides, nitrides, silicides, or sulfides thereof are present on the surface of or inside the carbonaceous material. As used herein, the "composite" is not particularly limited as long as it particularly contains a metal compound material and a carbonaceous material, but preferably the metal compound material and the carbonaceous material are unified by physical and/or chemical bonds. More preferably, solid components of the metal compound material and the carbonaceous material are present in a dispersed state to such an extent that they are present at least both of the surface of the composite and inside the bulk, and the carbonaceous material is present for unifying them by physical and/or chemical bonds.

Such a morphology can be observed by various observation methods, for example, by observation of the particle surface with a scanning electron microscope, or observation of the cross section of the particles with a scanning electron microscope after embedding the particles in a resin and slicing the resin, cutting out the cross section of the particles, or after processing a coating film comprising the particle with a cross section polisher to prepare a cross section of the coating film and cutting out the cross section of the particles.

The content ratio of the metal compound material used in the negative electrode active material containing the metal compound material and the carbonaceous material is, but not particularly limited to, usually 0.1% by mass or more, preferably 1% by mass or more, more preferably 1.5% by mass or more, still more preferably 2% by mass or more, particularly preferably 3% by mass or more, and is usually 99% by mass or less, preferably 50% by mass or less, more preferably 40% by mass or less, still more preferably 30% by mass or less, still more preferably 25% by mass or less, particularly preferably 15% by mass or less, most preferably 10% by mass or less, with respect to 100% by mass of the negative electrode active material. When the content ratio is within this range, sufficient capacity can be preferably obtained.

The carbonaceous material used in the negative electrode active material containing the metal compound material and the carbonaceous material preferably satisfies the requirements described in the above <2-3-2>. In addition, the metal compound material desirably satisfies the following.

As the simple metals or alloys capable of forming alloys with s-block metals, any of conventionally known simple metals or alloys can be used. However, from the viewpoint of the capacity and the cycle life, the simple metals capable of forming lithium alloys are preferably a metal selected from the group consisting of Fe, Co, Sb, Bi, Pb, Ni, Ag, Si, Sn, Al, Zr, Cr, V, Mn, Nb, Mo, Cu, Zn, Ge, In, Ti and the like or a compound thereof. The alloys capable of forming lithium alloys are preferably a metal selected from the group consisting of Si, Sn, As, Sb, Al, Zn and W or a compound thereof.

The simple metals or the alloys capable of forming alloys with s-block metals, or the compounds such as oxides, carbides, nitrides, silicides, and sulfides thereof include metal oxides, metal carbides, metal nitrides, metal silicides, and metal sulfides. Alloys comprising two or more metals may be used. Among them, Si or Si compounds are preferable from the viewpoint of the increased capacity. As used herein, Si or the Si compounds are generically referred to as Si compounds. Specific examples of the Si compound include, when represented by formulae, SiOx, SiNx, SiCx, and SiZxOy (wherein, Z represents C or N). Preferably, the Si compound is SiOx. In the above formulae, the value x is, but not particularly limited to, usually 0≤x<2. SiOx with the above formula can be obtained from silicon dioxide ($SiO_2$) and silicon metal (Si) as raw materials. SiOx has a large theoretical capacity as compared with graphite, and further, alkali ions such as lithium ions easily enter and exit amorphous Si or nano-sized Si crystal, so that a high capacity can be obtained.

The value of x in SiOx is, but not particularly limited to, usually 0≤x<2, preferably 0.2 or more, more preferably 0.4 or more, still more preferably 0.6 or more, and is preferably 1.8 or less, more preferably 1.6 or less, still more preferably 1.4 or less. When the value of x is within this range, high capacity can be obtained, while the irreversible capacity due to binding of the s-block metal with oxygen can be reduced.

Methods for determining whether metal compound materials can form alloys with s-block metals include identification of metal particle phase by X-ray diffraction, observation and elementary analysis of particle structure with an electron microscope, and elementary analysis with a fluorescent X-ray.

The average particle diameter (d50) of the metal compound material used in the negative electrode active material containing the metal compound material and the carbonaceous material is, but not particularly limited to, usually 0.01 μm or more, preferably 0.05 μm or more, more preferably 0.1 μm or more, still more preferably 0.3 μm or more, and is usually 10 μm or less, preferably 9 μm or less, more preferably 8 μm or less, from the viewpoint of cycle life. When the average particle diameter (d50) is within this range, volume expansion during charging and discharging can be reduced, a charge/discharge capacity can be maintained, and good cycle characteristics can be obtained.

Average particle diameters (d50) are required in laser diffraction/scattering particle diameter distribution measurement methods and the like.

The specific surface area of the metal compound material used in the negative electrode active material containing the metal compound material and the carbonaceous material as determined by a BET method is, but not particularly limited to, usually 0.5 m²/g or more, preferably 1 m²/g or more, and is usually 60 m²/g or less, preferably 40 m²/g or less. When the specific surface area of metal particles capable of forming alloys with s-block metals as determined by a BET method is within this range, a battery having high charge/discharge efficiency and high discharge capacity, quick in/out of lithium during high-speed charge and discharge, and excellent rate characteristics can be preferably obtained.

The content of oxygen in the metal compound material used in the negative electrode active material containing the metal compound material and the carbonaceous material is, but not particularly limited to, usually 0.01% by mass or more, preferably 0.05% by mass or more, and is usually 8% by mass or less, preferably 5% by mass or less, with respect to 100 parts by mass in total of the metal compound material and the carbonaceous material. With regard to the oxygen distribution state in the particle, oxygens may be present near the surface, present inside the particle, or uniformly present in the particle. In particular, oxygens are preferably present near the surface. When the content of oxygen in the metal compound material is within this range, volume expansion during charging and discharging can be inhibited due to the strong bonding between Si and O, which preferably leading to excellent cycle characteristics.

The negative electrode of the metal compound material used in the negative electrode active material containing the metal compound material and the carbonaceous material can be prepared by using the method as described in the section of <2-3-1> Carbonaceous Material.

<2-3-5. S-Block Metal-Containing Metal Composite Oxide Material, and Structure, Physical Properties, and Preparation Method of Negative Electrode Using S-Block Metal-Containing Metal Composite Oxide Material>

The s-block metal-containing metal composite oxide material used in the negative electrode active material is not particularly limited as long as it can occlude and discharge s-block metal ions, and is preferably alkali metal-containing composite metal oxide materials that contain titanium, particularly preferably composite oxides of alkali metal and titanium. That is, the negative electrode active material for power storage device particularly preferably contains an alkali metal-titanium composite oxide with a spinel structure from the viewpoint that the output resistance is significantly reduced.

Preferably, an alkali metal and titanium in the alkali metal-titanium composite oxide may also be substituted with other metal elements, for example, at least one element selected from the group consisting of Co, Al, Fe, Ti, Mg, Cr, Ga, Cu, Zn and Nb.

Preferably, the metal oxide is an alkali metal-titanium composite oxide represented by formula (6) wherein 0.7≤x≤1.5, 1.5≤y≤2.3, 0≤z≤1.6, from the viewpoint that the structure of the alkali ion is stable during doping and dedoping:

$$A_xTi_yQ^1_zO_4 \qquad (6)$$

wherein, A represents at least one element selected from the group consisting of Li, Na, and K; $Q^1$ represents at least one element selected from the group consisting of Co, Al, Fe, Ti, Mg, Cr, Ga, Cu, Zn and Nb.

In particular, structures with compositions represented by the above formula (6), wherein:
(a) 1.2≤x≤1.4, 1.5≤y≤1.7, z=0,
(b) 0.9≤x≤1.1, 1.9≤y≤2.1, z=0, or
(c) 0.7≤x≤0.9, 2.1≤y≤2.3, z=0 are preferable in that a good balance in battery performances is obtained.

Particularly preferred representative compositions of the compounds are $A_{4/3}Ti_{5/3}O_4$ for (a), $A_1Ti_2O_4$ for (b), and $A_{4/5}Ti_{11/5}O_4$ for (c), wherein A represents at least one element selected from the group consisting of Li, Na, and K. A preferred example of the structure in which Z≠0 include $A_{4/3}Ti_{4/3}Al_{1/3}O_4$, wherein A represents at least one element selected from the group consisting of Li, Na, and K.

In addition to the requirements described above, the alkali metal-titanium composite oxide used as the negative electrode active material in the present invention preferably further satisfies at least one characteristic, particularly preferably two or more characteristics simultaneously, of characteristics such as physical properties and shapes shown in (1) to (13) described below.

(1) BET Specific Surface Area

The BET specific surface area value of the alkali metal-titanium composite oxide used as the negative electrode active material as determined by a BET method is preferably 0.5 m²/g or more, more preferably 0.7 m²/g or more, more preferably 1.0 m²/g or more, particularly preferably 1.5 m²/g or more, and is preferably 200 m²/g or less, more preferably 100 m²/g or less, more preferably 50 m²/g or less, particularly preferably 25 m²/g or less.

When the BET specific surface area is below this range, the reaction area when it is used as a negative electrode material in contact with the nonaqueous electrolytic solution may decrease, and the output resistance may be increased. On the other hand, when the BET specific surface area is above this range, surface and end face portions of the crystal of titanium-containing metal oxide may be increased, which may also cause distortion of the crystal and non-ignorable irreversible capacity, so that it may be difficult to obtain a preferable battery.

The specific surface area is measured by BET method using a surface area meter (for example, an automatic surface area measuring apparatus manufactured by Okura Riken) by preliminarily drying the sample at 350° C. under a stream of nitrogen for 15 minutes and then analyzing it by flowing nitrogen gas adsorption (BET single point method) using a nitrogen-helium mixed gas prepared so that the pressure of nitrogen relative to the atmospheric pressure is exactly 0.3. The specific surface area determined in the measurement is defined as the BET specific surface area of the lithium-titanium composite oxide in the present invention.

(2) Volume-based Average Particle Diameter

The volume-based average particle diameter of the alkali metal-titanium composite oxide (the secondary particle diameter when the primary particles are aggregated into secondary particles) is defined by a volume-based average particle diameter (median diameter) determined by a laser diffraction/scattering method.

The volume-based average particle diameter of the alkali metal-titanium composite oxide is usually 0.1 μm or more, preferably 0.5 μm or more, more preferably 0.7 μm or more, and is usually 50 μm or less preferably 40 μm or less, more preferably 30 μm or less, still more preferably 25 μm or less.

The volume-based average particle diameter is determined by dispersing a carbon powder in a 0.2% by mass of aqueous solution (10 mL) of polyoxyethylene (20) sorbitan monolaurate as a surfactant, using a laser diffraction/scattering particle diameter distribution analyzer (e.g., Horiba LA-700). The median diameter determined by the measurement is defined as the volume-based average particle diameter of the carbonaceous material used in the present invention.

When the volume-based average particle diameter of the alkali metal-titanium composite oxide is below this range, a large amount of binder may be needed during preparation of the electrode, and as a result, the battery capacity may be reduced. On the other hand, when the volume average particle diameter is above this range, an ununiformly coated surface may tend to be obtained, which may be undesirable in the battery production process.

(3) Average Primary Particle Diameter

When primary particles are aggregated into secondary particles, the average primary particle diameter of the alkali metal-titanium composite oxide is usually 0.01 μm or more, preferably 0.05 μm or more, more preferably 0.1 μm or more, still more preferably 0.2 μm or more, and is usually 2 μm or less, preferably 1.6 μm or less, more preferably 1.3 μm or less, still more preferably 1 μm or less. When the volume-based average primary particle diameter is above this range, spherical secondary particles may hardly be formed, which may adversely affect the powder filling property and significantly decrease the specific surface area, so that battery performances such as output characteristics may more likely to be deteriorated. On the other hand, when the volume-based average primary particle diameter is below this range, typically, deteriorated performances of the secondary battery may be obtained, including deteriorated reversibility during charging and discharging due to underdeveloped crystals.

The primary particle diameter is determined by observation using a scanning electron microscope (SEM). Specifically, the primary particle diameter is determined by measuring the largest length of a segment defined by a horizontal straight line intersecting the primary particle, with respect to fifty random primary particles, in a photograph at a magnification at which particles can be observed, for example, at a magnification of 10,000 to 100,000, and averaging the values.

(4) Shapes

The shapes of the particles of the alkali metal-titanium composite oxide may be conventional shapes such as bulky masses, polyhedrons, spheres, ellipses, plates, needles and columns. In particular, primary particles are preferably aggregated to form secondary particles that have a shape of sphere or ellipse.

In an electrochemical device, active materials in the electrode usually expand and contract during charging and discharging, and thus generated stress is likely to cause deteriorations such as disruption of the active materials and breakage of conductive path. When the active material is formed by aggregation of primary particles to form secondary particles, rather than being composed of single particles of only primary particles, the stress due to expansion and contraction can be alleviated and the deteriorations can be prevented.

Further, the particles are preferably spherical or ellipsoidal rather than being orientated particles such as plate particles, because the orientation during formation of the electrode is small, and thus expansion and contraction of the electrode during charging and discharging are also small, and because the particles are likely to be uniformly mixed with the conductive material during preparation of the electrode.

(5) Tapped Density

The tapped density of the alkali metal-titanium composite oxide is preferably 0.05 g/cm³ or more, more preferably 0.1 g/cm³ or more, still more preferably 0.2 g/cm³ or more, particularly preferably 0.4 g/cm³ or more, and is more preferably 2.8 g/cm³ or less, still more preferably 2.4 g/cm³ or less, particularly preferably 2 g/cm³ or less. When an alkali metal-titanium composite oxide with a tapped density below this range is used as the negative electrode, the packing density may hardly increase and the contact area between the particles may be decreased, so that the resistance between particles may be increased and the output resistance may be increased. On the other hand, when the tapped density is above this range, there may be too few voids between the particles in the electrode, and the flow passes for the nonaqueous electrolytic solution may be decreased, so that the output resistance may be increased.

The tapped density is measured by allowing the particles to fall into a 20 cm³ tapping cell through a sieve having a mesh opening of 300 μm until the sample reaches the upper end of the cell, and tapping the cell 1000 times with a slide stroke of 10 mm with use of a powder density meter (for example, Seishin Enterprise Tap Denser). The tapped density is calculated based on the volume and the mass of the sample. The tapped density calculated in the measurement is defined as the tapped density of the alkali metal-titanium composite oxide in the present invention.

(6) Circularity

The circularity, as measured as the degree of spherical shape of the alkali metal-titanium composite oxide, is preferably in the range described below. The circularity is defined as "Circularity=(Circumferential length of equivalent circle having equal area to projection of particle)/(Actual circumferential length of projection of particle)". When the circularity is 1, the particle is theoretically spherical.

The circularity of the alkali metal-titanium composite oxide is preferably as close to 1 as possible, and is usually 0.10 or more, preferably 0.80 or more, more preferably 0.85 or more, still more preferably 0.90 or more. The high-current-density charge/discharge characteristics improve as the circularity increases. Thus, when the circularity is below this range, the filling property of the negative electrode active material may be reduced, the resistance between particles may be increased, and thus the short-time high-current-density charge/discharge characteristics may be decreased.

The circularity is measured using a flow-type particle image analyzer (for example, Sysmex FPIA). About 0.2 g of the sample is dispersed in a 0.2% by mass of aqueous solution (about 50 mL) of polyoxyethylene (20) sorbitan monolaurate as a surfactant, then the dispersion is irradiated with 28 kHz ultrasonic waves at an output of 60 W for 1 minute, and then particles having particle diameters in the range of 3 to 40 μm are analyzed while setting the detection range to 0.6 to 400 μm. The circularity determined in the measurement is defined as the circularity of the lithium-titanium composite oxide in the present invention.

(7) Aspect Ratio

The aspect ratio of the alkali metal-titanium composite oxide is usually 1 or more, and is usually 5 or less, preferably 4 or less, more preferably 3 or less, still more preferably 2 or less. When the aspect ratio is above this range, no streaking or uniform coated surface can be obtained during plate formation, so that the short-time high-current-density charge/discharge characteristics may be deteriorated. The lower limit of the above range is the theoretical lower limit of the aspect ratio of the alkali metal-titanium composite oxide.

The aspect ratio is measured with respect to particles of the alkali metal-titanium composite oxide, which are enlarged with scanning electron microscopy. Fifty particles are selected randomly from the particles fixed to an end of a metal having a thickness of 50 μm or less. The stage on which the sample is fixed is rotated and tilted to observe each of the particles three-dimensionally. The largest diameter P' of the particle of the material and the smallest diameter Q' that is perpendicular to the largest diameter P' are measured. The average of the P'/Q' ratios is determined. The aspect ratio (P'/Q') determined in the measurement is defined as the aspect ratio of the alkali metal-titanium composite oxide in the present invention.

(8) Method for Producing Negative Electrode Active Material

The method for producing the alkali metal-titanium composite oxide is not particularly limited without departing from the scope and spirit of the invention. Examples include several methods, and common methods for producing inorganic compounds are used.

Examples include a method comprising homogeneously mixing a titanium source material such as titanium oxide, source materials for other elements as needed, and an alkali metal source such as AOH, $A_2CO_3$, or $ANO_3$ (A represents an alkali metal) and firing the mixture at a high temperature to obtain active materials.

In particular, various methods may be used to prepare spherical or ellipsoidal active materials. An exemplary method comprises dissolving or grinding and dispersing a titanium source material such as titanium oxide, and source materials for other elements as needed in a solvent such as water, adjusting the pH with stirring to prepare a spherical precursor, then recovering the spherical precursor and drying it as needed, and adding a Li source such as LiOH, $Li_2CO_3$, or $LiNO_3$, and firing the mixture at a high temperature to obtain a lithium-titanium composite oxide.

Another exemplary method comprises dissolving or grinding and dispersing a titanium source material such as titanium oxide, and source materials for other elements as needed in a solvent such as water, drying the solution or dispersion with a spray dryer or the like to form a spherical or ellipsoidal precursor, adding an alkali metal source such as AOH, $A_2CO_3$, or $ANO_3$ (A represents an alkali metal) to the precursor, and firing the mixture at a high temperature to obtain an active material.

A still another exemplary method comprises dissolving or grinding and dispersing a titanium source material such as titanium oxide, an alkali metal source such as AOH, $A_2CO_3$, or $ANO_3$ (A represents an alkali metal), and source materials for other elements as needed in a solvent such as water, drying the solution or dispersion with a spray dryer or the like to form a spherical or ellipsoidal precursor, and firing the resultant product at a high temperature to obtain an active material.

In the steps, the elements other than Ti, for example, Al, Mn, Ti, V, Cr, Mn, Fe, Co, Li, Ni, Cu, Zn, Mg, Ga, Zr, C, Si, Sn, and Ag may exist in the structure of the titanium-containing metal oxide and/or in contact with the titanium-containing oxide. When the elements are contained, the operating voltage and the capacity of the battery can be controlled.

(9) Production of Electrode

The electrode may be produced by any known methods. For example, the electrode may be formed by combining the negative electrode active material with a binder and a solvent, and with as needed a thickener, a conductive material, a filler, and the like to give a slurry, and applying the slurry to a current collector, followed by drying and pressing.

The thickness of the negative electrode active material layer per side immediately before the step of injecting the nonaqueous electrolytic solution in the battery is usually 15 μm or more, preferably 20 μm or more, more preferably 30 μm or more, and usually 150 μm or less, preferably 120 μm or less, more preferably 100 μm or less.

When the thickness is above this range, the nonaqueous electrolytic solution may hardly permeate to the vicinity of the current collector interface, so that the high-current-density charge/discharge characteristics may be deteriorated. On the other hand, when the thickness is below this range, the volume ratio of the current collector to the negative electrode active material may be increased, so that the battery capacity may be decreased. The negative electrode active material may be rolled to form a sheet electrode or may be compressed to form a pellet electrode.

(10) Current Collector

The current collector on which the negative electrode active material is held may be any known collector. Examples of the current collector for the negative electrode include metal materials such as copper, nickel, stainless steel and nickel-plated steel. From the viewpoint of easy processing and cost, copper is particularly preferable.

Examples of the shape of the current collector when the current collector is metallic include metal foils, metal cylinders, metal coils, metal plates, metal thin films, expanded metals, perforated metals and foamed metals. In particular, metal foils containing copper (Cu) and/or aluminum (Al) are preferably used, and copper foils and aluminum foils are more preferably used. Still more preferably, rolled copper foils obtained by a rolling method, and electrolytic copper foils obtained by an electrolytic method both can be used as the current collector.

When the thickness of the copper foil is thinner than 25 µm, copper alloys having higher strength than pure copper (such as phosphor bronze, titanium copper alloy, Corson alloy, and Cu—Cr—Zr alloy) can be used. Aluminum foils, due to their small specific gravity, enable reduction of the mass of the battery when used as the current collector, and thus can be preferably used.

Current collectors made of copper foils produced by a rolling method are hard to break even if the negative electrode is tightly rounded or rounded at a sharp angle due to the arrangement of copper crystals in the rolling direction, and thus can be preferably used in small cylindrical batteries.

The electrolytic copper foils are obtained by, for example, immersing a metallic dram with a nonaqueous electrolytic solution in which copper ions are dissolved, rotating the drum while supplying an electric current, thereby depositing copper on the surface of the dram, and peeling off the deposited copper. Copper may be deposited on the surface of the rolled copper foils described above by an electrolytic method. The copper foils may be subjected to surface roughening treatment or surface treatment (for example, chromate treatment to a thickness of several nm to about 1 µm, and base treatment with Ti) on its one side or both sides.

The current collector may be used in any thickness, usually 1 µm or more, preferably 3 µm or more, more preferably 5 µm or more, and usually 1 mm or less, preferably 100 µm or less, more preferably 50 µm or less.

When the thickness of the current collector is within this range, the strength is preferably improved, so that coating is easier and the shape of the electrode is more stable.

(11) Thickness Ratio of Active Material Layer to Current Collector

The thickness ratio of the active material layer to the current collector is not particularly limited. The value of "(thickness of active material layer per side immediately before injection of nonaqueous electrolytic solution)/(thickness of current collector)" is usually 150 or less, preferably 20 or less, more preferably 10 or less, and is usually 0.1 or more, preferably 0.4 or more, more preferably 1 or more.

When the thickness ratio of the negative electrode active material layer to the current collector is above this range, the current collector may generate heat due to Joule heat during charging and discharging at high current density. On the other hand, when the thickness ratio is below this range, the volume ratio of the current collector to the negative electrode active material may be increased, so that the battery capacity may be decreased.

(12) Electrode Density

The electrode structure of the electrodes formed of the negative electrode active material is not particularly limited. The density of the active material present on the current collector is preferably 1 $g/cm^3$ or more, more preferably 1.2 $g/cm^3$ or more, still more preferably 1.3 $g/cm^3$ or more, particularly preferably 1.5 $g/cm^3$ or more, and is preferably 3 $g/cm^3$ or less, more preferably 2.5 $g/cm^3$ or less, still more preferably 2.2 $g/cm^3$ or less, particularly preferably 2 $g/cm^3$ or less.

When the density of the active material present on the current collector is above this range, the binding between the current collector and the negative electrode active material may be weakened, and the electrode and the active material may be separated. On the other hand, when the density is below this range, the conductivity between the negative electrode active materials may be reduced, and the battery resistance may be increased.

(13) Binder

The binder for binding the negative electrode active materials is not particularly limited as long as it is a material that is stable to the nonaqueous electrolytic solution and the solvent used in production of the electrode.

Specific examples include resin polymers such as polyethylene, polypropylene, polyethylene terephthalate, polymethyl methacrylate, polyimide, aromatic polyamide, cellulose, and nitrocellulose; rubbery polymers such as SBR (styrene-butadiene rubber), isoprene rubber, butadiene rubber, fluororubber, NBR (acrylonitrile-butadiene rubber), and ethylene-propylene rubber; styrene-butadiene-styrene block copolymer and a hydrogenated product thereof; thermoplastic elastomeric polymers such as EPDM (ethylene-propylene-diene terpolymer), styrene-ethylene-butadiene-styrene copolymer, styrene-isoprene-styrene-block copolymer and hydrogenated products thereof; flexible resin polymers such as syndiotactic 1,2-polybutadiene, polyvinyl acetate, ethylene-vinyl acetate copolymer, and propylene-α-olefin copolymer; fluorine-containing polymers such as polyvinylidene difluoride, polytetrafluoroethylene, fluorinated polyvinylidene fluoride, and polytetrafluoroethylene-ethylene copolymer; and polymer compositions having an ion conductivity for alkali metal ion (in particular, lithium ion). These may be used alone or in any combination of two or more at any ratio.

The solvent for forming the slurry may be any types of solvents without limitation as long as the negative electrode active material, the binder, and a thickener and a conductive material used as needed can be dissolved or dispersed in the solvent. The solvent may be aqueous or organic solvent.

Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, tetrahydrofuran (THF), toluene, acetone, dimethyl ether, dimethylacetamide, hexamethylphosphoramide, dimethyl sulfoxide, benzene, xylene, quinoline, pyridine, methylnaphthalene, and hexane. In particular, when an aqueous solvent is used, it is preferable that the slurry be prepared while adding a dispersant and the like in combination with the thickener described above and while using a latex such as SBR. These may be used alone or in any combination of two or more at any ratio.

The percentage of the binder with respect to the negative electrode active material is usually 0.1% by mass or more, preferably 0.5% by mass or more, more preferably 0.6% by mass or more, and is usually 20% by mass or less, preferably 15% by mass or less, more preferably 10% by mass or less, still more preferably 8% by mass or less.

When the percentage of the binder with respect to the negative electrode active material is within this range, the ratio of binders not contributing to the battery capacity is decreased and the battery capacity is increased. In addition, since the strength of the negative electrode is sustained, the percentage is preferable in the steps of preparing the battery.

In particular, when a rubbery polymer represented by SBR is mainly contained, the percentage of the binder with respect to the negative electrode active material is usually 0.1% by mass or more, preferably 0.5% by mass or more, more preferably 0.6% by mass or more, and is usually 5% by mass or less, preferably 3% by mass or less, more preferably 2% by mass or less.

When a fluorine-containing polymer represented by polyvinylidene difluoride is mainly contained, the percentage of the binder with respect to the negative electrode active material is usually 1% by mass or more, preferably 2% by mass or more, more preferably 3% by mass or more, and is usually 15% by mass or less, preferably 10% by mass or less, more preferably 8% by mass or less.

The thickener is usually used to adjust the viscosity of the slurry. Specific examples of the thickener include, but not particularly limited to, carboxymethylcellulose, methylcellulose, hydroxy methylcellulose, ethylcellulose, polyvinyl alcohol, oxidized starch, phosphorylated starch, casein, and salts thereof. These may be used alone or in any combination of two or more at any ratio.

When the thickener is used, the percentage of the thickener with respect to the negative electrode active material is usually 0.1% by mass or more, preferably 0.5% by mass or more, more preferably 0.6% by mass or more, and usually 5% by mass or less, preferably 3% by mass or less, more preferably 2% by mass or less. The percentage of the thickener with respect to the negative electrode active material is preferably within this range from the viewpoint of application properties of adhesives. In addition, suitable percentage of the active material in the negative electrode active material layer is also obtained, which is preferable from the viewpoint of the capacity of the battery and the resistance between the negative electrode active materials.

<2-4. Positive Electrode>

The positive electrode has a positive electrode active material layer on a current collector, which positive electrode active material layer contains a positive electrode active material. Hereinafter, the positive electrode active material will be described.

<2-4-1. Positive Electrode Active Material>

Hereinafter, the positive electrode active material used in the positive electrode will be described.

(1) Composition

Any positive electrode active materials capable of electrochemically occluding and discharging s-block metal ions can be used. For example, materials containing an alkali metal and at least one transition metal are preferably used. Specific examples include lithium-transition metal composite oxides, lithium-containing transition metal phosphate compounds, sodium-transition metal composite oxides, sodium-containing transition metal phosphate compounds, potassium-transition metal composite oxides, and potassium-containing transition metal phosphate compounds.

Preferred examples of the transition metals in the alkali metal-transition metal composite oxides include V, Ti, Cr, Mn, Fe, Co, Ni, and Cu. Specific examples include alkali metal-cobalt composite oxides such as $ACoO_2$ (wherein A represents at least one element selected from the group consisting of Li, Na, and K); alkali metal-manganese composite oxides such as $AMnO_2$, $AMn_2O_4$, and $A_2MnO_4$ (wherein A represents at least one element selected from the group consisting of Li, Na, and K); and alkali metal-nickel composite oxides such as $ANiO_2$ (wherein A represents at least one element selected from the group consisting of Li, Na, and K). In addition, those in which the transition metal atoms mainly contained in the alkali metal-transition metal composite oxides are partially substituted with other metals such as Al, Ti, V, Cr, Mn, Fe, Co, Li, Ni, Cu, Zn, Mg, Ga, Zr, and Si are also included. Specific examples include alkali metal-cobalt-nickel composite oxides, alkali metal-cobalt-manganese composite oxides, alkali metal-nickel-manganese composite oxides, and alkali metal-nickel-cobalt-manganese composite oxides.

Specific examples of the substituted products include $A_aNi_{0.5}Mn_{0.5}O_2$, $A_aNi_{0.8}Co_{0.2}O_2$, $A_aNi_{0.85}Co_{0.10}Al_{0.05}O_2$, $A_aNi_{0.33}Co_{0.33}Mn_{0.33}O_2$, $A_aNi_{0.45}Co_{0.45}Mn_{0.1}O_2$, $A_aMn_{1.8}Al_{0.2}O_4$, $A_aMn_{1.5}Ni_{0.5}O_4$, and $xA_2MnO_3$. $(1-x)A_aQ^2O_2$ (wherein A represents at least one element selected from the group consisting of Li, Na, and K, and $Q^2$=a transition metal) ($0<a\leq 2.0$).

The alkali metal-containing transition metal phosphate compounds can be represented by $AxQ^3PO_4$ (wherein A represents at least one element selected from the group consisting of Li, Na, and K; $Q^3$=one element selected from the group consisting of transition metals in Period 4 Groups 4 to 11 in the periodic table; $0<x<1.2$) as a basic composition. The transition metal ($Q^3$) is preferably at least one element selected from the group consisting of V, Ti, Cr, Mg, Zn, Ca, Cd, Sr, Ba, Co, Ni, Fe, Mn and Cu, more preferably at least one element selected from the group consisting of Co, Ni, Fe, and Mn. Examples include iron phosphates such as $LiFePO_4$, $Li_3Fe_2(PO_4)_3$, and $LiFeP_2O_7$; cobalt phosphates such as $LiCoPO_4$; manganese phosphates such as $LiMnPO_4$; nickel phosphates such as $LiNiPO_4$; those in which the transition metal atoms mainly contained in the lithium-transition metal phosphate compounds are partially substituted with other metals such as Al, Ti, V, Cr, Mn, Fe, Co, Li, Ni, Cu, Zn, Mg, Ga, Zr, Nb, and Si.

The above-described "$AxQ^3PO_4$" is meant to include not only those having the composition represented by the composition formula, but also those in which the sites of the transition metal ($Q^3$) in the crystal structures are partially substituted with other elements. Further, the composition formula is meant to include not only those having stoichiometric compositions, but also those having nonstoichiometric compositions, for example, with some elements missing. The substitution with other elements may be carried out in an amount of usually 0.1 mol %, preferably 0.2 mol % or more and usually 5 mol % or less, preferably 2.5 mol % or less.

The positive electrode active materials described above may be used alone or in combination of two or more.

(2) Surface Coating

Substances having a composition different from that of the material mainly contained in the positive electrode active material may be adhered to the surface of the positive electrode active material (hereinafter referred to as "surface adhering substance" as appropriate). Examples of the surface adhering substance include oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; carbonates such as lithium carbonate, sodium carbonate, calcium carbonate, and magnesium carbonate.

Examples of the method for adhering the surface adhering substance to the surface of the positive electrode active material include a method comprising dissolving or suspending the surface adhering substance in a solvent, impregnating the positive electrode active material with the solution or suspension, and drying the positive electrode active material; a method comprising dissolving or suspending a precursor of the surface adhering substance in a solvent, impregnating the positive electrode active material with the solution or suspension, and allowing to react by heating or the like; and a method comprising adding the surface adhering substance to a precursor of the positive electrode active material and firing the mixture at a time.

The mass of the surface adhering substance adhering to the surface of the positive electrode active material is usually 0.1 ppm or more, preferably 1 ppm or more, more preferably 10 ppm or more, and is usually 20% or less, preferably 10% or less, more preferably 5% or less, with respect to the mass of the positive electrode active material.

The surface adhering substance can suppress the oxidation reaction of the nonaqueous electrolytic solution on the surface of the positive electrode active material, thereby extending the battery life. When the amount of the adhered substance is below this range, the effects may not be obtained sufficiently. On the other hand, when the amount is above this range, the adherent may inhibit the entry and exit of alkali metal ions to cause an increase in the resistance.

(3) Shapes

The shapes of the particles of the positive electrode active material may be conventional shapes such as bulky masses, polyhedrons, spheres, ellipses, plates, needles and columns. In particular, primary particles are preferably aggregated to form secondary particles that have a shape of sphere or ellipse.

In an electrochemical device, active materials in the electrode usually expand and contract during charging and discharging, and thus generated stress is likely to cause deteriorations such as disruption of the active materials and breakage of conductive path. Thus, the active material is preferably formed by aggregation of primary particles to form secondary particles, rather than being composed of single particles of only primary particles, because the stress due to expansion and contraction can be alleviated and the deteriorations can be prevented.

Further, the particles are preferably spherical or ellipsoidal rather than being orientated particles such as plate particles, because the orientation during formation of the electrode is small, and thus expansion and contraction of the electrode during charging and discharging are also small, and because the particles are likely to be uniformly mixed with the conductive material during preparation of the electrode.

(4) Tapped Density

The tapped density of the positive electrode active material is usually 0.4 g/cm$^3$ or more, preferably 0.6 g/cm$^3$ or more, still more preferably 0.8 g/cm$^3$ or more, particularly preferably 1.0 g/cm$^3$ or more, and is usually 4.0 g/cm$^3$ or less, preferably 3.8 g/cm$^3$ or less.

When a metal composite oxide powder with a high tapped density is used, a positive electrode active material layer with high density can be formed. Thus, when the tapped density of the positive electrode active material is below this range, the amount of the dispersion medium required during formation of the positive electrode active material layer may be increased while the amounts of the conductive material and the binder required may be increased, so that the filling rate of the positive electrode active materials to the positive electrode active material layer may be limited, and the battery capacity may be limited. In general, a higher tapped density is more preferable, and the upper limit is not particularly limited. However, when the tapped density is above this range, the diffusion rate of the alkali metal ions in the nonaqueous electrolytic solution as a medium in the positive electrode active material layer may be limited, and the load characteristics may likely to be deteriorated.

The tapped density is measured by allowing the particles to fall into a 20 cm$^3$ tapping cell through a sieve having a mesh opening of 300 μm until the sample fills the cell volume, and tapping the cell 1000 times with a slide stroke of 10 mm with use of a powder density meter (for example, Seishin Enterprise Tap Denser). The tapped density is calculated based on the volume and the mass of the sample. The tapped density calculated in the measurement is defined as the tapped density of the positive electrode active material in the present invention.

(5) Median Diameter d50

The median diameter d50 of the particles of the positive electrode active material (the secondary particle diameter when the primary particles are aggregated into secondary particles) can be measured using a laser diffraction/scattering particle diameter distribution analyzer.

The median diameter d50 is usually 0.1 μm or more, preferably 0.5 μm or more, more preferably 1 μm or more, still more preferably 3 μm or more, and is usually 20 μm or less, preferably 18 μm or less, more preferably 16 μm or less, still more preferably 15 μm or less. When the median diameter d50 is below this range, products with high bulk densities may not be obtained. On the other hand, when the median diameter d50 is above this range, diffusion of lithium in particles may take more time. This may lead to deterioration of the battery characteristics. This may also cause streaks or the like when the positive electrode of the battery is prepared, or when the active material is combined with the conductive material, the binder, and the like in a solvent to form a slurry and applied in a thin film.

When two or more of the positive electrode active materials having different median diameters d50 are mixed at any ratio, the filling property during preparation of the positive electrode can be further improved.

The median diameter d50 can be measured after ultrasonic dispersion for 5 minutes in 0.1% by mass aqueous sodium hexametaphosphate solution as a dispersion medium, using, for example, Horiba LA-920 as a particle size distribution analyzer, with the refractive index set to 1.24.

(6) Average Primary Particle Diameter

When primary particles are aggregated into secondary particles, the average primary particle diameter of the positive electrode active material is usually 0.03 μm or more, preferably 0.05 μm or more, more preferably 0.08 μm or more, still more preferably 0.1 μm or more, and is usually 5 μm or less, preferably 4 μm or less, more preferably 3 μm or less, still more preferably 2 μm or less. When the average primary particle diameter is above this range, spherical secondary particles may hardly be formed, which may adversely affect the powder filling property and significantly decrease the specific surface area, so that battery performances such as output characteristics may more likely to be deteriorated. On the other hand, when the average primary particle diameter is below this range, typically, deteriorated performances of the secondary battery may be obtained, including deteriorated reversibility during charging and discharging due to underdeveloped crystals.

The average primary particle diameter is determined by observation using a scanning electron microscope (SEM). Specifically, the average primary particle diameter is determined by measuring the largest length of a segment defined by a horizontal straight line intersecting the primary particle, with respect to fifty random primary particles, in a photograph at a magnification of 10,000, and averaging the values.

(7) BET Specific Surface Area

The BET specific surface area of the positive electrode active material as measured by BET method is usually 0.1 $m^2/g$ or more, preferably 0.2 $m^2/g$ or more, more preferably 0.3 $m^2/g$ or more, and is usually 50 $m^2/g$ or less, preferably 40 $m^2/g$ or less, more preferably 30 $m^2/g$ or less. When the BET specific surface area value is below this range, the battery performance is likely to be deteriorated. On the other hand, when the value is above this range, the tapped density may hardly increase, and the application properties during formation of the positive electrode active material may be deteriorated.

The BET specific surface area is measured using a surface area meter (for example, automatic surface area measuring apparatus manufactured by Okura Riken). The measurement is performed by preliminarily drying the sample at 150° C. under a stream of nitrogen for 30 minutes and then analyzing it by flowing nitrogen gas adsorption (BET single point method) using a nitrogen-helium mixed gas prepared so that the pressure of nitrogen relative to the atmospheric pressure is exactly 0.3. The specific surface area determined in the measurement is defined as the BET specific surface area of the positive electrode active material in the present invention.

(8) Method for Producing Positive Electrode Active Material

The method for producing the positive electrode active material is not particularly limited without departing from the scope and spirit of the invention. Examples include several methods, and common methods for producing inorganic compounds are used.

Various methods may be used particularly when spherical or ellipsoidal active materials are produced. An exemplary method comprises dissolving or grinding and dispersing a transition metal source material such as a transition metal nitrate or a transition metal sulfate, and source materials for other elements as needed in a solvent such as water, adjusting the pH with stirring to prepare a spherical precursor, then recovering the spherical precursor and drying it as needed, and adding an alkali metal source such as AOH, $A_2CO_3$, or $ANO_3$ (wherein A represents at least one element selected from the group consisting of Li, Na, and K), and firing the mixture at a high temperature to obtain an active material.

Another exemplary method comprises dissolving or grinding and dispersing a transition metal source material such as a transition metal nitrate, sulfate, hydroxide, or oxide, and source materials for other elements as needed in a solvent such as water, drying the solution or dispersion with a spray dryer or the like to form a spherical or ellipsoidal precursor, adding an alkali metal source such as AOH, $A_2CO_3$, or $ANO_3$ (wherein A represents at least one element selected from the group consisting of Li, Na, and K) to the precursor, and firing the mixture at a high temperature to obtain an active material.

A still another exemplary method comprises dissolving or grinding and dispersing a transition metal source material such as a transition metal nitrate, sulfate, hydroxide, or oxide, an alkali metal source such as AOH, $A_2CO_3$, or $ANO_3$ (wherein A represents at least one element selected from the group consisting of Li, Na, and K), and source materials for other elements as needed in a solvent such as water, drying the solution or dispersion with a spray dryer or the like to form a spherical or ellipsoidal precursor, and firing the precursor at a high temperature to obtain an active material.

<2-4-2. Structure and Preparation Method of Electrode>

Hereinafter, the structure of and the method of preparing the positive electrode used in the present invention will be described.

(1) Method of Preparing Positive Electrode

The positive electrode is prepared by forming a positive electrode active material layer containing the positive electrode active material particle and a binder on a current collector. The positive electrode may be produced using the positive electrode active material by any known methods. That is, the positive electrode may be obtained by dry-mixing the positive electrode active material and a binder, as well as a conductive material, a thickener, and the like as needed to form a sheet, and pressing the sheet on a positive electrode current collector, or by dissolving or dispersing these materials in a liquid medium to form a slurry, applying the slurry to a positive electrode current collector, and drying it to form a positive electrode active material layer on a current collector.

The content of the positive electrode active material in the positive electrode active material layer is preferably 80% by mass or more, more preferably 82% by mass or more, still more preferably 84% by mass or more. Also, the content is preferably 99% by mass or less, more preferably 98% by mass or less. When the content of the positive electrode active material in the positive electrode active material layer is small, the electric capacity may be insufficient. On the other hand, when the content is too large, the strength of the positive electrode may be insufficient. In the present invention, the positive electrode active material powders may be used alone or in any combination of two or more having different compositions or different powder physical properties at any ratio.

(2) Conductive Material

The conductive material may be any known conductive material. Specific examples include metal materials such as copper and nickel; graphites such as natural graphite and synthetic graphite; carbon blacks such as acetylene black; and carbonaceous materials such as amorphous carbon, including needle coke. These may be used alone or in any combination of two or more at any ratio.

The conductive material is used in the positive electrode active material layer at a content of usually 0.01% by mass or more, preferably 0.1% by mass or more, more preferably 1% by mass or more, and of usually 50% by mass or less, preferably 30% by mass or less, more preferably 15% by mass or less. When the content is below this range, the conductivity may be insufficient. On the other hand, when the content is above this range, the battery capacity may be decreased.

(3) Binder

The binder used in production of the positive electrode active material is not particularly limited as long as it is a material that is stable to the nonaqueous electrolytic solution and the solvent used in production of the electrode.

In the application method, the binder may be any materials capable of being dissolved or dispersed in the liquid medium used in production of the electrode. Specific examples include resin polymers such as polyethylene, polypropylene, polyethylene terephthalate, polymethyl methacrylate, aromatic polyamide, cellulose, and nitrocellulose; rubbery polymers such as SBR (styrene-butadiene rubber), NBR (acrylonitrile-butadiene rubber), fluororubber, isoprene rubber, butadiene rubber, and ethylene-propylene rubber; thermoplastic elastomeric polymers such as styrene-butadiene-styrene block copolymer and hydrogenated products thereof, EPDM (ethylene-propylene-diene terpolymer), styrene-ethylene-butadiene-ethylene copolymer, styreneisoprene-styrene-block copolymer and hydrogenated product thereof; flexible resin polymers such as syndiotactic 1,2-polybutadiene, polyvinyl acetate, ethylene-vinyl acetate copolymer, and propylene-α-olefin copolymer; fluorine-containing polymers such as polyvinylidene difluoride (PVdF), polytetrafluoroethylene, fluorinated polyvinylidene fluoride, and polytetrafluoroethylene-ethylene copolymer; and polymer compositions having an ion conductivity for alkali metal ion (in particular, lithium ion). These materials may be used alone or in any combination of two or more at any ratio.

The percentage of the binder in the positive electrode active material layer is usually 0.1% by mass or more, preferably 1% by mass or more, more preferably 3% by mass or more, and is usually 50% by mass or less, preferably 30% by mass or less, more preferably 10% by mass or less, still more preferably 8% by mass or less. The percentage of the binder is preferably within this range, because the positive electrode active material can be sufficiently retained and the mechanical strength of the positive electrode can be maintained, and from the viewpoint of the cycle characteristics, the battery capacity and the conductivity.

(4) Liquid Medium

The liquid medium for forming the slurry may be any types of solvents without limitation as long as the positive electrode active material, the conductive material, and the binder, as well as a thickener optionally used, can be dissolved or dispersed in the solvent. The solvent may be aqueous or organic solvent.

Examples of the aqueous medium include water, and mixed media of alcohols and water. Examples of the organic medium include aliphatic hydrocarbons such as hexane; aromatic hydrocarbons such as benzene, toluene, xylene, and methylnaphthalene; heterocyclic compounds such as quinoline, and pyridine; ketones such as acetone, methyl ethyl ketone, and cyclohexanone; esters such as methyl acetate, and methyl acrylate; amines such as diethylenetriamine, and N,N-dimethylaminopropylamine; ethers such as diethyl ether, and tetrahydrofuran (THF); amides such as N-methylpyrrolidone (NMP), dimethylformamide, and dimethylacetamide; aprotic polar solvents such as hexamethylphosphoramide, and dimethyl sulfoxide. These may be used alone or in any combination of two or more at any ratio.

(5) Thickener

When the liquid medium used for forming a slurry is an aqueous medium, the slurry is preferably prepared using a thickener and a latex such as styrene butadiene rubber (SBR). The thickener is usually used to adjust the viscosity of the slurry.

Any thickener may be used as long as it does not significantly limit the effects of the present invention. Specific examples include carboxymethylcellulose, methylcellulose, hydroxy methylcellulose, ethylcellulose, polyvinyl alcohol, oxidized starch, phosphorylated starch, casein, and salts thereof. These may be used alone or in any combination of two or more at any ratio.

When the thickener is used, the percentage of the thickener in the positive electrode active material layer is usually 0.1% by mass or more, preferably 0.5% by mass or more, more preferably 0.6% by mass or more, and is usually 5% by mass or less, preferably 3% by mass or less, more preferably 2% by mass or less. When the percentage is below this range, the application properties may be significantly deteriorated. On the other hand, when the percentage is above this range, the ratio of the active material in the positive electrode active material layer may be decreased, which may cause a problem of decrease in battery capacity or an increase in resistance between positive electrode active materials.

(6) Compaction

In order to increase the packing density of the positive electrode active material, the positive electrode active material layer formed by application and drying is preferably compacted with a hand press, roller press, or the like. The density of the positive electrode active material layer is preferably 1 $g/cm^3$ or more, more preferably 1.5 $g/cm^3$ or more, still more preferably 2 $g/cm^3$ or more, and is preferably 4 $g/cm^3$ or less, more preferably 3.5 $g/cm^3$ or less, still more preferably 3 $g/cm^3$ or less.

When the density of the positive electrode active material layer is above this range, the permeability of the nonaqueous electrolytic solution to the vicinity of the current collector/active material interface may be decreased, and particularly the high-current-density charge/discharge characteristics may be deteriorated. On the other hand, when the density is below this range, the conductivity between the active materials may be reduced, and the battery resistance may be increased.

(7) Current Collector

The material for the positive electrode current collector is not particularly limited, and any known materials can be used. Specific examples include metal materials such as aluminum, stainless steel, nickel plate, titanium, and tantalum; and carbonaceous materials such as carbon cloth, and carbon paper. Among them, metal materials, particularly aluminum is preferred.

Examples of the shape of the current collector when the metal materials are used include metal foils, metal cylinders, metal coils, metal plates, metal thin films, expanded metals, perforated metals and foamed metals. When the carbonaceous materials are used, carbonaceous plates, carbonaceous thin films, and carbonaceous cylinders are included. Among them, metal thin films are preferred. The thin films may be formed into a mesh shape as appropriate.

The current collector may be used in any thickness, usually 1 μm or more, preferably 3 μm or more, more preferably 5 μm or more, and usually 1 mm or less, preferably 100 μm or less, more preferably 50 μm or less. The thickness of the thin film is preferably within this range, because the strength necessary for the current collector can be maintained, and from the viewpoint of handleability.

The thickness ratio of the positive electrode active material layer to the current collector is not particularly limited. The value of "(thickness of positive electrode active material layer per side immediately before injection of electrolytic solution)/(thickness of current collector)" is usually 20 or less, preferably 15 or less, more preferably 10 or less, and is usually 0.5 or more, preferably 0.8 or more, more preferably 1 or more. When the thickness ratio is above this range, the current collector may generate heat due to Joule heat during charging and discharging at high current density. On the other hand, when the thickness ratio is below this range, the volume ratio of the current collector to the positive electrode active material is increased, so that the battery capacity may be decreased.

<2-5. Separator>

A separator is usually disposed between the positive electrode and the negative electrode to prevent short circuits. In this case, the separator is usually impregnated with the nonaqueous electrolytic solution of the invention.

The material and the shape of the separator is not particularly limited, and any known materials and shapes may be used as long as the effects of the invention are not significantly impaired. In particular, separators formed of materials which are stable to the nonaqueous electrolytic solution of the invention such as resins, glass fibers and inorganic substances. Separators having excellent liquid retention properties, such as those in the forms of a porous sheet and a nonwoven fabric, are preferably used.

Examples of materials for the resin and glass fiber separators include polyolefins such as polyethylene and polypropylene, polytetrafluoroethylene, polyethersulfone and glass filters. In particular, glass filters and polyolefins are preferable, and polyolefins are more preferable. These materials may be used alone or in any combination of two or more at any ratio.

The separator may be used in any thickness, usually 1 µm or more, preferably 5 µm or more, more preferably 10 µm or more, and usually 50 µm or less, preferably 40 µm or less, more preferably 30 µm or less. When the separator is too thin as compared with this range, the insulating properties and the mechanical strength may be deteriorated. On the other hand, when the separator is too thick as compared with this range, not only the battery performance such as rate characteristics may be deteriorated, but also the energy density of the entire power storage device may be decreased.

When a porous separator such as a porous sheet or a nonwoven fabric is used, the porosity of the separator is any value, and is usually 20% or more, preferably 35% or more, more preferably 45% or more, and is usually 90% or less, preferably 85% or less, more preferably 75% or less. When the porosity is too small as compared with this range, the membrane resistance may be increased, and the rate characteristics may tend to be deteriorated. On the other hand, when the porosity is too large as compared with this range, the mechanical strength of the separator may be decreased, and the insulating properties may tend to be deteriorated.

The average pore diameter of the separator is also any value, and is usually 0.5 µm or less, preferably 0.2 µm or less, and is usually 0.05 µm or more. When the average pore diameter is above this range, short circuits are likely to occur. On the other hand, when the average pore diameter is below this range, the membrane resistance may be increased, and the rate characteristics may be deteriorated.

Examples of materials for the inorganic separator include oxides such as alumina and silicon dioxide, nitrides such as aluminum nitride and silicon nitride, and sulfates such as barium sulfate and calcium sulfate. Particulate or fibrous materials are used.

The forms of such separators may be thin films such as nonwoven fabrics, woven fabrics and microporous films. In the shape of thin film, separators having a pore diameter of 0.01 to 1 µm and a thickness of 5 to 50 µm are suitably used. Other than the independent thin film separators, separators comprising composite porous layers containing particles of the inorganic substance formed on the surface of the positive electrode and/or negative electrode using a resin binder can be used. For example, porous layers may be formed on both sides of the positive electrode using alumina particles having a D90 particle diameter of less than 1 µm and a fluorine resin as a binder.

<2-6. Battery Design>

[Electrode Assembly]

The electrode assembly may be any of a structure in which the positive electrode plate and the negative electrode plate described above are laminated via the separator described above and a structure in which the positive electrode plate and the negative electrode plate are wound via the separator into a coil. The percentage of the volume of the electrode assembly to the internal volume of the battery (hereinafter may also be referred to as "electrode assembly occupancy") is usually 40% or more, preferably 50% or more, and is usually 90% or less, preferably 80% or less. When the electrode assembly occupancy is below this range, the battery capacity is decreased. On the other hand, when the electrode assembly occupancy is above this range, the void space may be small, and the battery may be at a high temperature. This may cause the members to expand or the vapor pressures of liquid components of the electrolyte to increase, leading to rise of the internal pressure. This may lead to deteriorations in several characteristics such as repeated charge-discharge characteristics and high-temperature storage characteristics, and actuation of a gas release valve to release the internal pressure to the outside.

[Current Collecting Structure]

The current collecting structure is not particularly limited, and is preferably such structures that the resistance at wiring and joint parts is low in order to more effectively achieve the improvement of the discharge characteristics by the nonaqueous electrolytic solution of the present invention. When the internal resistance is reduced as described above, the effects obtained by using the nonaqueous electrolytic solution of the present invention is particularly well exhibited.

In the case of an electrode assembly having the laminated structure described above, a current collecting structure formed by welding bundles of metallic core parts of the respective electrode layers to terminals is preferably used. Since a larger electrode area leads to a higher internal resistance, a plurality of terminals are preferably disposed in the electrode to decrease the resistance. In the case of an electrode assembly having the wound structure described above, a plurality of lead structures can be provided on each of the positive and the negative electrodes, and the bundles of the lead structures can be connected to respective terminals to decrease the internal resistance.

[Exterior Case]

Materials of the exterior case are not particularly limited as long as they are stable substance to the nonaqueous electrolytic solution used. Specific examples include metals such as nickel-plated steel sheets, stainless steel, aluminum, aluminum alloys and magnesium alloys, and resin-aluminum laminate films. From the viewpoint of weight reduction, metals such as aluminum and aluminum alloys, and laminate films are suitably used.

Exterior cases made of the metals described above include those having a tightly sealed structure formed by welding the metals by laser beam welding, resistance welding or ultrasonic welding, and those having a caulking structure using the metals via resin gaskets. Exterior cases using the laminate films described above include those having a tightly sealed structure formed by heat-sealing of the resin layers. In order to enhance the sealing properties, resins different from the resin used in the laminate film may be arranged between the resin layers. In particular, when a sealed structure is formed by heat-sealing of resin layers via current-collecting terminals, which requires joining between metals and resins, resins containing polar groups and resins modified by introduction of polar groups are suitably used.

[Protective Element]

Protective elements described above include PTC (Positive Temperature Coefficient), thermal fuses, and thermistors that increase the resistance when abnormal heat generation or overcurrent occurs, and valves that interrupt the current flow passing through the circuit upon a rapid increase in the pressure or temperature within the battery due to abnormal heat generation (current cutoff valve). Preferably, from the protective elements, those that do not operate in normal use at a high current are selected. More preferably, designs are made such that abnormal heat generation and thermal runaway can be avoided even without protective elements, from the viewpoint of the output characteristics.

[Exterior Package]

The power storage device according to one aspect of the present invention usually comprises the nonaqueous electrolytic solution, the negative electrode, the positive electrode, the separator, and the like contained in an exterior package. The exterior package is not limited, and any known exterior package may be used as long as the effects of the invention are not significantly impaired.

The exterior package may be made of any material, specifically including nickel plated iron, stainless steel, aluminum, aluminum alloys, nickel, and titanium in general.

The exterior package may have any shape, including cylindrical, rectangular, laminated, coin-shaped, and large-capacity exterior package.

(Second Aspect of the Present Invention)

<1. Power Storage Device>

The power storage device according to the second aspect of the present invention comprises an electrolytic solution, a positive electrode and a negative electrode, wherein said electrolytic solution comprises a nonaqueous solvent and a compound represented by the above formula (1) and wherein said positive electrode contains a composite oxide represented by the following formula (7):

$$A_aNi_xCo_yMn_zM'_bO_2 \quad (7)$$

wherein, $0<a<1.2$; $x+y+z+b=1$; $0<x<1$; $0<y<1$; $0<z<1$; $0\leq b<0.3$; A is an alkali metal; and M' is at least one selected from V, Fe, Cu, Nb, Mo, Ta, W, Zn, Ti, Zr, Al, Mg, Li, Na and K.

The power storage device according to the second aspect generally comprises a nonaqueous electrolytic solution containing a nonaqueous solvent and the compound described above, a positive electrode having a current collector and a positive electrode active material layer formed on the current collector, which positive electrode active material layer contains at least the composite oxide, and a negative electrode having a current collector and a negative electrode active material layer formed on the current collector and capable of occluding and discharging ions. It is noted that, hereinafter, the compound represented by the formula (1) may also be referred to as "compound (1)," and the composite oxide represented by the formula (7) may also be referred to as "composite oxide (7)."

The power storage device according to the second aspect provides effects of enabling low resistance, and low resistance increase rate after durability test and excellent capacity retention rate after durability test. The reason why the power storage device according to the second aspect provides the effects is estimated as below.

In general, deterioration of the battery life of power storage devices has been resulted from an increase in the resistance and a decrease in the capacity retention rate due to side reactions occurring on the positive electrode during a durability test. On the positive electrode, for example, surface deterioration of the positive electrode will occur along with the oxidation of the electrolytic solution and reduced products released from the negative electrode on the positive electrode active material. On the other hand, on the negative electrode, a solvent is reductively decomposed while the surface of the negative electrode active material exposed by the gradual peeling of the organic film formed by reduction of the solvent during the initial charge under a voltage of about 1 V is the starting point of the reaction. It is noted that the organic film can be electrochemically unstable and be peeled off at higher than 1 V which is the voltage for reductive decomposition.

According to the investigation by the present inventors, the compound (1) presumably reduces the side reactions by coordination to the surface of the positive electrode. In addition to the organic film formed by reduction of the solvent during initial charge at about 1 V, a film derived from the compound (1) is assumed to be formed on the negative electrode. Due to the electrochemical instability and the ununiformity of the passivation layer on the negative electrode, the compound (1)-derived passivation layer on the negative electrode may lead to inability to completely suppress side reactions on the surface of the negative electrode during charging and discharging, which may accelerate the deterioration of the battery, such as a decrease in charge/discharge capacity. In general, when $LiCoO_2$ is used in the positive electrode, the voltage of the negative electrode of a power storage device in a discharge state is 1 V or more. In addition to the organic film, a passivation layer on the negative electrode derived from the compound (1) is assumed to be formed in a power storage device using an $LiCoO_2$ positive electrode and the compound (1). In such a power storage device in a discharge state, the negative electrode voltage always exceeds 1 V, and thus the side reactions on the negative electrode are amplified.

On the other hand, in the power storage device using the composite oxide (7), the amplification of the side reactions on the negative electrode as described above can be presumably reduced. Thus, use of the composite oxide (7) can provide a power storage device having a low initial resistance, a good capacity retention rate and thus a low resistance, and a low resistance increase rate after durability test and thus an excellent capacity retention rate after durability test.

Furthermore, when the nonaqueous electrolytic solution further contains suitable salts in combination with the compound (1), the resistance increase rate after durability test can be decreased and the capacity retention rate after durability test can be increased. The reason for this is presumed to be as described below. When the compound (1) is combined, a film derived from the compound (1) is usually formed on the negative electrode of the power storage device. The compound (1)-derived passivation layer on the negative electrode may lead to inability to completely suppress side reactions on the surface of the negative electrode during charging and discharging, due to the electrochemical instability and the ununiformity of the passivation layer on the negative electrode, which may accelerate the deterioration of the battery, such as a decrease in charge/discharge capacity. On the other hand, since the salt is an ionic compound, the anion of the salt is presumably attracted to the negative electrode upon initial charge, and a film derived from the salt is easily formed on the negative electrode to form a uniform and electrochemically stable film, so that side reactions on the surface of the negative electrode can be suppressed. In addition, since the salt-derived film increases the ion concentration on the surface of the negative electrode, it presumably contributes to improvement of the ion conductivity of the negative electrode surface. Thus, when the compound (1) and a specific salt are combined in the nonaqueous electrolytic solution, the salt-derived film is preferentially formed on the negative electrode, inhibiting the formation of the compound (1)-derived passivation layer on the negative electrode, and thereby, presumably, contributing to improvement of the electrochemical stability of the passivation layer on the negative electrode of the power storage device and alleviation of the ununiformity of the passivation layer on the negative electrode.

Examples of the power storage device include lithium batteries (in the second aspect, the term "lithium battery" is a generic term for lithium primary batteries and lithium secondary batteries), multivalent cation batteries, metal-air secondary batteries, secondary batteries using s-block metals other than the above, lithium-ion capacitors, and electric double-layer capacitors. In particular, the power storage device is preferably a nonaqueous electrolyte secondary battery, more preferably a lithium secondary battery or a lithium-ion capacitor, still more preferably a lithium secondary battery.

With respect to the configuration of the power storage device, conventionally known power storage device components may be used except for the nonaqueous electrolytic solution and the positive electrode described above. The power storage device typically has a structure in which a positive electrode and a negative electrode are stacked via a porous film (separator) impregnated with the nonaqueous electrolytic solution and are stored in an exterior case (exterior package). Thus, the nonaqueous electrolyte secondary battery may have any shape, including cylindrical, rectangular, laminated, coin-shaped, and large-capacity batteries.

<2. Nonaqueous Electrolytic Solution>

The nonaqueous electrolytic solution used in the power storage device contains a nonaqueous solvent and a compound represented by the above formula (1).

<2-1. Compound Represented by Formula (1)>

The nonaqueous electrolytic solution contains a compound represented by the above formula (1). In the above formula (1), any hydrogen atoms bonded to any carbon atoms may be substituted with fluorine atoms. However, those without substitution are particularly preferred, and the compound in the case is triethanolamine borate (TEAB).

The content of the compound represented by the formula (1) in the nonaqueous electrolytic solution is not particularly limited as long as the effects of the present invention are not significantly impaired. Specifically, the content of the compound is preferably 0.01 parts by mass or more, more preferably 0.05 parts by mass or more, still more preferably 0.1 parts by mass or more, with respect to 100 parts by mass of the nonaqueous solvent described above in the nonaqueous electrolytic solution. Also, the content is preferably 10 parts by mass or less, more preferably 3 parts by mass or less, still more preferably 2 parts by mass or less. When the concentration of the compound is within the above preferred range, the effects of improving the initial input/output characteristics, the input/output characteristics after high-temperature storage and after cycles can be further easily obtained.

<2-2. Nonaqueous Solvent>

The nonaqueous electrolytic solution contains a nonaqueous solvent for dissolving the electrolyte as the main component. The nonaqueous solvent is not particularly limited, and any known organic solvents may be used. Preferred examples of the organic solvents include, but not particularly limited to, at least one selected from saturated cyclic carbonates, linear carbonates, linear carboxylic acid esters, cyclic carboxylic acid esters, ethers and sulfone compounds. These may be used alone or in combination of two or more. More specifically, the same as those listed in the section <1-5. Nonaqueous Solvent> in the description of the first aspect of the present invention may be used.

<2-3. Salt>

The nonaqueous electrolytic solution preferably contains at least one salt selected from the group consisting of fluorophosphates, fluorosulfonates, imide salts and oxalate salts from the viewpoint of reducing the battery internal resistance without lowering the ion conductivity of the nonaqueous electrolytic solution. These may be used alone or in combination of two or more.

Preferred examples of the at least one salt selected from the group consisting of fluorophosphates, fluorosulfonates, imide salts and oxalate salts include, but not limited to, fluorophosphates represented by $M^1PO_aF_{6-a}$ (wherein a represents an integer of 0, 2 or 3, and $M^1$ represents an alkali metal); phosphorus-containing oxalate salts represented by $M^2PF_{6-2b}(C_2O_4)_b$ (wherein b represents an integer of 1 to 3, and $M^2$ represents an alkali metal); boron-containing oxalate salts represented by $M^3BF_{4-2c}(C_2O_4)_c$ (wherein c represents an integer of 1 or 2, and $M^3$ represents an alkali metal); fluorosulfonates represented by $FSO_3M^4$ (wherein $M^4$ represents an alkali metal); and imide salts represented by $M^5N(SO_2F)_2$ (wherein $M^5$ represents an alkali metal).

More specific examples of the at least one salt include fluorophosphates such as $LiPF_6$, $NaPF_6$, $KPF_6$, $LiPO_2F_2$, $LiPO_3F$, $NaPO_2F_2$, $NaPO_3F$, $KPO_2F_2$, and $KPO_3F$; phosphorus-containing oxalate salts such as $LiPF_4(C_2O_4)$. $LiPF_2(C_2O_4)_2$, $LiP(C_2O_4)_3$, $NaPF_4(C_2O_4)$, $NaPF_2(C_2O_4)_2$, $NaP(C_2O_4)_3$, $KPF_4(C_2O_4)$, $KPF_2(C_2O_4)_2$, and $KP(C_2O_4)_3$; boric acid-containing oxalate salts such as $LiBF_2(C_2O_4)$. $LiB(C_2O_4)_2$, $NaBF_2(C_2O_4)$ $NaB(C_2O_4)_2$, $KBF_2(C_2O_4)$ and $KB(C_2O_4)_2$; fluorosulfonates such as $FSO_3Li$, $FSO_3Na$, and $FSO_3K$; and imide salts such as $LiN(SO_2F)_2$, $NaN(SO_2F)_2$, and $KN(SO_2F)_2$.

Among them, at least one selected from $M^1PO_2F_2$, $M^2PF_4(C_2O_4)$, $M^2PF_2(C_2O_4)_2$, $M^2P(C_2O_4)_3$, $M^3BF_2(C_2O_4)$, $M^3B(C_2O_4)_2$, $FSO_3M^4$, and $M^5N(SO_2F)_2$ is particularly preferably contained, from the viewpoints that effects of improving the initial input/output characteristics, the high-rate charge/discharge characteristics, and output characteristics after high temperature storage and after cycles can be further easily obtained, and that significant effects of improving the electrochemical stability of the passivation layer on the negative electrode and alleviating the ununiformity of the passivation layer on the negative electrode in the nonaqueous electrolytic solution using the compound (B) can be obtained. Among the above, at least one selected from the group consisting of $LiPO_2F_2$, $FSO_3Li$, $LiN(FSO_2)_2$. $LiF_2P(C_2O_4)_2$ and $LiB(C_2O_4)_2$ is preferably contained.

When the nonaqueous electrolytic solution contains the salts described above, the preparation method is not particularly limited and any known method may be used. For example, a method comprising synthesizing a salt separately by a known method and adding it to an electrolytic solution containing the compound represented by the above formula (1), or allowing it to co-exist with battery components such as active materials and electrode plates described later may be used. In the present invention, any of the methods may be used.

The methods for measuring the contents of the nonaqueous electrolytic solution the salt described above are not particularly limited, and any known methods may be used. Specific examples include ion chromatography and nuclear magnetic resonance spectroscopy.

The nonaqueous electrolytic solution preferably contains the salts as secondary electrolytes. The content of the salts is not particularly limited as long as the effects of the present invention are not significantly impaired. Specifically, the content of the salts is preferably 0.01 parts by mass or more, more preferably 0.05 parts by mass or more, still more preferably 0.1 parts by mass or more, with respect to the total amount of the nonaqueous electrolytic solution. Also, the content is preferably 10 parts by mass or less, more preferably 5 parts by mass or less, still more preferably 2.5 parts by mass or less. When the concentration of the salts is within the above preferred range, the effects of improving the initial input/output characteristics, the capacities and the output characteristics after high-temperature storage and after cycles can be further easily obtained.

<2-4. Other Salts>

In the second aspect, the nonaqueous electrolytic solution preferably contains at least one salt selected from the group consisting of fluorophosphates, fluorosulfonates, imide salts and oxalate salts, and may further contain other salts.

Examples of the other salts include inorganic salts other than the salt described above, such as $LiClO_4$, $LiAlF_4$, $LiSbF_6$, $LiTaF_6$, $LiWOF_5$, and $LiWF_7$;

carboxylates such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$;

sulfonates other than the salt described above, such as $CH_3SO_3Na$, $CH_3SO_3K$, $CH_3SO_3Li$, $CH_3CH_2SO_3Li$;

sulfates such as lithium methyl sulfate, lithium ethyl sulfate, lithium 2-propynyl sulfate, lithium 1-methyl-2-propynyl sulfate, lithium 1,1-dimethyl-2-propynyl sulfate, lithium 2,2,2-trifluoroethyl sulfate, and dilithium ethylene disulfate;

methide salts such as $LiC(SO_2F)_3$, $LiC(CF_3SO_2)_3$, and $LiC(C_2F_5SO_2)_3$; and organic borates such as $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$. The other salts are not particularly limited thereto and may be used alone or in combination of two or more.

Among them, preferred examples are $LiSbF_6$, $LiTaF_6$, $LiWOF_5$, $LiWF_7$, from the viewpoint of the effects of improving the input/output characteristics, the high-rate charge/discharge characteristics, the high-temperature storage characteristics, the cycle characteristics and the like.

The content of at least one salt selected from the group consisting of fluorophosphates, fluorosulfonates, imide salts and oxalate salts in the nonaqueous electrolytic solution is not particularly limited as long as the effects of the present invention are not significantly impaired. Specifically, the molar content of the salts is preferably 0.001 mol/L or more, more preferably 0.005 mol/L or more, still more preferably 0.01 mol/L or more, in the nonaqueous electrolytic solution. Also, the molar content is preferably 5.0 mol/L or less, more preferably 3.0 mol/L or less, particularly preferably 1.5 mol/L or less. When the concentration of the salts is within the above preferred range, the total ion content in the nonaqueous electrolytic solution and the viscosity of the electrolytic solution are properly balanced, and thus the battery internal impedance is lowered without excessively decreasing the ion conductivity, so that the effects of improving the cycle characteristics and the input/output characteristics by the combination of hexafluorophosphate can be further easily obtained.

When salts other than the at least one salt selected from the group consisting of fluorophosphates, fluorosulfonates, imide salts and oxalate salts (other salts) are contained as secondary electrolytes, the content of the other salts is not particularly limited as long as the effects of the present invention are not significantly impaired. Specifically, the content of the other salts is preferably 0.01% by mass or more, more preferably 0.05% by mass or more, still more preferably 0.1% by mass or more, with respect to the total amount of the nonaqueous electrolytic solution. Also, the content is preferably 3% by mass or less, more preferably 2.5% by mass or less, still more preferably 2% by mass or less. The total concentration of the other salts described above in the nonaqueous electrolytic solution is not particularly limited, but is preferably within the above preferred range from the viewpoint of obtaining suitable electrical conductivity for battery operation.

<2-5. Auxiliary Agents>

In addition to the solvent, the compounds and the like described above, the nonaqueous electrolytic solution may contain those listed in the section <1-6. Auxiliary Agents>. The types and their preferred contents of the auxiliary agents are the same as those in the first aspect.

<3. Positive Electrode>

The positive electrode used in the power storage device contains a composite oxide (7) as the positive electrode active material. The positive electrode usually has a positive electrode active material layer on a current collector, which positive electrode active material layer contains a positive electrode active material. Hereinafter, the positive electrode active material will be described.

<3-1. Positive Electrode Active Material>

Hereinafter, the positive electrode active material used in the positive electrode will be described.

(1) Composition

The composite oxide (7) is represented by the following formula (7):

$$A_a Ni_x Co_y Mn_z M'_b O_2 \qquad (7)$$

In the formula (7), $0<a<1.2$; $x+y+z+b=1$; $0<x<1$; $0<y<1$; $0<z<1$; and $0\leq b<0.3$.

In the formula (7), A is an alkali metal, preferably Li, Na, or K, more preferably Li. As A in the formula (7), one metal or a plurality of different metals may be contained in the composite oxide.

In the formula (7), M' is at least one selected from V, Fe, Cu, Nb, Mo, Ta, W, Zn, Ti, Zr, Al, Mg, Li, Na and K. Among them, M' is preferably at least one selected from V, Fe, Cu, Nb, Mo, Ta and W, more preferably at least one selected from Nb, Mo, Ta and W, from the viewpoint of the improvement of the output characteristics. On the other hand, M' is preferably at least one selected from Zn, Ti, Zr, Al, Mg, Li, Na and K, more preferably at least one selected from Zr, Al, Mg and Li, from the viewpoint of the capacity retention rate after durability test.

In addition to the composite oxide (7), the positive electrode used in the present invention may contain other positive electrode active materials as long as they do not significantly impair the effects of the present invention. The other positive electrode active materials are not particularly limited as long as they do not correspond to the above formula (7) and are capable of electrochemically occluding and discharging s-block metal ions. For example, materials containing an alkali metal and at least one transition metal are preferably used. Specific examples include lithium-containing transition metal composite oxide, lithium-containing transition metal phosphate compounds, sodium-containing transition metal composite oxides, sodium-containing transition metal phosphate compounds, potassium-containing transition metal composite oxides, and potassium-containing transition metal phosphate compounds.

The other positive electrode active materials described above may be used alone or in combination of two or more.

(2) Surface Coating

Substances having a composition different from that of the material mainly contained in the positive electrode active material may be adhered to the surface of the positive electrode active material (hereinafter referred to as "surface adhering substance" as appropriate). Examples of the surface adhering substance include oxides such as aluminum oxide, silicon oxide, titanium oxide, zirconium oxide, magnesium oxide, calcium oxide, boron oxide, antimony oxide, and bismuth oxide; sulfates such as lithium sulfate, sodium sulfate, potassium sulfate, magnesium sulfate, calcium sulfate, and aluminum sulfate; carbonates such as lithium carbonate, sodium carbonate, calcium carbonate, and magnesium carbonate.

Examples of the method for adhering the surface adhering substance to the surface of the positive electrode active material include a method comprising dissolving or suspending the surface adhering substance in a solvent, impregnating the positive electrode active material with the solution or suspension, and drying the positive electrode active material; a method comprising dissolving or suspending a precursor of the surface adhering substance in a solvent, impregnating the positive electrode active material with the solution or suspension, and allowing to react by heating or the like; and a method comprising adding the surface adhering substance to a precursor of the positive electrode active material and firing the mixture at a time.

The mass of the surface adhering substance adhering to the surface of the positive electrode active material is usually 0.1 ppm or more, preferably 1 ppm or more, more preferably 10 ppm or more, and is usually 20% or less, preferably 10% or less, more preferably 5% or less, with respect to the mass of the positive electrode active material.

The surface adhering substance can suppress the oxidation reaction of the nonaqueous electrolytic solution on the surface of the positive electrode active material, thereby extending the battery life. When the amount of the adhered substance is below this range, the effects may not be obtained sufficiently. On the other hand, when the amount is above this range, the adherent may inhibit the entry and exit of alkali metal ions to cause an increase in the resistance.

(3) Shapes

The positive electrode active materials containing the composite oxide (7) are usually particles, which have conventionally used shapes such as bulky masses, polyhedrons, spheres, ellipses, plates, needles and columns. In particular, primary particles are preferably aggregated to form secondary particles that have a shape of sphere or ellipse.

In an electrochemical device, active materials in the electrode usually expand and contract during charging and discharging, and thus generated stress is likely to cause deteriorations such as disruption of the active materials and breakage of conductive path. Thus, the active material is preferably formed by aggregation of primary particles to form secondary particles, rather than being composed of single particles of only primary particles, because the stress due to expansion and contraction can be alleviated and the deteriorations can be prevented.

Further, the particles are preferably spherical or ellipsoidal rather than being orientated particles such as plate particles, because the orientation during formation of the electrode is small, and thus expansion and contraction of the electrode during charging and discharging are also small, and because the particles are likely to be uniformly mixed with the conductive material during preparation of the electrode.

(4) Physical Properties (Tapped Density)

The tapped density of the positive electrode active material is usually 0.4 g/cm$^3$ or more, preferably 0.6 g/cm$^3$ or more, still more preferably 0.8 g/cm$^3$ or more, particularly preferably 1.0 g/cm$^3$ or more, and is usually 4.0 g/cm$^3$ or less, preferably 3.8 g/cm$^3$ or less.

When a metal composite oxide powder with high tapped density is used, a positive electrode active material layer with high density can be formed. Thus, when the tapped density of the positive electrode active material is below this range, the amount of the dispersion medium required during formation of the positive electrode active material layer may be increased while the amounts of the conductive material and the binder required may be increased, so that the filling rate of the positive electrode active materials to the positive electrode active material layer may be limited, and the battery capacity may be limited. In general, a higher tapped density is more preferable, and the upper limit is not particularly limited. However, when the tapped density is below this range, the diffusion rate of the alkali metal ions in the nonaqueous electrolytic solution as a medium in the positive electrode active material layer may be limited, and the load characteristics may likely to be deteriorated.

The tapped density is measured by allowing the particles to fall into a 20 cm$^3$ tapping cell through a sieve having a mesh opening of 300 μm until the sample fills the cell volume, and tapping the cell 1000 times with a slide stroke of 10 mm with use of a powder density meter (for example, Seishin Enterprise Tap Denser). The tapped density is calculated based on the volume and the mass of the sample. The tapped density calculated in the measurement is defined as the tapped density of the positive electrode active material in the present invention.

(Median Diameter d50)

The median diameter d50 of the particles of the positive electrode active material (the secondary particle diameter when the primary particles are aggregated into secondary particles) can be measured using a laser diffraction/scattering particle diameter distribution analyzer.

The median diameter d50 is usually 0.1 μm or more, preferably 0.5 μm or more, more preferably 1 μm or more, still more preferably 3 μm or more, and is usually 20 μm or less, preferably 18 μm or less, more preferably 16 μm or less, still more preferably 15 μm or less. When the median diameter d50 is below this range, products with high bulk densities may not be obtained. On the other hand, when the median diameter d50 is above this range, diffusion of lithium in particles may take more time. This may lead to deterioration of the battery characteristics. This may also cause problems such as streaks when the positive electrode of the battery is prepared, or when the active material is combined with the conductive material, the binder, and the like in a solvent to form a slurry and applied in a thin film.

When two or more of the positive electrode active materials having different median diameters d50 are mixed at any ratio, the filling property during preparation of the positive electrode can be further improved.

The median diameter d50 can be measured after ultrasonic dispersion for 5 minutes in 0.1% by mass aqueous sodium hexametaphosphate solution as a dispersion medium, using, for example, Horiba LA-920 as a particle size distribution analyzer, with the refractive index set to 1.24.

(Average Primary Particle Diameter)

When primary particles are aggregated into secondary particles, the average primary particle diameter of the positive electrode active material is usually 0.03 μm or more, preferably 0.05 μm or more, more preferably 0.08 μm or more, still more preferably 0.1 μm or more, and is usually 5 μm or less, preferably 4 μm or less, more preferably 3 μm or less, still more preferably 2 μm or less. When the average primary particle diameter is above this range, spherical secondary particles may hardly be formed, which may adversely affect the powder filling property and significantly decrease the specific surface area, so that battery performances such as output characteristics may more likely to be deteriorated. On the other hand, when the average primary particle diameter is below this range, typically, deteriorated performances of the secondary battery may be obtained, including deteriorated reversibility during charging and discharging due to underdeveloped crystals.

The average primary particle diameter is determined by observation using a scanning electron microscope (SEM). Specifically, the average primary particle diameter is determined by measuring the largest length of a segment defined by a horizontal straight line intersecting the primary particle, with respect to fifty random primary particles, in a photograph at a magnification of 10,000, and averaging the values.

(BET Specific Surface Area)

The BET specific surface area of the positive electrode active material as measured by BET method is usually 0.1 $m^2/g$ or more, preferably 0.2 $m^2/g$ or more, more preferably 0.3 $m^2/g$ or more, and is usually 50 $m^2/g$ or less, preferably 40 $m^2/g$ or less, more preferably 30 $m^2/g$ or less. When the BET specific surface area value is below this range, the battery performance is likely to be deteriorated. On the other hand, when the value is above this range, the tapped density may hardly increase, and the application properties during formation of the positive electrode active material may be deteriorated.

The BET specific surface area is measured using a surface area meter (for example, automatic surface area measuring apparatus manufactured by Okura Riken). The measurement is performed by preliminarily drying the sample at 150° C. under a stream of nitrogen for 30 minutes and then analyzing it by flowing nitrogen gas adsorption (BET single point method) using a nitrogen-helium mixed gas prepared so that the pressure of nitrogen relative to the atmospheric pressure is exactly 0.3. The specific surface area determined in the measurement is defined as the BET specific surface area of the positive electrode active material in the present invention.

(Method for Producing Positive Electrode Active Material)

The method for producing the positive electrode active material is not particularly limited without departing from the scope and spirit of the invention. Examples include several methods, and common methods for producing inorganic compounds are used.

Various methods may be used particularly when spherical or ellipsoidal active materials are produced. An exemplary method comprises dissolving or grinding and dispersing a transition metal source material such as a transition metal nitrate or a transition metal sulfate, and source materials for other elements as needed in a solvent such as water, adjusting the pH with stirring to prepare a spherical precursor, then recovering the spherical precursor and drying it as needed, and adding an alkali metal source such as AOH, $A_2CO_3$, or $ANO_3$ (wherein A represents at least one element selected from the group consisting of Li, Na, and K), and firing the mixture at a high temperature to obtain an active material.

Another exemplary method comprises dissolving or grinding and dispersing a transition metal source material such as a transition metal nitrate, sulfate, hydroxide, or oxide, and source materials for other elements as needed in a solvent such as water, drying the solution or dispersion with a spray dryer or the like to form a spherical or ellipsoidal precursor, adding an alkali metal source such as AOH, $A_2CO_3$, or $ANO_3$ (wherein A represents at least one element selected from the group consisting of Li, Na, and K) to the precursor, and firing the mixture at a high temperature to obtain an active material.

A still another exemplary method comprises dissolving or grinding and dispersing a transition metal source material such as a transition metal nitrate, sulfate, hydroxide, or oxide, an alkali metal source such as AOH, $A_2CO_3$, or $ANO_3$ (wherein A represents at least one element selected from the group consisting of Li, Na, and K), and source materials for other elements as needed in a solvent such as water, drying the solution or dispersion with a spray dryer or the like to form a spherical or ellipsoidal precursor, and firing the precursor at a high temperature to obtain an active material.

<3-2. Structure and Preparation Method of Electrode>

Hereinafter, the structure of and the method of preparing the positive electrode used in the present invention will be described.

(1) Method of Preparing Positive Electrode

The positive electrode is prepared by forming a positive electrode active material layer containing the positive electrode active material particle and a binder on a current collector. The positive electrode may be produced using the positive electrode active material by any known methods. That is, the positive electrode may be obtained by dry-mixing the positive electrode active material and a binder, as well as a conductive material, a thickener, and the like as needed to form a sheet, and pressing the sheet on a positive electrode current collector, or by dissolving or dispersing these materials in a liquid medium to form a slurry, applying the slurry to a positive electrode current collector, and drying it to form a positive electrode active material layer on a current collector.

The content of the positive electrode active material in the positive electrode active material layer is preferably 80% by mass or more, more preferably 82% by mass or more, still more preferably 84% by mass or more. Also, the content is preferably 99% by mass or less, more preferably 98% by mass or less. When the content of the positive electrode active material in the positive electrode active material layer is small, the electric capacity may be insufficient. On the other hand, when the content is too large, the strength of the positive electrode may be insufficient. The positive electrode active material powders may be used alone or in any combination of two or more having different compositions or different powder physical properties at any ratio.

(2) Conductive Material

The conductive material may be any known conductive material. Specific examples include metal materials such as copper and nickel; graphites such as natural graphite and synthetic graphite; carbon blacks such as acetylene black; and carbonaceous materials such as amorphous carbon, including needle coke. These may be used alone or in any combination of two or more at any ratio.

The conductive material is used in the positive electrode active material layer at a content of usually 0.01% by mass or more, preferably 0.1% by mass or more, more preferably 1% by mass or more, and of usually 50% by mass or less, preferably 30% by mass or less, more preferably 15% by mass or less. When the content is below this range, the conductivity may be insufficient. On the other hand, when the content is above this range, the battery capacity may be decreased.

(3) Binder

The binder used in production of the positive electrode active material is not particularly limited as long as it is a material that is stable to the nonaqueous electrolytic solution and the solvent used in production of the electrode.

In the application method, the binder may be any materials capable of being dissolved or dispersed in the liquid medium used in production of the electrode. Specific examples include resin polymers such as polyethylene, polypropylene, polyethylene terephthalate, polymethyl methacrylate, aromatic polyamide, cellulose, and nitrocellulose; rubbery polymers such as SBR (styrene-butadiene rubber), NBR (acrylonitrile-butadiene rubber), fluororubber, isoprene rubber, butadiene rubber, and ethylene-propylene rubber; thermoplastic elastomeric polymers such as styrene-butadiene-styrene block copolymer and hydrogenated products thereof, EPDM (ethylene-propylene-diene terpolymer), styrene-ethylene-butadiene-ethylene copolymer, styrene-isoprene-styrene-block copolymer and hydrogenated product thereof; flexible resin polymers such as syndiotactic 1,2-polybutadiene, polyvinyl acetate, ethylene-vinyl acetate copolymer, and propylene-α-olefin copolymer; fluorine-containing polymers such as polyvinylidene difluoride (PVdF), polytetrafluoroethylene, fluorinated polyvinylidene fluoride, and polytetrafluoroethylene-ethylene copolymer; and polymer compositions having an ion conductivity for alkali metal ion (in particular, lithium ion). These materials may be used alone or in any combination of two or more at any ratio.

The percentage of the binder in the positive electrode active material layer is usually 0.1% by mass or more, preferably 1% by mass or more, more preferably 3% by mass or more, and is usually 50% by mass or less, preferably 30% by mass or less, more preferably 10% by mass or less, still more preferably 8% by mass or less. The percentage of the binder is preferably within this range, because the positive electrode active material can be sufficiently retained and the mechanical strength of the positive electrode can be maintained, and from the viewpoint of the cycle characteristics, the battery capacity and the conductivity.

(4) Liquid Medium

The liquid medium for forming the slurry may be any types of solvents without limitation as long as the positive electrode active material, the conductive material, and the binder, as well as a thickener optionally used, can be dissolved or dispersed in the solvent. The solvent may be aqueous or organic solvent.

Examples of the aqueous medium include water, and mixed media of alcohols and water. Examples of the organic medium include aliphatic hydrocarbons such as hexane; aromatic hydrocarbons such as benzene, toluene, xylene, and methylnaphthalene; heterocyclic compounds such as quinoline, and pyridine; ketones such as acetone, methyl ethyl ketone, and cyclohexanone; esters such as methyl acetate, and methyl acrylate; amines such as diethylenetriamine, and N,N-dimethylaminopropylamine; ethers such as diethyl ether, and tetrahydrofuran (THF); amides such as N-methylpyrrolidone (NMP), dimethylformamide, and dimethylacetamide; aprotic polar solvents such as hexamethylphosphoramide, and dimethyl sulfoxide. These may be used alone or in any combination of two or more at any ratio.

(5) Thickener

When the liquid medium used for forming a slurry is an aqueous medium, the slurry is preferably prepared using a thickener and a latex such as styrene butadiene rubber (SBR). The thickener is usually used to adjust the viscosity of the slurry.

Any thickener may be used as long as it does not significantly limit the effects of the present invention. Specific examples include carboxymethylcellulose, methylcellulose, hydroxy methylcellulose, ethylcellulose, polyvinyl alcohol, oxidized starch, phosphorylated starch, casein, and salts thereof. These may be used alone or in any combination of two or more at any ratio.

When the thickener is used, the percentage of the thickener in the positive electrode active material layer is usually 0.1% by mass or more, preferably 0.5% by mass or more, more preferably 0.6% by mass or more, and is usually 5% by mass or less, preferably 3% by mass or less, more preferably 2% by mass or less. When the percentage is below this range, the application properties may be significantly deteriorated. On the other hand, when the percentage is above this range, the ratio of the active material in the positive electrode active material layer may be decreased, which may cause a problem of decrease in battery capacity or an increase in resistance between positive electrode active materials.

(6) Compaction

In order to increase the packing density of the positive electrode active material, the positive electrode active material layer formed by application and drying is preferably compacted with a hand press, roller press, or the like. The density of the positive electrode active material layer is preferably 1 g/cm$^3$ or more, more preferably 1.5 g/cm$^3$ or more, still more preferably 2 g/cm$^3$ or more, and is preferably 4 g/cm$^3$ or less, more preferably 3.5 g/cm$^3$ or less, still more preferably 3 g/cm$^3$ or less.

When the density of the positive electrode active material layer is above this range, the permeability of the nonaqueous electrolytic solution to the vicinity of the current collector/active material interface may be decreased, and particularly the high-current-density charge/discharge characteristics may be deteriorated. On the other hand, when the density is below this range, the conductivity between the active materials may be reduced, and the battery resistance may be increased.

(7) Current Collector

The material for the positive electrode current collector is not particularly limited, and any known materials can be used. Specific examples include metal materials such as aluminum, stainless steel, nickel plate, titanium, and tantalum; and carbonaceous materials such as carbon cloth, and carbon paper. Among them, metal materials, particularly aluminum is preferred.

Examples of the shape of the current collector when the metal materials are used include metal foils, metal cylinders, metal coils, metal plates, metal thin films, expanded metals, perforated metals and foamed metals. When the carbonaceous materials are used, carbonaceous plates, carbonaceous thin films, and carbonaceous cylinders are included. Among them, metal thin films are preferred. The thin films may be formed into a mesh shape as appropriate.

The current collector may be used in any thickness, usually 1 μm or more, preferably 3 μm or more, more preferably 5 μm or more, and usually 1 mm or less, preferably 100 μm or less, more preferably 50 μm or less. The thickness of the thin film is preferably within this range, because the strength necessary for the current collector can be maintained, and from the viewpoint of handleability.

The thickness ratio of the positive electrode active material layer to the current collector is not particularly limited. The value of "(thickness of positive electrode active material layer per side immediately before injection of electrolytic solution)/(thickness of current collector)" is usually 20 or less, preferably 15 or less, more preferably 10 or less, and is usually 0.5 or more, preferably 0.8 or more, more preferably 1 or more. When the thickness ratio is above this range, the current collector may generate heat due to Joule heat during charging and discharging at high current density. On the other hand, when the thickness ratio is below this range, the volume ratio of the current collector to the positive electrode active material is increased, so that the battery capacity may be decreased.

<4. Negative Electrode>

The negative electrode usually has a negative electrode active material layer on a current collector, which negative electrode active material layer contains a negative electrode active material. The type of the negative electrode that can be used in the power storage device according to the second aspect, the method for producing the same, and the like are the same as those described in the section <2-3. Negative Electrode> of the first aspect.

<5. Separator>

A separator is usually disposed between the positive electrode and the negative electrode to prevent short circuits. In this case, the separator is usually impregnated with the nonaqueous electrolytic solution used in the second aspect. The separator that can be used in the power storage device according to the second aspect is the same as those described in the section <2-5. Separator> of the first aspect.

<6. Battery Design>

The battery design of the power storage device according to the second aspect can be designed in the same manner as in the section <2-6. Battery Design> in the description of the power storage device according to the first aspect.

EXAMPLES

The present invention will be described in detail below with reference to Examples and Reference Examples, but is not limited to the Examples without departing from the spirit and scope of the present invention.

(Examples and Comparative Examples According to the First Aspect of the Present Invention)

Example 1-1

[Preparation of Negative Electrode]

To 97.5 parts by mass of a carbonaceous material, 1.5 parts by mass of aqueous dispersion of sodium carboxymethylcellulose (sodium carboxymethylcellulose with a concentration of 1% by mass) and 1 part by mass of aqueous dispersion of styrene-butadiene rubber (styrene-butadiene rubber with a concentration of 50% by mass) are added as a thickener and binder and mixed with a disperser to form a slurry. The obtained slurry was applied to a copper foil with a thickness of 10 μm and dried. The resultant was rolled with a pressing machine and cut into a shape having an active material layer having a size of 30 mm in width and 40 mm in length and an uncoated portion having a size of 5 mm in width and 9 mm in length to obtain a negative electrode.

[Preparation of Positive Electrode]

In an N-methylpyrrolidone solvent, 90% by mass of Li(Ni$_{1/3}$Mn$_{1/3}$Co$_{1/3}$)O$_2$(LNMC) as a positive electrode active material, 7% by mass of carbon black as a conductive material, and 3% by mass of polyvinylidene difluoride (PVdF) as a binder are mixed to form a slurry. The obtained slurry was applied to one side of an aluminum foil precoated with a conductive additive and having a thickness of 15 μm and dried. The resultant was roll-pressed with a pressing machine and cut into a shape having an active material layer having a size of 30 mm in width and 40 mm in length and an uncoated portion having a size of 5 mm in width and 9 mm in length to obtain a positive electrode.

[Preparation of Electrolytic Solution]

Under dried argon atmosphere, dried LiPF$_6$ was dissolved to a mixture of ethylene carbonate (EC), dimethyl carbonate (DMC), and ethyl methyl carbonate (EMC) (the volume ratio is 30:30:40) into a ratio of 1 mol/L to prepare an electrolytic solution as a basic electrolytic solution. To the whole basic electrolytic solution, 0.4 parts by mass of triethanolamine borate (TEAB) and 1.1 parts by mass of LiPO$_2$F$_2$ were mixed to prepare an electrolytic solution of Example 1.

[Production of Lithium Secondary Battery]

The positive electrode, the negative electrode, and a polyethylene separator were laminated in the order of the negative electrode, the separator, and the positive electrode to prepare a battery element. The battery element was inserted into a bag made of a laminate film obtained by coating both sides of aluminum (40 μm in thickness) with resin layers, while the terminals of the positive electrode and negative electrode were protruded. The electrolytic solution was then injected into the bag. The bag was then sealed in vacuum to prepare a sheet battery of Example 1 which is fully charged at 4.2 V.

[Evaluation of Initial Discharge Capacity]

A lithium secondary battery was sandwiched with glass plates to increase the adhesion between the electrodes. Under the state, the lithium secondary battery was charged to 4.2 V at a constant current corresponding to 0.2 C at 25° C. and discharged to 3.0 V at a constant current of ⅓ C. This was repeated for 3 cycles to stabilize the battery. In the 4th cycle, the battery was charged to 4.2 V at a constant current of 0.2 C, then charged to a current value of 0.05 C at a constant voltage of 4.2 V, and discharged to 3.0 V at a constant current of 0.2 C. Then, in the 4th cycle, the battery was charged to 4.2 V at a constant current of 0.2 C, then charged to a current value of 0.05 C at a constant voltage of 4.2 V, and discharged to 3.0 V at a constant current of 0.2 C, and the initial discharge capacity was determined.

[Evaluation of Initial Output Characteristics at −30° C.]

The batteries after the evaluation of the initial discharge capacity were charged to a half of the initial discharge capacity at a constant current of 0.2 C at 25° C. The batteries were discharged at 0.5 C, 1.0 C, 1.5 C, 2 C, and 2.5 C at −30° C., and the voltages at 10 seconds were measured. According to the line representing the current-voltage relationship, the current value at 2.8 V was determined. The current value at 2.8 V was multiplied by 2.8 to obtain the output (W).

[Evaluation of Cycle Characteristics]

The battery after completion of evaluation test for initial discharge capacity was charged to 4.2 V at a constant current of 2 C, then charged to a current value of 0.01 C at a constant voltage of 4.2 V, and discharged to 3.0 V at a constant current of 2 C. This cycle was repeated 100 times at 60° C. The cycle capacity retention rate (%) was calculated from the following formula: [(discharge capacity at 100th cycle)/(discharge capacity at 1st cycle)]×100. The results are shown in Table 1.

[Evaluation of Output Characteristics at −30° C. after Cycles]

The batteries after the evaluation of the cycle characteristics were charged to a half of the initial discharge capacity at a constant current of 0.2 C at 25° C. The batteries were discharged at 0.5 C, 1.0 C, 1.5 C, 2 C, and 2.5 C at −30° C., and the voltages at 10 seconds were measured. According to the line representing the current-voltage relationship, the current value at 2.8 V was determined. The current value at 2.8 V was multiplied by 2.8 to obtain the output (W). The cycle output retention rate (%) was calculated from the following formula: [(output at −30° C. after cycle test)/(initial output at −30° C.)]×100. The results are shown in Table 1.

Example 1-2

A sheet lithium secondary battery was prepared and evaluated in the same manner as in Example 1 except that the content of $LiPO_2F_2$ was changed to 0.5 parts by mass in Example 1. The results are shown in Table 1.

Example 1-3

A sheet lithium secondary battery was prepared and evaluated in the same manner as in Example 1 except that triethanolamine borate was changed to 0.8 parts by mass, and that the content of $LiPO_2F_2$ was changed to 0.5 parts by mass. The results are shown in Table 1.

Example 1-4

A sheet lithium secondary battery was prepared and evaluated in the same manner as in Example 1 except that $LiPO_2F_2$ was not used and 2.5 parts by mass of $LiPF_2(C_2O_4)_2$ was used in Example 1. The results are shown in Table 1.

Example 1-5

A sheet lithium secondary battery was prepared and evaluated in the same manner as in Example 1 except that $LiPO_2F_2$ was not used and 1.1 parts by mass of $FSO_3Li$ was used in Example 1. The results are shown in Table 1.

Example 1-6

A sheet lithium secondary battery was prepared and evaluated in the same manner as in Example 1 except that $LiPO_2F_2$ was not used and 1.9 parts by mass of $LiN(SO_2F)_2$ was used in Example 1. The results are shown in Table 1.

Comparative Example 1-1

A sheet lithium secondary battery was prepared and evaluated in the same manner as in Example 1 except that triethanolamine borate and $LiPO_2F_2$ were not used. The results are shown in Table 1.

Comparative Example 1-2

A sheet lithium secondary battery was prepared and evaluated in the same manner as in Example 1 except that $LiPO_2F_2$ was not used. The results are shown in Table 1.

Comparative Example 1-3

A sheet lithium secondary battery was prepared and evaluated in the same manner as in Example 1 except that $LiPO_2F_2$ was not used and 0.8 parts by mass of triethanolamine borate was mixed in Example 1. The results are shown in Table 1.

Comparative Example 1-4

A sheet lithium secondary battery was prepared and evaluated in the same manner as in Example 1 except that triethanolamine borate and $LiPO_2F_2$ were not used and 1.0 part by mass of tripropanolamine borate was used. The results are shown in Table 1.

Comparative Example 1-5

A sheet lithium secondary battery was prepared and evaluated in the same manner as in Example 1 except that $LiPO_2F_2$ was not used and 2.9 parts by mass of $LiN(SO_2C_2F_5)_2$ was used in Example 1. The results are shown in Table 1.

TABLE 1

| | Hexafluoro-phosphate (A) | Compound (B) | | Salt (C) | | Cycle output retention rate [%] | Cycle capacity retention rate [%] |
| --- | --- | --- | --- | --- | --- | --- | --- |
| | | Name | Part by mass | Name | Part by mass | | |
| Example 1-1 | $LiPF_6$ | TEAB | 0.4 | $LiPO_2F_2$ | 1.1 | 152 | 96.4 |
| Example 1-2 | $LiPF_6$ | TEAB | 0.4 | $LiPO_2F_2$ | 0.5 | 147 | 96.6 |
| Example 1-3 | $LiPF_6$ | TEAB | 0.8 | $LiPO_2F_2$ | 0.5 | 154 | 96.2 |
| Example 1-4 | $LiPF_6$ | TEAB | 0.4 | $LiPF_2(C_2O_4)_2$ | 2.5 | 186 | 97.5 |
| Example 1-5 | $LiPF_6$ | TEAB | 0.4 | $FSO_3Li$ | 1.1 | 114 | 96.3 |
| Example 1-6 | $LiPF_6$ | TEAB | 0.4 | $LiN(SO_2F)_2$ | 1.9 | 111 | 94.6 |
| Comparative Example 1-1 | $LiPF_6$ | — | — | — | — | 85 | 94.2 |
| Comparative Example 1-2 | $LiPF_6$ | TEAB | 0.4 | — | — | 107 | 94.2 |
| Comparative Example 1-3 | $LiPF_6$ | TEAB | 0.8 | — | — | 113 | 93.6 |
| Comparative Example 1-4 | $LiPF_6$ | TPAB | — | — | — | 74 | 90.3 |
| Comparative Example 1-5 | $LiPF_6$ | TEAB | 0.4 | $LiN(SO_2C_2F_5)_2$ | 2.9 | 109 | 94.2 |

Comparing Comparative Example 1-1, Comparative Example 1-2 and Comparative Example 1-3, it is found that the cycle output retention rates of Comparative Example 1-2 and Comparative Example 1-3 using triethanolamine borate were slightly improved. However, it is found that no or less improvement of the cycle capacity retention rate was observed. In Comparative Example 1-4 using tripropanolamine borate, effects of improving the cycle output retention rate and the cycle capacity retention rate were not observed.

On the other hand, as can be seen from the results of Examples 1-1 to 1-6 corresponding to the nonaqueous electrolytic solution according to one embodiment of the present invention, they were found to be excellent in the cycle capacity retention rate, and the cycle output retention rate as compared with Comparative Example 1-2 and Comparative Example 1-3 only using triethanolamine borate without using salt (C).

From these comparisons, it is found that use of the embodiments of the present invention contributes to raising the cycle capacity retention rate and the cycle output characteristics, and provides an excellent battery performance.

Example 2-1

[Preparation of Electrolytic Solution]

Under dried argon atmosphere, dried $LiPF_6$ was dissolved to a mixture of ethylene carbonate (EC), dimethyl carbonate (DMC), and ethyl methyl carbonate (EMC) (the volume ratio is 30:40:30) into a ratio of 1.2 mol/L to prepare an electrolytic solution as a basic electrolytic solution. To the whole basic electrolytic solution, 0.75 parts by mass of triethanolamine borate (TEAB), 0.5 parts by mass of $LiPO_2F_2$, 0.75 parts by mass of LiBOB, and 0.8 parts by mass of vinylene carbonate (VC) were mixed to prepare an electrolytic solution of Example 2-1.

[Production of Lithium Secondary Battery]

The positive electrode, the negative electrode, and a polyethylene separator were laminated in the order of the negative electrode, the separator, and the positive electrode to prepare a battery element. The battery element was inserted into a bag made of a laminate film obtained by coating both sides of aluminum (40 μm in thickness) with resin layers, while the terminals of the positive electrode and negative electrode were protruded. The electrolytic solution was then injected into the bag. The bag was then sealed in vacuum to prepare a sheet battery of Example 2-1 which is fully charged at 4.3 V.

[Evaluation of Initial Discharge Capacity]

A lithium secondary battery was sandwiched with glass plates to increase the adhesion between the electrodes. Under the state, the lithium secondary battery was charged to 4.3 V at a constant current corresponding to 0.2 C at 25° C. and discharged to 2.8 V at a constant current of ⅓ C. This was repeated for 3 cycles to stabilize the battery. In the 4th cycle, the battery was charged to 4.3 V at a constant current of 0.2 C, then charged to a current value of 0.05 C at a constant voltage of 4.3 V, and discharged to 2.8 V at a constant current of 0.2 C. Then, in the 4th cycle, the battery was charged to 4.3 V at a constant current of 0.2 C, then charged to a current value of 0.05 C at a constant voltage of 4.3 V, and discharged to 2.8 V at a constant current of 0.2 C, and the initial discharge capacity was determined.

[Evaluation of Initial Output Characteristics at −10° C.]

The batteries after the evaluation of the initial discharge capacity were charged to a half of the initial discharge capacity at a constant current of 0.2 C at 25° C. The batteries were discharged at 0.5 C, 1.0 C, 1.5 C, 2 C, and 2.5 C at −10° C., and the voltages at 10 seconds were measured. According to the line representing the current-voltage relationship, the current value at 2.8 V was determined. The current value at 2.8 V was multiplied by 2.8 to obtain the output (W).

[Evaluation of Initial Input Characteristics at −10° C.]

The batteries after the evaluation of the initial discharge capacity were charged to a half of the initial discharge capacity at a constant current of 0.2 C at 25° C. The batteries were charged at 0.5 C, 1.0 C, 1.5 C, 2 C, and 2.5 C at −10° C., and the voltages at 10 seconds were measured. According to the line representing the current-voltage relationship, the current value at 4.3 V was determined. The current value at 4.3 V was multiplied by 4.3 to obtain the output (W).

[Evaluation of High-temperature Storage Characteristics]

The battery after completion of evaluation of the initial discharge capacity was immersed in an ethanol bath to measure the volume, which was considered as the volume before high-temperature storage. The battery was charged to 4.3 V at a constant current corresponding to 0.2 C at 25° C., and then stored at 60° C. for 4 weeks. After cooling the battery to room temperature, the battery was immersed in an ethanol bath to measure the volume, which was considered as the volume after high-temperature storage. The value obtained by subtracting the volume before high-temperature storage from the volume after high-temperature storage was defined as swelling during high-temperature storage. Table 2 shows the relative values (%) of the swelling during high-temperature storage of each Example when the swelling during high-temperature storage of Comparative Example 2-1 is 100.

[Evaluation of Capacity Retention Rate after High-temperature Storage]

The battery after measurement of the volume after high-temperature storage was discharged to 2.8 V at a constant current of 0.2 C and charged to 4.3 V at a constant current of 0.2 C, then charged to a current value of 0.05 C at a constant voltage, and discharged to 2.8 V at a constant current of 0.2 C, at 25° C., to determine the discharge capacity at 0.2 C after high-temperature storage. The capacity retention rate after storage (%) was calculated from the following formula:

Capacity Retention Rate after Storage (%)=(Discharge Capacity after High-temperature Storage)÷(Initial Discharge Capacity)×100

The capacity retention rate after storage was shown in Table 2.

[Evaluation of Output Characteristics at −10° C. After High-temperature Storage]

The batteries after the evaluation of the initial discharge capacity were charged to a half of the initial discharge capacity at a constant current of 0.2 C at 25° C. The batteries were discharged at 0.5 C, 1.0 C, 1.5 C, 2 C, and 2.5 C at −10° C., and the voltages at 10 seconds were measured. According to the line representing the current-voltage relationship, the current value at 2.8 V was determined. The current value at 2.8 V was multiplied by 2.8 to obtain the output (W). The output retention rate (%) was calculated from the formula:

[(Output at −10° C. after high-temperature incubation test)/(Initial Output at −10° C.)]×100.

The results are shown in Table 2.

[Evaluation of Input Characteristics at −10° C. After High-temperature Storage]

The batteries after the evaluation of the initial discharge capacity were charged to a half of the initial discharge capacity at a constant current of 0.2 C at 25° C. The batteries were charged at 0.5 C, 1.0 C, 1.5 C, 2 C, and 2.5 C at −10° C., and the voltages at 10 seconds were measured. According to the line representing the current-voltage relationship, the current value at 4.3 V was determined. The current value at 4.3 V was multiplied by 4.3 to obtain the output (W). The input retention rate (%) was calculated from the formula:

[(Input at −10° C. after high-temperature incubation test)/(Initial Input at −10° C.)]×100.

The results are shown in Table 3.

Comparative Example 2-1

A sheet lithium secondary battery was prepared and evaluated in the same manner as in Example 2-1 except that TEAB was not used in Example 2-1. The results are shown in Table 2.

TABLE 2

| | Hexafluoro-phosphate (A) | Compound (B) | Salt (C) | Swelling during storage [%] | Capacity retention rate [%] | Output retention rate [%] | Input retention rate [%] |
|---|---|---|---|---|---|---|---|
| Example 2-1 | LiPF$_6$ | TEAB | LiPO$_2$F$_2$, LiBOB | 55 | 92.8 | 91 | 90 |
| Comparative Example 2-1 | LiPF$_6$ | — | LiPO$_2$F$_2$, LiBOB | 100 | 92.1 | 82 | 84 |

As can be seen from the results of Examples 2-1 corresponding to the nonaqueous electrolytic solution according to one embodiment of the present invention, they were found to be excellent in swelling during storage, capacity retention rate during storage, output retention rate during storage, and input retention rate during storage as compared with Comparative Example 2-1 only using the salt (C) without using triethanolamine borate.

From these comparisons, it is found that use of the embodiments of the present invention contributes to raising the storage characteristics, and provides an excellent battery performance.

Example 3-1

[Preparation of Electrolytic Solution]

Under dried argon atmosphere, dried LiPF$_6$ was dissolved to a mixture of ethylene carbonate (EC), dimethyl carbonate (DMC), and ethyl methyl carbonate (EMC) (the volume ratio is 30:40:30) into a ratio of 1.2 mol/L to prepare an electrolytic solution as a basic electrolytic solution. To the whole basic electrolytic solution, 0.2 parts by mass of triethanolamine borate (TEAB), 0.5 parts by mass of LiPO$_2$F$_2$, 0.5 parts by mass of FSO$_3$Li, and 0.3 parts by mass of vinylene carbonate (VC) were mixed to prepare an electrolytic solution of Example 3-1.

[Production of Lithium Secondary Battery]

The positive electrode, the negative electrode, and a polyethylene separator were laminated in the order of the negative electrode, the separator, and the positive electrode to prepare a battery element. The battery element was inserted into a bag made of a laminate film obtained by coating both sides of aluminum (40 μm in thickness) with resin layers, while the terminals of the positive electrode and negative electrode were protruded. The electrolytic solution was then injected into the bag. The bag was then sealed in vacuum to prepare a sheet battery of Example 3-1 which is fully charged at 4.2 V.

[Evaluation of Initial Discharge Capacity]

A lithium secondary battery was sandwiched with glass plates to increase the adhesion between the electrodes. Under the state, the lithium secondary battery was charged to 4.2 V at a constant current corresponding to 0.2 C at 25° C. and discharged to 3.0 V at a constant current of ⅓ C. This was repeated for 3 cycles to stabilize the battery. In the 4th cycle, the battery was charged to 4.2 V at a constant current of 0.2 C, then charged to a current value of 0.05 C at a constant voltage of 4.2 V, and discharged to 2.8 V at a constant current of 0.2 C. Then, in the 4th cycle, the battery was charged to 4.2 V at a constant current of 0.2 C, then charged to a current value of 0.05 C at a constant voltage of 4.2 V, and discharged to 2.8 V at a constant current of 0.2 C, and the initial discharge capacity was determined.

[Evaluation of Initial Output Characteristics at −30° C.]

The batteries after the evaluation of the initial discharge capacity were charged to a half of the initial discharge capacity at a constant current of 0.2 C at 25° C. The batteries were discharged at 0.5 C, 1.0 C, 1.5 C, 2 C, and 2.5 C at −30° C., and the voltages at 10 seconds were measured. According to the line representing the current-voltage relationship, the current value at 2.8 V was determined. The current value at 2.8 V was multiplied by 2.8 to obtain the output (W).

[Evaluation of Initial Input Characteristics at −30° C.]

The batteries after the evaluation of the initial discharge capacity were charged to a half of the initial discharge capacity at a constant current of 0.2 C at 25° C. The batteries were charged at 0.5 C, 1.0 C, 1.5 C, 2 C, and 2.5 C at −30° C., and the voltages at 10 seconds were measured. According to the line representing the current-voltage relationship, the current value at 4.2 V was determined. The current value at 4.2 V was multiplied by 4.2 to obtain the output (W).

[Evaluation of High-temperature Storage Characteristics]

The battery after the evaluation of the initial discharge capacity was charged to 4.2 V at a constant current corresponding to 0.2 C at 25° C., and then stored at 60° C. for 4 weeks.

[Evaluation of Capacity Retention Rate after High-temperature Storage]

The battery after the high-temperature storage was discharged to 2.8 V at a constant current of 0.2 C and charged to 4.2 V at a constant current of 0.2 C, then charged to a current value of 0.05 C at a constant voltage, and discharged to 2.8 V at a constant current of 0.2 C, at 25° C., to determine the discharge capacity at 0.2 C after high-temperature storage. The capacity retention rate after storage (%) was calculated from the following formula:

Capacity Retention Rate after Storage (%)=(Discharge Capacity after High-temperature Storage)÷(Initial Discharge Capacity)×100

The capacity retention rate after storage was shown in Table 3.

[Evaluation of Output Characteristics at −30° C. after High-temperature Storage]

The batteries after the evaluation of the initial discharge capacity were charged to a half of the initial discharge capacity at a constant current of 0.2 C at 25° C. The batteries were discharged at 0.5 C, 1.0 C, 1.5 C, 2 C, and 2.5 C at −30° C., and the voltages at 10 seconds were measured. According to the line representing the current-voltage relationship, the current value at 2.8 V was determined. The current value at 2.8 V was multiplied by 2.8 to obtain the output (W). The output retention rate (%) was calculated from the formula:

[(Output at −30° C. after high-temperature incubation test)/(Initial Output at −30° C.)]×100.

The results are shown in Table 3.

[Evaluation of Input Characteristics at −30° C. after High-temperature Storage]

The batteries after the evaluation of the initial discharge capacity were charged to a half of the initial discharge capacity at a constant current of 0.2 C at 25° C. The batteries were charged at 0.5 C, 1.0 C, 1.5 C, 2 C, and 2.5 C at −30° C., and the voltages at 10 seconds were measured. According to the line representing the current-voltage relationship, the current value at 4.2 V was determined. The current value at 4.2 V was multiplied by 4.2 to obtain the output (W). The input retention rate (%) was calculated from the formula:

[(Input at −30° C. after high-temperature incubation test)/(Initial Input at −30° C.)]×100.

The results are shown in Table 3.

Comparative Example 3-1

A sheet lithium secondary battery was prepared and evaluated in the same manner as in Example 3-1 except that TEAB was not used in Example 3-1. The results are shown in Table 3.

TABLE 3

| | Hexafluoro-phosphate (A) | Compound (B) | Salt (C) | Capacity retention rate [%] | Output retention rate [%] | Input retention rate [%] |
|---|---|---|---|---|---|---|
| Example 3-1 | LiPF$_6$ | TEAB | LiPO$_2$F$_2$, FSO$_3$Li | 89.9 | 129 | 112 |
| Comparative Example 3-1 | LiPF$_6$ | — | LiPO$_2$F$_2$, FSO$_3$Li | 88.6 | 95 | 82 |

As can be seen from the results of Examples 8 corresponding to the nonaqueous electrolytic solution according to one embodiment of the present invention, they were found to be excellent in swelling during storage, capacity retention rate during storage, output retention rate during storage, and input retention rate during storage as compared with Comparative Example 3-1 only using the salt (C) without using triethanolamine borate.

From these comparisons, it is found that use of the embodiments of the present invention contributes to raising the storage characteristics, and provides an excellent battery performance.

In the evaluation results shown in the Examples and Comparative Examples described above, though all of the cycle tests are carried out in a relatively short period time because of being model experiments, significant differences are observed between Examples and Comparative Examples. Nonaqueous electrolyte secondary batteries can actually be used for several years. Thus, it is understood that the differences can become more significant when assuming long-term use.

(Examples and Comparative Examples According to the Second Aspect of the Present Invention)

Example 4-1

[Preparation of Negative Electrode]

To 97.5 parts by mass of a carbonaceous material, 1.5 parts by mass of aqueous dispersion of sodium carboxymethylcellulose (sodium carboxymethylcellulose with a concentration of 1% by mass) and 1 part by mass of aqueous dispersion of styrene-butadiene rubber (styrene-butadiene rubber with a concentration of 50% by mass) are added as a thickener and binder and mixed with a disperser to form a slurry. The obtained slurry was applied to a copper foil with a thickness of 10 μm and dried. The resultant was rolled with a pressing machine and cut into a shape having an active material layer having a size of 30 mm in width and 40 mm in length and an uncoated portion having a size of 5 mm in width and 9 mm in length to obtain a negative electrode.

[Preparation of Positive Electrode]

In an N-methylpyrrolidone solvent, 90% by mass of Li(N$_{1/3}$Mn$_{1/3}$Co$_{1/3}$)O$_2$ (LNMC) as a positive electrode active material, 7% by mass of carbon black as a conductive material, and 3% by mass of polyvinylidene difluoride (PVdF) as a binder are mixed to form a slurry. The obtained slurry was applied to one side of an aluminum foil precoated with a conductive additive and having a thickness of 15 μm and dried. The resultant was roll-pressed with a pressing machine and cut into a shape having an active material layer having a size of 30 mm in width and 40 mm in length and an uncoated portion having a size of 5 mm in width and 9 mm in length to obtain a positive electrode.

[Preparation of Electrolytic Solution]

Under dried argon atmosphere, dried LiPF$_6$ was dissolved to a mixture of ethylene carbonate (EC), dimethyl carbonate (DMC), and ethyl methyl carbonate (EMC) (the volume ratio is 30:30:40) into a ratio of 1 mol/L to prepare an electrolytic solution as a basic electrolytic solution. To the whole basic electrolytic solution, 0.1 parts by mass of triethanolamine borate (TEAB) was mixed to prepare an electrolytic solution of Example 4-1.

[Production of Lithium Secondary Battery]

The positive electrode, the negative electrode, and a polyethylene separator were laminated in the order of the negative electrode, the separator, and the positive electrode to prepare a battery element. The battery element was inserted into a bag made of a laminate film obtained by coating both sides of aluminum (40 μm in thickness) with resin layers, while the terminals of the positive electrode and negative electrode were protruded. The electrolytic solution was then injected into the bag. The bag was then sealed in vacuum to prepare a sheet battery of Example 1 which is fully charged at 4.2 V.

[Evaluation of Initial Discharge Capacity]

A lithium secondary battery was sandwiched with glass plates to increase the adhesion between the electrodes. Under the state, the lithium secondary battery was charged to 4.2 V at a constant current corresponding to 0.2 C at 25° C. and discharged to 3.0 V at a constant current of ⅓ C. This was repeated for 3 cycles to stabilize the battery. In the 4th cycle, the battery was charged to 4.2 V at a constant current of 0.2 C, then charged to a current value of 0.05 C at a constant voltage of 4.2 V, and discharged to 3.0 V at a constant current of 0.2 C. Then, in the 4th cycle, the battery was charged to 4.2 V at a constant current of 0.2 C, then charged to a current value of 0.05 C at a constant voltage of 4.2 V, and discharged to 3.0 V at a constant current of 0.2 C, and the initial discharge capacity was determined.

[Evaluation of Initial Resistance Characteristics at −30° C.]

The batteries after the evaluation of the initial discharge capacity were charged to a half of the initial discharge capacity at a constant current of 0.2 C at 25° C. The batteries were discharged at 0.5 C, 1.0 C, 1.5 C, 2 C, and 2.5 C at −30° C., and the voltages at 10 seconds were measured. Based on the slope of the line representing the current-voltage relationship, the value of resistance (Ω/positive electrode active material (g)) was determined.

[Evaluation of Cycle Characteristics]

The battery after completion of evaluation test for initial discharge capacity was charged to 4.2 V at a constant current of 2 C, then charged to a current value of 0.01 C at a constant voltage of 4.2 V, and discharged to 3.0 V at a constant current of 2 C. This cycle was repeated 100 times at 60° C. The cycle capacity retention rate (%) was calculated from the following formula:

[(discharge capacity at 100th cycle)/(discharge capacity at 1st cycle)]×100.

The results are shown in Table 1.

[Evaluation of Resistance Characteristics at −30° C. after Cycles]

The batteries after the evaluation of the cycle characteristics were charged to a half of the initial discharge capacity at a constant current of 0.2 C at 25° C. The batteries were discharged at 0.5 C, 1.0 C, 1.5 C, 2 C, and 2.5 C at −30° C., and the voltages at 10 seconds were measured. Based on the slope of the line representing the current-voltage relationship, the value of resistance (Ω/positive electrode active material (g)) was determined. The resistance increase rate (%) was calculated from the following formula:

[Resistance at −30° C. after Cycle Test)/(Initial Resistance at −30° C.)]×100.

The results are shown in Table 1.

Example 4-2

A sheet lithium secondary battery was prepared and evaluated in the same manner as in Example 4-1 except that the content of triethanolamine borate was changed to 0.4 parts by mass in Example 4-1. The results are shown in Table 4.

Example 4-3

A sheet lithium secondary battery was prepared and evaluated in the same manner as in Example 4-1 except that triethanolamine borate was changed to 0.8 parts by mass in Example 4-1. The results are shown in Table 4.

Example 4-4

A sheet lithium secondary battery was prepared and evaluated in the same manner as in Example 4-2 except that 0.12 mol/L of $LiPO_2F_2$ was added to the electrolytic solution in Example 4-2. The results are shown in Table 4.

Example 4-5

A sheet lithium secondary battery was prepared and evaluated in the same manner as in Example 4-2 except that 0.06 mol/L of $LiPO_2F_2$ was added to the electrolytic solution in Example 4-2. The results are shown in Table 4.

Example 4-6

A sheet lithium secondary battery was prepared and evaluated in the same manner as in Example 4-3 except that 0.06 mol/L of $LiPO_2F_2$ was added to the electrolytic solution in Example 4-3. The results are shown in Table 4.

Example 4-7

A sheet lithium secondary battery was prepared and evaluated in the same manner as in Example 4-2 except that 0.12 mol/L of $LiPF_2(C_2O_4)_2$ was added to the electrolytic solution in Example 4-2. The results are shown in Table 4.

Example 4-8

A sheet lithium secondary battery was prepared and evaluated in the same manner as in Example 4-2 except that 0.12 mol/L of $FSO_3Li$ was added to the electrolytic solution in Example 4-2. The results are shown in Table 4.

Example 4-9

A sheet lithium secondary battery was prepared and evaluated in the same manner as in Example 4-2 except that 0.12 mol/L of $LiN(SO_2F)_2$ was added to the electrolytic solution in Example 4-2. The results are shown in Table 4.

Comparative Example 4-1

A sheet lithium secondary battery was prepared and evaluated in the same manner as in Example 4-1 without mixing triethanolamine borate. The results are shown in Table 4.

Comparative Example 4-2

A sheet lithium secondary battery was prepared and evaluated in the same manner as in Example 4-1 except that triethanolamine borate was not mixed and that $LiCoO_2$ (LCO) was used as a positive electrode active material. The results are shown in Table 4.

Comparative Example 4-3

A sheet lithium secondary battery was prepared and evaluated in the same manner as in Example 4-3 except that $LiCoO_2$ (LCO) was used as a positive electrode active material. The results are shown in Table 4.

Abbreviations of the positive electrode active materials in Table 4 are as follows.

NMC: $LiNi_{1/3}M_{1/3}Co_{1/3}O_2$

LCO: $LiCoO_2$

TEAB: triethanolamine borate

TABLE 4

| | Positive electrode | Electrolytic solution | | | | | | Evaluation | | |
| | | Compound (1) | | Salt 1 | | Salt 2 | | Initial resistance (with respect to | Resistance increase rate | Capacity retention rate |
| Examples | Active material | Name | Content (part by mass) | Name | Content [mol/L] | Name | Content [mol/L] | Comparative Example 4-2) [%] | before durability test [%] | after durability test [%] |
|---|---|---|---|---|---|---|---|---|---|---|
| Example 4-1 | NMC | TEAB | 0.10 | LiPF$_6$ | 1.00 | — | — | 65.3 | 98.6 | 94.9 |
| Example 4-2 | NMC | TEAB | 0.40 | LiPF$_6$ | 1.00 | — | — | 68.2 | 97.6 | 94.8 |
| Example 4-3 | NMC | TEAB | 0.80 | LiPF$_6$ | 1.00 | — | — | 68.3 | 98.2 | 94.2 |
| Example 4-4 | NMC | TEAB | 0.40 | LiPF$_6$ | 1.00 | LiPO$_2$F$_2$ | 0.12 | 67.6 | 84.5 | 96.4 |
| Example 4-5 | NMC | TEAB | 0.40 | LiPF$_6$ | 1.00 | LiPO$_2$F$_2$ | 0.06 | 65.6 | 84.5 | 96.6 |
| Example 4-6 | NMC | TEAB | 0.80 | LiPF$_6$ | 1.00 | LiPO$_2$F$_2$ | 0.06 | 75.1 | 81.6 | 96.2 |
| Example 4-7 | NMC | TEAB | 0.40 | LiPF$_6$ | 1.00 | LiPF$_2$(C$_2$O$_4$)$_2$ | 0.12 | 74.2 | 80.3 | 97.5 |
| Example 4-8 | NMC | TEAB | 0.40 | LiPF$_6$ | 1.00 | FSO$_3$Li | 0.12 | 66.2 | 94.6 | 96.3 |
| Example 4-9 | NMC | TEAB | 0.40 | LiPF$_6$ | 1.00 | LiN(SO$_2$F)$_2$ | 0.12 | 68.4 | 99.1 | 94.6 |
| Comparative Example 4-1 | NMC | — | — | LiPF$_6$ | 1.00 | — | — | 67.2 | 102.0 | 94.2 |
| Comparative Example 4-2 | LCO | — | — | LiPF$_6$ | 1.00 | — | — | 100 | 145.1 | 89.0 |
| Comparative Example 4-3 | LCO | TEAB | 0.80 | LiPF$_6$ | 1.00 | — | — | 84.5 | 162.2 | 82.4 |

Comparison between Comparative Example 4-1 and Comparative Example 4-2 shows that use of LiNi$_{1/3}$Mn$_{1/3}$Co$_{1/3}$O$_2$ as a positive electrode active material leads to low initial resistance and low resistance increase rate after durability test, and high capacity retention rate after durability test. As shown in Comparative Example 4-3, the addition of triethanolamine borate (TEAB) to the batteries using LiCoO$_2$ as a positive electrode active material leads to low initial resistance and high resistance increase rate after durability test. Comparative Example 4-3 also shows that the capacity retention rate after durability test is decreased.

On the other hand, as is apparent from the results in Examples 4-1 to 4-3 corresponding to the power storage device according to the second aspect, it is found that the addition of triethanolamine borate to batteries using LiNi$_{1/3}$Mn$_{1/3}$Co$_{1/3}$O$_2$ as a positive electrode active material leads to low initial resistance and low resistance increase rate after durability test. Examples 4-1 to 4-3 also shows that the capacity retention rate after durability test is increased.

In addition, as is apparent from the results in Examples 4-4 to 4-9 corresponding to the power storage device according to the second aspect, it is found that use of a plurality of salts in the nonaqueous electrolytic solution does not impair the effects obtained by addition of triethanolamine borate, but leads to further low resistance increase rate after durability test due to synergistic action of the salts, and an excellent capacity retention rate after durability test. From these comparisons, it is found that use of the power storage device of the present invention provides effects of suppressing the resistance increase rate after durability test and effects of increasing the capacity retention rate after durability test, which leads to an excellent battery performance.

In the evaluation results shown in the Examples and Comparative Examples described above, though all of the cycle tests are carried out in a relatively short period time because of being model experiments, significant differences are observed between Examples and Comparative Examples. Nonaqueous electrolyte secondary batteries can actually be used for several years. Thus, it is understood that the differences can become more significant when assuming long-term use.

INDUSTRIAL AVAILABILITY

According to the first aspect of the present invention, the cycle capacity retention rate, input/output characteristics after cycles, and the like of the nonaqueous electrolyte secondary battery can be improved. According to the second aspect of the present invention, it is possible to reduce the resistance, to reduce the resistance increase rate after durability test, and to improve the capacity retention rate after durability test and the like.

Thus, the nonaqueous electrolytic solution and the nonaqueous electrolyte secondary battery using the nonaqueous electrolytic solution of the present invention can be used in various known applications. Specific examples include notebook computers, pen-input computers, mobile computers, electronic book players, mobile phones, mobile fax machines, mobile copy machines, mobile printers, stereo headphones, video movie machines, liquid crystal televisions, handy cleaners, portable CD players, mini-disc players, transceivers, electronic organizers, calculators, memory cards, portable tape recorders, radios, back-up power supplies, motors, automobiles, motorcycles, motorized bicycles, bicycles, lighting apparatus, toys, game machines, watches, power tools, electronic flashes, cameras, home back-up power supplies, office back-up power supplies, load leveling power supplies, natural energy storage power supplies and lithium ion capacitors.

The invention claimed is:

1. A nonaqueous electrolytic solution comprising:
a nonaqueous solvent;
a hexafluorophosphate (A);
a compound (B) represented by the following formula (1):

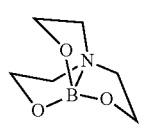

(1)

wherein an arbitrary hydrogen atom bonded to a carbon atom may be substituted with a fluorine atom; and
at least one salt (C) selected from the group consisting of fluorophosphates other than the hexafluorophosphate (A), fluorosulfonates, imide salts represented by MN(SO$_2$F)$_2$, wherein M represents an alkali metal, and oxalate salts.

2. The nonaqueous electrolytic solution according to claim 1, wherein the content of the hexafluorophosphate (A) in the nonaqueous electrolytic solution is 0.5 mol/L or more and 3.0 mol/L or less.

3. The nonaqueous electrolytic solution according to claim 1, wherein the content of the compound (B) is 0.01 parts by mass or more and 10 parts by mass or less with respect to 100 parts by mass in total of the nonaqueous solvent and the hexafluorophosphate (A) in the nonaqueous electrolytic solution.

4. The nonaqueous electrolytic solution according to claim 1, wherein the content of the salt (C) is 0.01 parts by mass or more and 10 parts by mass or less with respect to 100 parts by mass in total of the nonaqueous solvent and the hexafluorophosphate (A) in the nonaqueous electrolytic solution.

5. The nonaqueous electrolytic solution according to claim 1, wherein the salt (C) comprises at least one salt selected from the group consisting of $LiPO_2F_2$, $FSO_3Li$, $LiN(FSO_2)_2$, $LiF_2P(C_2O_4)_2$ and $LiB(C_2O_4)_2$.

6. The nonaqueous electrolytic solution according to claim 1, wherein the hexafluorophosphate (A) comprises $LiPF_6$ salt.

7. A power storage device comprising a negative electrode, a positive electrode, and the nonaqueous electrolytic solution according to claim 1.

8. A power storage device comprising a nonaqueous electrolytic solution, a positive electrode and a negative electrode,
wherein the nonaqueous electrolytic solution comprises a nonaqueous solvent and a compound represented by the following formula (1):

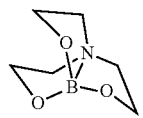
(1)

wherein an arbitrary hydrogen atom bonded to a carbon atom may be substituted with a fluorine atom; and wherein the positive electrode comprises a composite oxide represented by the following formula (7):

$$A_a Ni_x Co_y Mn_z M'_b O_2 \qquad (7)$$

wherein, $0<a<1.2$; $x+y+z+b=1$; $0<x<1$; $0<y<1$; $0<z<1$; $0\leq b<0.3$; A is an alkali metal; and M' is at least one selected from V, Fe, Cu, Nb, Mo, Ta, W, Zn, Ti, Zr, Al, Mg, Li, Na and K.

9. The power storage device according to claim 8, wherein the content of the compound represented by the above formula (1) is 0.01 parts by mass or more and 10 parts by mass or less with respect to 100 parts by mass of the nonaqueous solvent.

10. The power storage device according to claim 8, wherein the nonaqueous electrolytic solution comprises at least one salt selected from the group consisting of fluorophosphates, fluorosulfonates, imide salts and oxalate salts.

11. The power storage device according to claim 10, wherein the content of the salt in the nonaqueous electrolytic solution is 0.001 mol/L or more and 3.0 mol/L or less.

* * * * *